United States Patent
Yonemoto et al.

(10) Patent No.: US 11,988,857 B2
(45) Date of Patent: May 21, 2024

(54) OPTICAL SYSTEM

(71) Applicant: FUJIFILM Corporation, Tokyo (JP)

(72) Inventors: Takashi Yonemoto, Minamiashigara (JP); Yukito Saitoh, Minamiashigara (JP); Yohei Hamachi, Minamiashigara (JP); Makoto Ishiguro, Minamiashigara (JP)

(73) Assignee: FUJIFILM Corporation, Tokyo (JP)

(*) Notice: Subject to any disclaimer, the term of this patent is extended or adjusted under 35 U.S.C. 154(b) by 0 days.

(21) Appl. No.: 17/862,967

(22) Filed: Jul. 12, 2022

(65) Prior Publication Data
US 2022/0373729 A1    Nov. 24, 2022

Related U.S. Application Data

(63) Continuation of application No. PCT/JP2021/001336, filed on Jan. 15, 2021.

(30) Foreign Application Priority Data

Jan. 15, 2020  (JP) .................. 2020-004741
Mar. 24, 2020  (JP) .................. 2020-053180
(Continued)

(51) Int. Cl.
*G02B 5/30*    (2006.01)
*C09K 19/50*   (2006.01)
*G02B 27/00*   (2006.01)

(52) U.S. Cl.
CPC ............ *G02B 5/3016* (2013.01); *C09K 19/50* (2013.01); *G02B 27/0018* (2013.01)

(58) Field of Classification Search
CPC ............ C09K 19/601; C09K 19/3852; C09K 19/542; C09K 19/586; C09K 19/50;
(Continued)

(56) References Cited

U.S. PATENT DOCUMENTS 10,495,798  B1   12/2019  Peng et al.
2010/0177113 A1   7/2010  Gay et al.
(Continued)

FOREIGN PATENT DOCUMENTS

CN   105283783 A   1/2018
CN   110268301 A   9/2019
(Continued)

OTHER PUBLICATIONS

International Preliminary Report on Patentability and English translation of the Written Opinion of the International Searching Authority for International Application No. PCT/JP2021/001336, dated Jul. 28, 2022.
(Continued)

*Primary Examiner* — Hoan C Nguyen
(74) *Attorney, Agent, or Firm* — Birch, Stewart, Kolasch & Birch, LLP

(57) ABSTRACT

An object is to provide an optical system capable of improving the brightness of a main image while eliminating a ghost image. In an optical system including: an image display device that emits an image; a linear polarizer through which light associated with the image passes; a first quarter wavelength plate which receives the light from the linear polarizer; a half mirror; a reflective polarizer; and a second quarter wavelength plate provided between the reflective polarizer and the half mirror, retardance of the first quarter wavelength plate and retardance of the second quarter wavelength plate are equal, and thus the object is achieved.

10 Claims, 4 Drawing Sheets

(30) Foreign Application Priority Data

| Apr. 14, 2020 | (JP) | 2020-072464 |
|ND May 8, 2020 | (JP) | 2020-082820 |
| Jul. 30, 2020 | (JP) | 2020-129658 |
| Oct. 9, 2020 | (JP) | 2020-171234 |

(58) Field of Classification Search
CPC .............. C09K 2019/0448; G02F 1/13; G02F 1/13363; H04N 5/64; G02B 27/0172; G02B 27/286; G02B 27/0018; G02B 5/3016; G02B 2027/012; G09F 9/00
See application file for complete search history.

(56) References Cited

U.S. PATENT DOCUMENTS

| 2011/0193814 | A1* | 8/2011 | Gay .................. G02B 30/25 345/173 |
| 2016/0085101 | A1 | 3/2016 | Saitoh et al. |
| 2017/0160452 | A1 | 6/2017 | Yasuda |
| 2017/0351147 | A1* | 12/2017 | Akutagawa ......... G02F 1/13363 |
| 2018/0101020 | A1* | 4/2018 | Gollier ................ G02B 27/022 |
| 2019/0170919 | A1* | 6/2019 | Saitoh ................. G02B 3/0087 |
| 2021/0063760 | A1 | 3/2021 | Ishioka et al. |
| 2021/0132349 | A1 | 5/2021 | Khan et al. |

FOREIGN PATENT DOCUMENTS

| JP | 11248942 A | * | 9/1999 | .......... G02B 5/3016 |
| JP | 2010-526321 A | | 7/2010 | |
| JP | 2014-215360 A | | 11/2014 | |
| JP | 2019-526075 A | | 9/2019 | |
| JP | 2019-215416 A | | 12/2019 | |
| KR | 20000017521 A | * | 3/2000 | |
| TW | 201641556 | * | 12/2016 | |
| WO | WO-2004025338 A1 | * | 3/2004 | ............... C08J 5/18 |
| WO | WO-2015029958 A1 | * | 3/2015 | ............... G02B 5/26 |
| WO | WO 2016/043219 A1 | | 3/2016 | |
| WO | WO 2017110638 | * | 6/2017 | |
| WO | WO 2019/017274 A1 | | 1/2019 | |

OTHER PUBLICATIONS

International Search Report for Intenational Application No. PCT/JP2021/001336, dated Mar. 23, 2021, with English translation.

Japanese Office Action for corresponding Japanese Application No. 2021-571272, dated May 16, 2023, with English translation.

Chinese Office Action and Search Report for correponding Chinese Application No. 202180009500.X, dated Jul. 21, 2023, with English translation.

\* cited by examiner

| CHOLESTERIC LIQUID CRYSTAL PITCH GRADIENT LAYER | 4.1 μm |
| --- | --- |
| RETARDATION LAYER | 5.8 μm |
| CHOLESTERIC LIQUID CRYSTAL LAYER | 3.8 μm |
| RETARDATION LAYER | 4.3 μm |
| CHOLESTERIC LIQUID CRYSTAL LAYER | 3.6 μm |
| RETARDATION LAYER | 2.4 μm |
| CHOLESTERIC LIQUID CRYSTAL LAYER | 3.3 μm |
| RETARDATION LAYER | 1.4 μm |
| CHOLESTERIC LIQUID CRYSTAL LAYER | 3.1 μm |
| RETARDATION LAYER | 0.7 μm |
| CHOLESTERIC LIQUID CRYSTAL LAYER | 2.8 μm |

OPTICAL SYSTEM

CROSS-REFERENCE TO RELATED APPLICATIONS

This application is a Continuation of PCT International Application No. PCT/JP2021/001336 filed on Jan. 15, 2021, which claims priority under 35 U.S.C. § 119(a) to Japanese Patent Application No. 2020-004741 filed on Jan. 15, 2020, Japanese Patent Application No. 2020-053180 filed on Mar. 24, 2020, Japanese Patent Application No. 2020-072464 filed on Apr. 14, 2020, Japanese Patent Application No. 2020-082820 filed on May 8, 2020, Japanese Patent Application No. 2020-129658 filed on Jul. 30, 2020, and Japanese Patent Application No. 2020-171234 filed on Oct. 9, 2020. Each of the above applications is hereby expressly incorporated by reference, in its entirety, into the present application.

BACKGROUND OF THE INVENTION

1. Field of the Invention

The present invention relates to an optical system which is used for a virtual reality (VR) head-mounted display or the like.

2. Description of the Related Art

There are optical devices which are worn by a user and guide an image to user's eyes to allow the user to experience so-called immersive virtual reality (VR) not allowing outside light in the real world to pass through.

In order to make the user recognize the perspective of an image, the optical devices employ a structure in which the light emitted from an image display device is once reflected by a reflective polarizer or the like, and then reflected again using a mirror or the like and guided to user's eyes.

For example, JP2019-526075A describes an optical system for a head-mounted display which has a linear polarizer, a quarter wavelength plate, a half mirror, a quarter wavelength plate, and a reflective polarizer in this order from the image display device side, and can be used as an optical device for VR.

In this optical system, light is reciprocated between the half mirror and the reflective polarizer to increase the optical path length, and it makes a user recognize the perspective of an image.

This optical system requires two quarter wavelength plates. JP2019-526075A also describes that as each quarter wavelength plate, a quarter wavelength plate having no chromatic aberration is used, and thus it is possible to perform the conversion between linearly polarized light and circularly polarized light over the whole wide spectral range.

SUMMARY OF THE INVENTION

In the optical system described in JP2019-526075A, the light of the respective wavelengths in a visible range, emitted from the image display device, is completely converted into circularly polarized light in the quarter wavelength plate through which the light first passes, and is completely converted into linearly polarized light in the quarter wavelength plate through which the light second passes, and thus the light can be completely reflected to the image display device side by the reflective polarizer.

However, in a case where any one of the quarter wavelength plates cannot completely convert the light of the respective wavelengths in the visible range into linearly polarized light, and a deviation occurs in polarization function between the two quarter wavelength plates, a so-called ghost image, in which a part of the light passes through the first reflective polarizer and a double image is seen between main images to be visually recognized, is caused.

There is also a problem in that in a case where any one of the quarter wavelength plates cannot completely convert the light of the respective wavelengths in the visible range into linearly polarized light, light of some wavelengths cannot reciprocate between the half mirror and the reflective polarizer, and thus main images appear dark due to their decreased brightness.

An object of the present invention is to provide an optical system capable of improving the brightness of a main image while eliminating a ghost image.

In order to solve the problems, the present invention has the following configuration.

[1] An optical system including: an image display device that emits an image;
a linear polarizer through which light associated with the image passes;
a first quarter wavelength plate which receives the light from the linear polarizer;
a half mirror;
a reflective polarizer; and
a second quarter wavelength plate provided between the reflective polarizer and the half mirror,
in which retardance of the first quarter wavelength plate and retardance of the second quarter wavelength plate are equal to each other.

[2] The optical system according to [1], in which each of the first quarter wavelength plate and the second quarter wavelength plate is a lamination type wavelength plate consisting of a plurality of optically anisotropic layers.

[3] The optical system according to [1] or [2], in which the first quarter wavelength plate and the second quarter wavelength plate are lamination type wavelength plates composed of the same optically anisotropic layers, the optically anisotropic layers are laminated to be disposed in a mirror symmetric way with the half mirror as a center, and the same optically anisotropic layers are disposed so that optic axes thereof are orthogonal to each other.

[4] The optical system according to any one of [1] to [3], in which at least one of the first quarter wavelength plate or the second quarter wavelength plate is a lamination type wavelength plate consisting of three or more optically anisotropic layers, and satisfies a relationship of Re (450) ≤Re (550)≤Re (650) where Re (450) is an in-plane retardation value measured at a wavelength of 450 nm, Re (550) is an in-plane retardation value measured at a wavelength of 550 nm, and Re (650) is an in-plane retardation value measured at a wavelength of 650 nm.

[5] The optical system according to any one of [1] to [4], in which at least one of the first quarter wavelength plate or the second quarter wavelength plate includes a layer having a twisted structure of a liquid crystal compound having a spiral axis in a thickness direction.

[6] The optical system according to any one of [1] to [5], further including: an optical compensation layer provided between the linear polarizer and the reflective polarizer.

[7] An optical system including: an image display device that emits an image;
a linear polarizer through which light associated with the image passes;

a first quarter wavelength plate which receives the light from the linear polarizer;

a half mirror; and a reflective polarizer which selectively reflects circularly polarized light, in which the reflective polarizer has one or more cholesteric liquid crystal layers, and at least one of the cholesteric liquid crystal layers has a pitch gradient structure in which a spiral pitch changes in a film thickness direction.

[8] The optical system according to [7], in which a difference between a maximum value and a minimum value of a transmittance of the reflective polarizer in a visible light region is 3% or less.

[9] The optical system according to [7] or [8], further including: one or more retardation layers obtained by fixing vertical alignment of a liquid crystal compound having a polymerizable group.

[10] The optical system according to [9], in which total Rth (550) of the retardation layers satisfies the following expression.

$$|Rth(550)| \geq 200 \text{ nm} \qquad \text{Expression)}$$

Here, Rth (550) represents a retardation in a thickness direction of the retardation layer.

[11] The optical system according to [9] or [10], in which the retardation layer is adjacent to the cholesteric liquid crystal layer.

[12] The optical system according to [7] or [8], in which the reflective polarizer has at least one rod-like cholesteric liquid crystal layer consisting of a rod-like liquid crystal compound and at least one disk-like cholesteric liquid crystal layer in which a disk-like liquid crystal compound having a polymerizable group is vertically aligned.

[13] The optical system according to [12], in which total Rth (550) of the disk-like cholesteric liquid crystal layers satisfies the following expression.

$$|Rth(550)| \geq 200 \text{ nm} \qquad \text{Expression)}$$

Here, Rth (550) represents a retardation in a thickness direction of the disk-like cholesteric liquid crystal layer.

[14] The optical system according to [12] or [13], in which the rod-like cholesteric liquid crystal layer and the disk-like cholesteric liquid crystal layer are adjacent to each other.

[15] The optical system according to any one of [7] to [14], in which the reflective polarizer is processed into a curved surface shape.

[16] The optical system according to any one of [7] to [15], in which the reflective polarizer has a liquid crystal polymer obtained by polymerizing a liquid crystal composition containing a liquid crystal compound having one polymerizable group.

[17] The optical system according to any one of [7] to [16], further including: a third quarter wavelength plate; and a linear polarizer.

[18] An optical system including: an image display device that emits an image;

a linear polarizer through which light associated with the image passes;

a first quarter wavelength plate which receives the light from the linear polarizer;

a half mirror; and a reflective polarizer which selectively reflects circularly polarized light, in which the reflective polarizer has one or more cholesteric liquid crystal layers, the image display device is an image display device using a light source in which a spectrum during white display has two or more maximal values in a visible range, and a full width at half maximum of a peak corresponding to each maximal value is 60 nm or less, or a self-luminous image display device, and a reflection wavelength range of at least one of the cholesteric liquid crystal layers, which corresponds to any one maximal value of the spectrum during white display of the image display device, is equal to or wider than a wavelength range of the full width at half maximum of the peak of the corresponding maximal value and is equal to or narrower than a wavelength range at 5% of the corresponding maximal value.

[19] The optical system according to [18], in which at least one of the cholesteric liquid crystal layers has a pitch gradient structure in which a spiral pitch changes in a film thickness direction.

[20] The optical system according to [18] or [19], in which a difference between a maximum value and a minimum value of a transmittance of the reflective polarizer in a visible light region is 3% or less.

[21] The optical system according to any one of [18] to [20], further including: one or more retardation layers obtained by fixing vertical alignment of a liquid crystal compound having a polymerizable group.

[22] The optical system according to [21], in which total Rth (550) of the retardation layers satisfies the following expression.

$$|Rth(550)| \geq 200 \text{ nm} \qquad \text{Expression)}$$

Here, Rth (550) represents a retardation in a thickness direction of the retardation layer at a wavelength of 550 nm.

[23] The optical system according to [21] or [22], in which the retardation layer is adjacent to the cholesteric liquid crystal layer.

[24] The optical system according to any one of [18] to [20], in which the reflective polarizer has a rod-like cholesteric liquid crystal layer formed of a rod-like liquid crystal compound and a disk-like cholesteric liquid crystal layer in which a disk-like liquid crystal compound having a polymerizable group is vertically aligned.

[25] The optical system according to [24], in which total Rth (550) of the disk-like cholesteric liquid crystal layer satisfies the following expression.

$$|Rth(550)| \geq 200 \text{ nm} \qquad \text{Expression)}$$

Here, Rth (550) represents a retardation in a thickness direction of the disk-like cholesteric liquid crystal layer.

[26] The optical system according to [24] or [25], in which the rod-like cholesteric liquid crystal layer and the disk-like cholesteric liquid crystal layer are adjacent to each other.

[27] The optical system according to any one of [18] to [26], in which the reflective polarizer is processed into a curved surface shape.

[28] The optical system according to any one of [18] to [27], in which the reflective polarizer has a liquid crystal polymer obtained by polymerizing a liquid crystal composition containing a liquid crystal compound having one polymerizable group.

[29] The optical system according to any one of [18] to [28], further including: a third quarter wavelength plate; and a linear polarizer.

According to the present invention, it is possible to provide an optical system capable of improving the brightness of a main image while eliminating a ghost image.

DESCRIPTION OF THE PREFERRED EMBODIMENTS

Figure 1A:
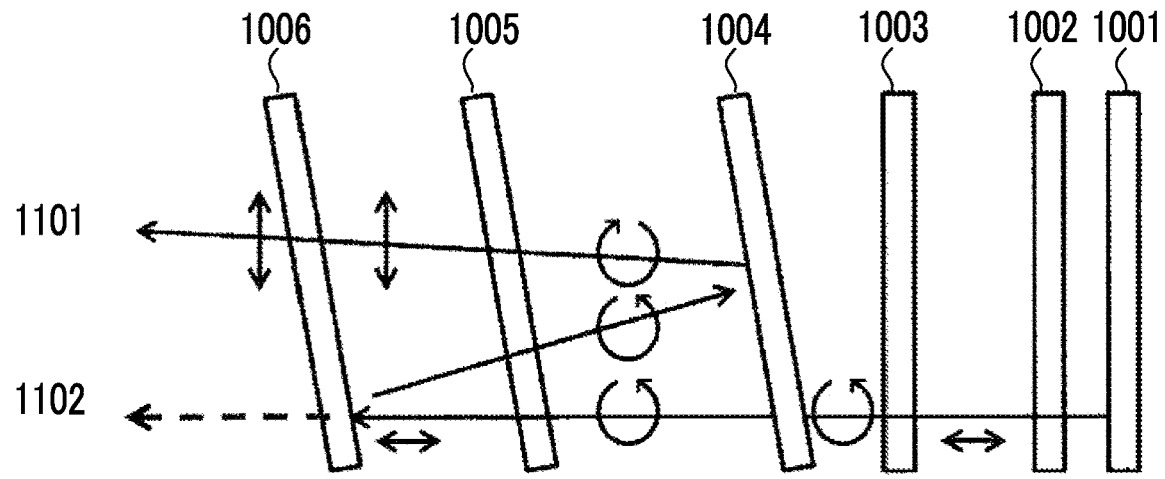
FIGS. 1A and 1B each show an embodiment of an optical system of the present invention.

Hereinafter, an optical system according to an embodiment of the present invention will be described in detail.

The following description of constituent requirements is based on typical embodiments of the present invention, but the present invention is not limited thereto.

In this specification, a numerical range expressed using "to" means a range including numerical values before and after "to" as a lower limit and an upper limit. Regarding angles, each of "orthogonal" and "parallel" means a range of strict angle ±10°, and regarding angles, "same" and "different" can be determined based on whether the angular difference is less than 5° or not.

In the present specification, visible light is light of a wavelength visible to human eyes among electromagnetic waves, and indicates light of a wavelength range of 380 to 780 nm. Invisible light indicates light of a wavelength range of less than 380 nm and light of a wavelength range of greater than 780 nm. In addition, among visible light rays, light of a wavelength range of 420 to 490 nm is blue light, light of a wavelength range of 495 to 570 nm is green light, and light of a wavelength range of 620 to 750 nm is red light, although not limited thereto.

In this specification, the "slow axis" means a direction in which the refractive index is maximized in the plane.

Unless otherwise specified, the "polarizing plate" is used to mean both an elongated polarizing plate and a polarizing plate cut into a size to be incorporated in a display device. The "cut" mentioned here includes "punch", "cutout", and the like.

In addition, in this specification, among "polarizing plates", a form including a laminate of a λ/4 plate and a polarizing film is referred to as "circularly polarizing plate".

In this specification, Re (λ) and Rth (λ) represent an in-plane retardation and a thickness-direction retardation at a wavelength λ, respectively.

Re (λ) is measured by allowing light of a wavelength of λ nm to enter in a direction normal to the film by using AxoScan manufactured by Axometrics, Inc.

In a case where the film to be measured is represented by a uniaxial or biaxial index ellipsoid, Rth (λ) is calculated by the following method.

Rth (λ) is calculated as follows: Re (λ) is measured at 6 points in total by allowing light of a wavelength of λ nm to enter in respective directions tilted from a direction normal to the film with an in-plane slow axis (which is determined with AxoScan) as a tilt axis (rotation axis) (in a case where there is no slow axis, any direction in the film plane serves as a rotation axis) up to 50° on one side of the film in the normal direction with a step of 10°, and Rth (λ) is calculated in AxoScan based on the retardation values thus measured, the assumed average refractive index, and the input film thickness value.

In the above description, in a case of a film which has a direction in which the retardation value thereof is zero at a certain tilt angle relative to the in-plane slow axis thereof in the normal direction taken as a rotation axis, the retardation value at a tilt-angle larger than the tilt angle is calculated in AxoScan after its sign is converted into minus sign.

Furthermore, with the slow axis taken as the tilt axis (rotation axis) (in a case where there is no slow axis, any direction in the film plane serves as a rotation axis), retardation values are measured in two optional tilted directions, and based on the above values, the assumed average refractive index, and the input film thickness value, Rth can be calculated by Expressions (1) and (2).

$$Re(\theta) = \left[ nx - \frac{(ny \times nz)}{\sqrt{\left\{ ny \sin\left(\sin^{-1}\left(\frac{\sin(-\theta)}{nx}\right)\right)\right\}^2 + \left\{ nz \cos\left(\sin^{-1}\left(\frac{\sin(-\theta)}{nx}\right)\right)\right\}^2}} \right] \times \frac{d}{\cos\left\{\sin^{-1}\left(\frac{\sin(-\theta)}{nx}\right)\right\}}$$

Numerical Expression (1)

$$Rth = \left[\frac{nx + ny}{2} - nz\right] \times d$$

Numerical Expression (2)

In the expression, Re (θ) represents a retardation value in a direction tilted by an angle θ from a normal direction. nx represents a refractive index in a slow axis direction in the plane, ny represents a refractive index in a direction orthogonal to nx in the plane, and nz represents a refractive index in a direction orthogonal to nx and ny. d represents a film thickness.

In a case where the film to be measured is a film which cannot be expressed by a uniaxial or biaxial index ellipsoid, that is, a film which does not have a so-called optic axis, Rth (λ) is calculated by the following method.

Rth (λ) is calculated as follows: Re (λ) is measured at 11 points by allowing light of a wavelength of λ nm to enter in respective directions tilted from a direction normal to the film with an in-plane slow axis (which is determined with AxoScan) as a tilt axis (rotation axis) from −50° to +50° with a step of 10°, and Rth (λ) is calculated by AxoScan based on the retardation values (Re (λ)) thus measured, the assumed average refractive index, and the input film thickness value.

In the above measurement, as the assumed average refractive index, the values in Polymer Handbook (JOHN WILEY & SONS, INC) and catalogs of various optical films can be used.

As for films whose average refractive index is unknown, the average refractive index can be measured by an Abbe refractometer.

Examples of the average refractive indices of main optical films are as follows: cellulose acylate (1.48), cycloolefin polymer (1.52), polycarbonate (1.59), polymethylmethacrylate (1.49), polystyrene (1.59). By inputting the assumed average refractive index and the film thickness, the values of nx, ny, and nz are calculated in AxoScan. Nz=(nx−nz)/(nx−ny) is calculated based on the calculated values of nx, ny, and nz.

In addition, Re (λ) and Rth (λ) represent an in-plane retardation value and a thickness-direction retardation value at a wavelength λ, respectively. Unless otherwise specified, the wavelength λ is 550 nm.

Re (λ) and Rth (λ) are values measured at the wavelength λ in AxoScan. By inputting an average refractive index ((Nx+Ny+Nz)/3) and a film thickness (d (μm)) in AxoScan, In-Plane Slow Axis Direction (°)

$$Re(\lambda)=R0(\lambda)$$

$$Rth(\lambda)=((Nx(\lambda)+Ny(\lambda))/2-Nz(\lambda))\times d$$

are calculated.

In this specification, the reverse wavelength dispersibility means properties that the absolute value of an in-plane retardation value increases as the wavelength becomes longer.

Specifically, the reverse wavelength dispersibility means properties that Re (450) that is a in-plane retardation value measured at a wavelength of 450 nm, Re (550) that is an in-plane retardation value measured at a wavelength of 550 nm, and Re (650) that is an in-plane retardation value measured at a wavelength of 650 nm satisfy a relationship of $$Re(450) \leq Re(550) \leq Re(650).$$

<Optical System>

FIG. 1A shows a basic configuration of the optical system according to the embodiment of the present invention.

The optical system shown in FIG. 1A has an image display device 1001 which emits light (light associated with a display image) that carries and supports an image, a linear polarizer 1002, a first quarter wavelength plate 1003, a half mirror 1004, a reflective polarizer 1006, and a second quarter wavelength plate provided between the reflective polarizer 1006 and the half mirror 1004.

In FIG. 1A, the half mirror 1004, the second quarter wavelength plate 1005, and the reflective polarizer 1006 shown are tilted with respect to the image display device 1001, the linear polarizer 1002, and the first quarter wavelength plate 1003. As will be described later, the optical system shown in FIGS. 1A and 1B may optionally have other optical elements such as one or more lenses for magnifying an image. The tilted members shown show that at least one of the members has a curved surface shape corresponding to a lens or the like. Other members (for example, the image display device 1001) may have a planar shape or a curved surface shape.

A main image 1101 which is visually recognized by a user in the optical system according to the embodiment of the present invention is visually recognized by the user as follows.

Among light rays (light that carries and supports an image) emitted by the image display device 1001, linearly polarized light that has passed through the linear polarizer 1002 is converted into circularly polarized light by the first quarter wavelength plate 1003, and a part thereof is transmitted through the half mirror 1004.

The circularly polarized light that has been transmitted through the half mirror 1004 enters the second quarter wavelength plate 1005. The second quarter wavelength plate 1005 is a quarter wavelength plate (λ/4 plate) in which a slow axis is disposed orthogonal to the first quarter wavelength plate 1003. Therefore, the circularly polarized light that has entered the second quarter wavelength plate 1005 is converted into linearly polarized light in the same polarization direction as before entering the first quarter wavelength plate 1003 by the second quarter wavelength plate 1005, and enters the reflective polarizer 1006.

The reflective polarizer 1006 is a reflective type polarizer having a transmission axis orthogonal to a transmission axis of the linear polarizer 1002. Accordingly, the linearly polarized light converted by the second quarter wavelength plate 1005 is basically reflected by the reflective polarizer 1006.

The linearly polarized light reflected by the reflective polarizer 1006 is converted into circularly polarized light again by the second quarter wavelength plate 1005, and is reflected again by the half mirror 1004. At the time of reflection by the half mirror 1004, the circularly polarized light turns into circularly polarized light in the reverse revolution direction.

The circularly polarized light reflected by the half mirror 1004 is transmitted through the second quarter wavelength plate 1005 again, and is converted into linearly polarized light.

This circularly polarized light is circularly polarized light whose revolution direction reversed by the half mirror is opposite to that in a case where the light first enters the second quarter wavelength plate 1005. Accordingly, the circularly polarized light converted by the second quarter wavelength plate 1005 at this point of time is converted into the linearly polarized light in a direction orthogonal to the linearly polarized light first entering and reflected by the reflective polarizer 1006.

Therefore, the linearly polarized light is transmitted through the reflective polarizer 1006 and is visually recognized by a user as a main image 1101.

In this optical system, light reciprocates between the half mirror 1004 and the reflective polarizer 1006, so that the length of an optical path can be increased in the limited space, and this contributes to the miniaturization of the optical system.

Meanwhile, a part of the light that is emitted by the image display device 1001, passes through the linear polarizer 1002, is converted into circularly polarized light by the first quarter wavelength plate 1003, is transmitted through the half mirror 1004, is converted again into linearly polarized light by the second quarter wavelength plate 1005, and enters the reflective polarizer 1006 is transmitted without being reflected by the reflective polarizer 1006.

The light transmitted through the reflective polarizer 1006 in a case where it first enters the reflective polarizer 1006 becomes a ghost image 1102 and is visually recognized by a user.

As will be described later, in the optical system according to the embodiment of the present invention, the retardance of the first quarter wavelength plate 1003 and the retardance of the second quarter wavelength plate 1005 are equal, so that the ghost image 1102 can be reduced.

<Members Constituting Optical System>

[Image Display Device]

In the optical system according to the embodiment of the present invention, the image display device 1001 is not limited, and various known image display devices which are used in devices and the like displaying virtual reality and augmented reality, such as VR head-mounted displays and AR glasses, can be used.

Examples thereof include a liquid crystal display, an organic electroluminescence display, a digital light processing (DLP) type projector, and a scanning type display using a microelectromechanical system (MEMS) mirror. The liquid crystal display also includes a liquid crystal on silicon (LCOS).

In one aspect of the present invention, as the image display device 1001, an image display device using a light source in which the spectrum during white display (emission spectrum during white display) has at least two or more maximal values in a visible range, and the full width at half maximum of a peak corresponding to each maximal value is 60 nm or less, or a self-luminous image display device is used. In this case, a cholesteric liquid crystal layer constituting a reflection circular polarizer 1008 (see FIG. 2) to be described later does not necessarily have a pitch gradient structure to be described later.

(Linear Polarizer)

The linear polarizer 1002 is not particularly limited as long as it is a member having a function of converting light into specific linearly polarized light, and known linear polarizers can be used.

As the linear polarizer, an iodine-based polarizer which is an absorption type polarizer, a dye-based polarizer using a dichroic dye, a polyene-based polarizer, or the like is used. The iodine-based polarizer and the dye-based polarizer include a coating type polarizer and a stretching type polarizer, and any of these is applicable. Of these, a linear polarizer produced by causing polyvinyl alcohol to adsorb iodine or a dichroic dye and stretching the resulting material is preferable.

In addition, examples of the method of obtaining a polarizer by performing stretching and dyeing in a state in which a laminate film is obtained by forming a polyvinyl alcohol layer on a substrate include JP5048120B, JP5143918B, JP4691205B, JP4751481B, and JP4751486B. These known technologies concerning a polarizer can also be preferably used.

As the absorption type polarizer, a linear polarizer in which a dichroic dye is aligned using the aligning properties of the liquid crystal without stretching is particularly preferable. This polarizer has many advantages in that: it can be made as an extremely thin layer having a thickness of about 0.1 to 5 µm; it is hard to crack when being bent and is less likely to be thermally deformed as described in JP2019-194685A; it has excellent durability even with a polarizing plate having a high transmittance of greater than 50% as described in JP6483486B; and it has excellent thermoformabilitiy. In addition, it is also possible to use a polarizer transferred by peeling a support.

The linear polarizer in which a dichroic dye is aligned can be used for devices requiring high luminance and/or reduction in size and weight, fine optical systems, and applications that involve forming into a portion having a curved surface. In addition, the linear polarizer can be used for flexible portions and the like. It is also possible to use a polarizer transferred by peeling a support.

As described above, it is preferable that the polarizer is used for the purpose of antireflection in direct combination with a retardation plate, and it is also preferable that an absorption type polarizer is incorporated in in-vehicle display optical systems such as head-up displays, optical systems such as AR glasses and VR glasses, LiDAR, face matching systems, optical sensors such as polarization imaging, and the like for the purpose of suppressing stray light.

(Quarter Wavelength Plate)

The quarter wavelength plate is a retardation plate which moves the phase of incident polarized light by λ/4.

As described above, the light carrying and supporting an image emitted by the image display device 1001 is first transmitted through the linear polarizer 1002 and converted into linearly polarized light in a predetermined polarization direction. The light is converted into circularly polarized light by the first quarter wavelength plate 1003, and transmitted through the half mirror 1004. Then, the light is converted into linearly polarized light in the same polarization direction as before entering the first quarter wavelength plate 1003 by the second quarter wavelength plate 1005.

The quarter wavelength plate used in the present invention may be a single layer type composed of one optically anisotropic layer, or a lamination type wavelength plate composed of a lamination of two or more optically anisotropic layers having different slow axes.

Examples of the lamination type quarter wavelength plate include those described in WO2013/137464A, WO2016/158300A, JP2014-209219A, JP2014-209220A, WO2014/157079A, JP2019-215416A, and WO2019/160044A. In the present invention, the lamination type quarter wavelength plate is not limited thereto.

The optical system according to the embodiment of the present invention has the first quarter wavelength plate 1003 and the second quarter wavelength plate 1005 with the half mirror 1004 folding back an optical path.

Here, in the present invention, the retardance of the first quarter wavelength plate 1003 and the retardance of the second quarter wavelength plate 1005 are equal. Since the optical system according to the embodiment of the present invention has such a configuration, a VR head-mounted display having a first quarter wavelength plate 1003, a second quarter wavelength plate 1005, and a reflective polarizer 1006 achieves both the suppression of a ghost image 1102 and a high transmittance.

Hereinafter, the fact that the retardances of the two quarter wavelength plates are equal will be described in detail.

As described above, the first quarter wavelength plate 1003 and the second quarter wavelength plate 1005 used in the present invention may be a single layer type or a lamination type.

Here, in a case where the quarter wavelength plate is a lamination type (lamination type wavelength plate) which is a laminate of two or more optically anisotropic layers, the optically anisotropic layers having a plurality of different slow axes generally do not have one slow axis in total. That is, considering the polarization transition on a Poincare sphere, it cannot be represented by the rotation of an axis on one equator.

In general, the polarization transition by a quarter wavelength plate (retardation film) is represented by the rotation at a certain point of a Poincare sphere different from the equator. The axis and angle of the rotation are defined as retardance. Retardance R is expressed by a vector of R=(Rx, Ry, Rz). Here, the absolute value of R represents a rotation angle, and the position on the Poincare sphere defined by the unit vector of R is a rotation axis.

Unlike a case of a single layer type quarter wavelength plate (retardation film), in a case of a lamination type quarter wavelength plate, both the rotation axis and the rotation angle differ depending on the wavelength.

In the first quarter wavelength plate 1003 and the second quarter wavelength plate 1005 in the present invention, the polarization transition can be represented by the retardance, and the fact that the retardance of the first quarter wavelength plate 1003 and the retardance of the second quarter wavelength plate 1005 are equal in magnitude is a characteristic of the optical system according to the embodiment of the present invention.

In a case where the above relationship is expressed by vectors, the relationship between retardance R1=(Rx1, Ry1, Rz1) of the first quarter wavelength plate 1003 and retardance R2=(Rx2, Ry2, Rz2) of the second quarter wavelength plate 1005 is represented by R1=−R2. That is, the first quarter wavelength plate 1003 and the second quarter wavelength plate 1005 are equal in magnitude of the retardance, and are opposite in positive and negative rotation angles.

Furthermore, the above relationship is satisfied at any point of blue (450 nm), green (550 nm), and red (630 nm).

This is different from the results seen in a case where the same two films each composed of a plurality of layers are disposed with their respective virtual slow axes shifted by 90° from each other as in comparative examples shown later. In the comparative examples, the relationship of R1=−R2 is not satisfied at all of the points of three wavelengths, and as a result, both the suppression of a ghost image 1102 and a high transmittance cannot be achieved in this configuration. In the present invention, both the suppression of a ghost image 1102 and a high transmittance can be achieved by using a configuration in which the first quarter wavelength plate 1003 and the second quarter wavelength plate 1005 have the relationship of R1=−R2.

That is, the action of the optical system in which the retardance R1 of the first quarter wavelength plate 1003 and the retardance R2 of the second quarter wavelength plate 1005 described above satisfy the relationship of R1=−R2 is as follows.

A point on the Poincare sphere of linearly polarized light that is transmitted through the linear polarizer 1002 and enters the first quarter wavelength plate 1003 is set as a point P1.

The light transmitted through the first quarter wavelength plate 1003 whose retardance is R1 is converted from linearly polarized light at the point P1 to circularly polarized light corresponding to the retardance R1 by the first quarter wavelength plate 1003. A point on the Poincare sphere of the circularly polarized light is set as a point P2.

The circularly polarized light at the point P2 converted by the first quarter wavelength plate 1003 is transmitted through the half mirror 1004, and then converted into linearly polarized light corresponding to the retardance R2 from the point P2 by the second quarter wavelength plate 1005. A point on the Poincare sphere of the linearly polarized light is set as a point P3.

The linearly polarized light at the point P3 converted by the second quarter wavelength plate 1005 then enters the reflective polarizer 1006.

Here, as described above, the retardance R1 of the first quarter wavelength plate 1003 and the retardance R2 of the second quarter wavelength plate 1005 satisfy the relationship of R1=−R2. That is, the first quarter wavelength plate 1003 and the second quarter wavelength plate 1005 are equal in magnitude of the retardance, and are opposite in positive and negative rotation angles.

Accordingly, the linearly polarized light at the point P3 converted from the circularly polarized light at the point P2 by the second quarter wavelength plate 1005 having the retardance R2 becomes the same linearly polarized light as the original linearly polarized light at the point P1. That is, the point P3 equals the point P1, and the linearly polarized light converted by the second quarter wavelength plate 1005 becomes linearly polarized light in the same polarization direction as the linearly polarized light emitted from the image display device 1001 and transmitted through the linear polarizer 1002.

In other words, in the optical system according to the embodiment of the present invention having the first quarter wavelength plate 1003, the second quarter wavelength plate 1005, and the reflective polarizer 1006, in which the retardances of both the quarter wavelength plates are equal, the linearly polarized light transmitted through the linear polarizer 1002 is converted into circularly polarized light by the first quarter wavelength plate 1003, returned to the original linearly polarized light in a state of being transmitted through the linear polarizer 1002 by the second quarter wavelength plate 1005, and enters the reflective polarizer 1006.

As described above, the reflective polarizer 1006 is a reflective type polarizer having a transmission axis orthogonal to the transmission axis of the linear polarizer 1002. In addition, in the optical system shown in FIG. 1A, the light transmitted through the reflective polarizer 1006 becomes a ghost image 1102.

Here, in a case where the retardance of the first quarter wavelength plate 1003 is different from the retardance of the second quarter wavelength plate 1005, the circularly polarized light converted by the second quarter wavelength plate 1005 becomes linearly polarized light different from the linearly polarized light transmitted through the linear polarizer 1002, such as linearly polarized light containing a component of elliptic polarization. That is, the linearly polarized light at the point P3 converted from the circularly polarized light at the point P2 by the second quarter wavelength plate 1005 becomes linearly polarized light at a position different from the point P1. As a result, the component of elliptic polarization is transmitted through the reflective polarizer 1006 and becomes a ghost image 1102.

In contrast, in the optical system according to the embodiment of the present invention, since the retardance of the first quarter wavelength plate 1003 and the retardance of the second quarter wavelength plate 1005 are equal, the linearly polarized light converted by the second quarter wavelength plate 1005 becomes linearly polarized light in the same polarization direction as the linearly polarized light transmitted through the linear polarizer 1002 (point P1=point P3) as described above.

Accordingly, most light rays entering the reflective polarizer 1006 having a transmission axis orthogonal to the transmission axis of the linear polarizer 1002 are reflected by the reflective polarizer 1006 without being transmitted through the reflective polarizer 1006, and enter the second quarter wavelength plate 1005 again.

Therefore, with the optical system according to the embodiment of the present invention, it is possible to achieve both the suppression of a ghost image and a high transmittance in, for example, a head-mounted display displaying VR.

In the optical system according to the embodiment of the present invention, the retardance of the first quarter wavelength plate 1003 and the retardance of the second quarter wavelength plate 1005 are equal with respect to the light entering from the front side of at least the quarter wavelength plate. In the following description, in a case where the "retardance" is simply used, it means the retardance with respect to the light entering from the front side.

The front side (front direction) of the quarter wavelength plate represents a normal direction of the quarter wavelength plate, that is, a direction orthogonal to the main surface of the quarter wavelength plate. The main surface represents the largest surface of a sheet-like material (layer, film, plate-like material). The same is true not only of the quarter wavelength plate but of all sheet-like materials.

Here, the retardance of the first quarter wavelength plate 1003 and the retardance of the second quarter wavelength plate 1005 can be similarly defined not only in the front direction of the quarter wavelength plate but also in an oblique direction. This is also referred to as the retardance in an oblique direction.

Even in a case of the retardance in an oblique direction, R1 (θ, φ) and R2 (θ, θ) are preferably equal. That is, it is preferable that even in a case of the retardance in an oblique direction, the relationship of R1=−R2 is satisfied, and R1 and R2 are equal in magnitude of retardance, and are opposite in positive and negative rotation angles.

In this case, θ and φ represent a polar angle and an azimuthal angle, and the coordinate system thereof is determined based on the optical system according to the embodiment of the present invention. That is, in a case of the retardance in an oblique direction, R1 and R2 may change depending on the positioning angle and front-back installation of the first quarter wavelength plate 1003 and the second quarter wavelength plate 1005 in the optical system.

In addition, in the present invention, specifically, the fact that the retardance of the first quarter wavelength plate 1003 and the retardance of the second quarter wavelength plate 1005 are equal represents that in a case where the light enters from the front side, the magnitude of the vector sum of the retardances of the two quarter wavelength plates is π/30 radian or less.

That is, the fact that the retardance of the first quarter wavelength plate 1003 and the retardance of the second quarter wavelength plate 1005 are equal represents that in a case where the light enters from the front side, $$|R1+R2| \leq \pi/30.$$

is satisfied.

In addition, in the present invention, specifically, the fact that the retardance of the first quarter wavelength plate 1003 and the retardance of the second quarter wavelength plate 1005 in an oblique direction are equal represents that in a case where the light enters in an oblique direction, the magnitude of the vector sum of the retardances of the two quarter wavelength plates in the oblique direction is 3π/50 radian or less.

That is, the fact that the retardance of the first quarter wavelength plate 1003 and the retardance of the second quarter wavelength plate 1005 in an oblique direction are equal represents that in a case where the light enters in an oblique direction, $$|R1(\theta,\varphi)+R2(\theta,\varphi)| \leq 3\pi/50$$

is satisfied.

More specifically, in a laminate in which the first quarter wavelength plate 1003 and the second quarter wavelength plate 1005 are bonded with a pressure sensitive adhesive, in a case where the result of the measurement of Re (λ) regarding incident light at a polar angle of 0° by AxoScan is |R1+R2|≤π/30, the retardance of the first quarter wavelength plate 1003 and the retardance of the second quarter wavelength plate 1005 in a front direction are thought to equal.

In addition, in the same laminate, in a case where the result of the measurement of Re (λ) regarding incident light at a polar angle of 300 by AxoScan is |R1+R2|≤3π/50, the retardance of the first quarter wavelength plate 1003 and the retardance of the second quarter wavelength plate 1005 in an oblique direction are thought to equal.

As the pressure sensitive adhesive, examples described in the column "(Adhesive Layer)" to be described later may be used.

In the optical system according to the embodiment of the present invention, at least one of the first quarter wavelength plate 1003 or the second quarter wavelength plate 1005 is preferably a lamination type wavelength plate formed by laminating a plurality of optically anisotropic layers. In addition, in the optical system according to the embodiment of the present invention, both the first quarter wavelength plate 1003 and the second quarter wavelength plate 1005 are preferably lamination type wavelength plates.

Figures 3, 4:
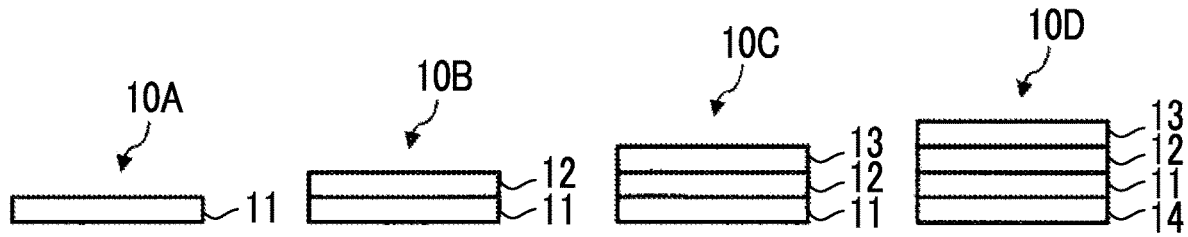
FIG. 3 shows cross-sectional views of an embodiment of a quarter wavelength plate used in the present invention.
FIG. 4 is a diagram schematically showing one layer configuration of a reflective polarizer in an example.

That is, as schematically shown in FIG. 3, the first quarter wavelength plate 1003 and the second quarter wavelength plate 1005 used in the present invention may be a wavelength plate 10A having only one optically anisotropic layer 11, and are preferably a lamination type wavelength plate 10B in which two optically anisotropic layers, i.e., optically anisotropic layers 11 and 12 are laminated.

Furthermore, as schematically shown in FIG. 3, the first quarter wavelength plate 1003 and the second quarter wavelength plate 1005 used in the present invention are more preferably a lamination type wavelength plate 10C in which three optically anisotropic layers, i.e., optically anisotropic layers 11, 12, and 13 are laminated, or a lamination type wavelength plate 10D in which four optically anisotropic layers, i.e., optically anisotropic layers 11, 12, 13, and 14 are laminated.

In the present invention, the first quarter wavelength plate 1003 and the second quarter wavelength plate 1005 are preferably a lamination type wavelength plate in which three or more optically anisotropic layers are laminated, and for example, by increasing the number of layers to 4, 5, or the like, more precise control can be achieved.

In a case where the first quarter wavelength plate 1003 and/or the second quarter wavelength plate 1005 used in the present invention are a lamination type wavelength plate in which a plurality of optically anisotropic layers are laminated, the quarter wavelength plate preferably has a first λ/2 plate (half wavelength plate), a second λ/2 plate, and a λ/4 plate (quarter wavelength plate) in this order.

In this case, it is preferable that the first λ/2 plate satisfies nz≈nx>ny, it is more preferable that the first λ/2 plate and the second λ/2 plate or λ/4 plate satisfy nz≈nx>ny, and it is even more preferable that the first λ/2 plate and the second λ/2 plate satisfy nz≈nx>ny.

In addition, it is preferable that one of the first λ/2 plate, the second λ/2 plate, and the λ/4 plate satisfies ny nz<nx, or the λ/4 plate satisfies nx>ny≥nz, it is more preferable that one of the first λ/2 plate, the second λ/2 plate, and the λ/4 plate satisfies ny≈nz<nx, and it is even more preferable that the λ/4 plate satisfies ny≈nz<nx.

It is particularly preferable that both the first λ/2 plate and the second λ/2 plate satisfy nz≈nx>ny, and the λ/4 plate satisfies ny≈nz<nx.

The symbol "≈" includes not only a case where both are exactly the same, but also a case where both are substantially the same. Regarding the expression "substantially the same", for example, "ny≈nz" also includes a case where (ny−nz)×d (where d is a film thickness) is −10 to 10 nm (preferably −5 to 5 nm), and "nx≈nz" also includes a case where (nx−nz)×d is −10 to 10 nm (preferably −5 to 5 nm).

An optically anisotropic layer (wavelength plate) satisfying nz≈nx>ny is referred to as the negative A plate (negative A plate (−A plate)). In the negative A plate, Rth is a negative value. An optically anisotropic layer (wavelength plate) satisfying ny≈nz<nx is referred to as the positive A plate (positive A plate (+A plate)). In the positive A plate, Rth is a positive value.

It is preferable that either one of the first wavelength plate 1003 or the second quarter wavelength plate 1005 used in the present invention, or preferably both of them have reverse wavelength dispersibility in which Re (450) that is an in-plane retardation value measured at a wavelength of 450 nm, Re (550) that is an in-plane retardation value measured at a wavelength of 550 nm, and Re (650) that is an in-plane retardation value measured at a wavelength of 650 nm satisfy a relationship of Re (450)≤Re (550)≤Re (650).

In a case where the first quarter wavelength plate 1003 and/or the second quarter wavelength plate 1005 have reverse wavelength dispersibility, the phase variation in both the quarter wavelength plates is ideal, and the brightness of a main image in the optical system increases.

Figure 1B:
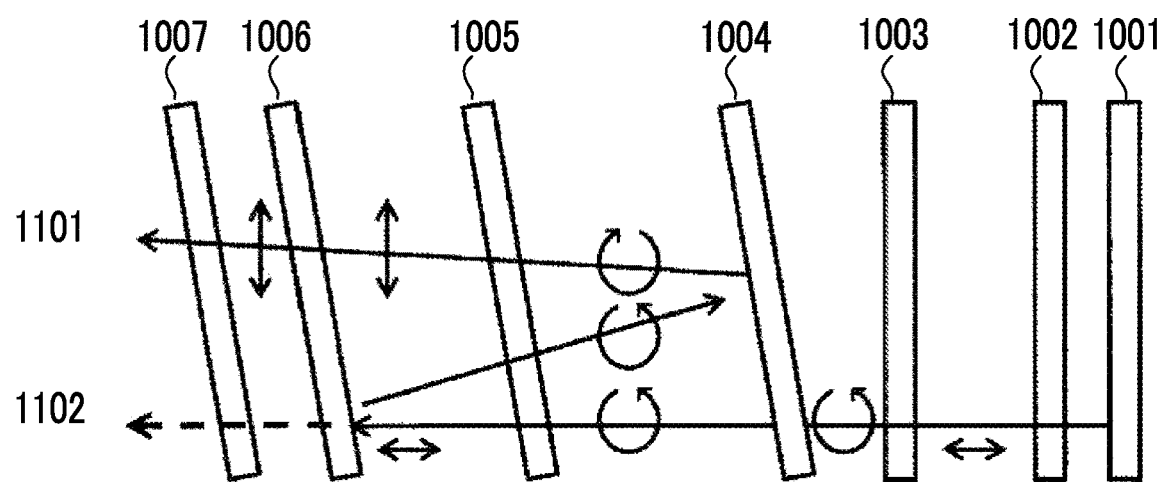

As shown in FIGS. 1A and 1B, in the optical system according to the embodiment of the present invention, the light emitted from the image display device 1001 passes through the second quarter wavelength plate 1005 three times before being visually recognized by a user. Therefore, a slight deviation in retardation of the second quarter wavelength plate 1005 greatly affects the display performance.

Therefore, from the viewpoint of broadband properties, the ratio of the retardation values described above, i.e., Re (450)/Re (550) is preferably 0.9 or less, more preferably 0.87 or less, and even more preferably 0.82 or less.

In the first quarter wavelength plate 1003 and/or the second quarter wavelength plate 1005 used in the present invention, Rth (550) that is a thickness-direction retardation value at a wavelength of 550 nm is preferably −400 to 0 nm, and more preferably −300 to −100 nm.

In a case where the first quarter wavelength plate 1003 and/or the second quarter wavelength plate 1005 used in the present invention are a lamination type wavelength plate, and include a first λ/2 plate, a second λ/2 plate, and a λ/4 plate in this order, the angle formed between the slow axis of the first λ/2 plate and the slow axis of the second λ/2 plate is in a range of 10° to 40°, and the angle formed between the slow axis of the first λ/2 plate and the slow axis of the λ/4 plate is in a range of 70° to 110°.

The angle formed between the slow axis of the first λ/2 plate and the slow axis of the second λ/2 plate is preferably in a range of 20° to 30°, and the angle between the slow axis of the first λ/2 plate and the slow axis of the λ/4 plate is preferably in a range of 80° to 100°.

The first quarter wavelength plate 1003 and/or the second quarter wavelength plate 1005 used in the present invention function as a quarter wavelength plate as a whole regardless of whether the above quarter wavelength plate is a single layer type or a laminated type. The quarter wavelength plate is a plate having a function of converting linearly polarized light of a specific wavelength into circularly polarized light (or circularly polarized light into linearly polarized light).

More specifically, the quarter wavelength plate is a plate whose in-plane retardation value at a predetermined wavelength λ nm is represented by Re (λ)=λ/4 (or an odd multiple thereof). This expression may be achieved at any wavelength (for example, 550 nm) in a visible light range, and Re (550) that is an in-plane retardation value at a wavelength of 550 nm preferably satisfies the following relationship.

$$100 \text{ nm} \leq Re(550) \leq 160 \text{ nm}$$

Above all, it is more preferable to satisfy 110 nm≤Re (550)≤150 nm.

The first quarter wavelength plate 1003 and/or the second quarter wavelength plate 1005 used in the present invention preferably include a layer having a twisted structure having a spiral axis in a thickness direction.

The contents described in JP2014-209219A, JP2014-209220A, WO2014/157079A, and US2019/0204687A are suitably used as the quarter wavelength plate used in the present invention.

The first quarter wavelength plate 1003 and/or the second quarter wavelength plate 1005 used in the present invention are preferably a lamination type wavelength plate including three layers of retardation films (optically anisotropic layers). All the three layers preferably have a twisted structure having a spiral axis in a thickness direction.

The material constituting the layer having a twisted structure is not limited, and is preferably a liquid crystal material (liquid crystal compound).

The liquid crystal material may be either a rod-like liquid crystal or a disk-like liquid crystal, and it is preferable that the three layers include at least one layer formed of a rod-like liquid crystal and at least one layer formed of a disk-like liquid crystal. The above configuration is preferable since the retardation of the rod-like liquid crystal in a negative thickness direction and the retardation of the disk-like liquid crystal in a positive thickness direction are compensated, and the performance in an oblique direction is improved.

In addition, the number of layers having a twisted structure may be three or more. By increasing the number of layers to 4, 5, or the like, more precise control can be achieved.

In a case where the first quarter wavelength plate 1003 and the second quarter wavelength plate 1005 are the above-described lamination type wavelength plates having a first λ/2 plate, a second λ/2 plate, and a λ/4 plate, the materials constituting the two λ/2 plates and the λ/4 plate are not particularly limited.

Accordingly, the λ/2 plate and the λ/4 plate each independently may be, for example, a layer formed of a composition containing a liquid crystal compound, or a layer formed of a polymer film (a film formed of a polymer (resin), and particularly, a polymer film which has been stretched).

Examples of the polymer film include a polycarbonate film, a cycloolefin polymer film, a TAC film, and a polyimide film.

(Layer Formed of Composition Containing Liquid Crystal Compound)

The λ/2 plate and the λ/4 plate each may be a layer formed of a composition containing a liquid crystal compound. In particular, it is preferable that two or more of the first λ/2 plate, the second λ/2 plate, and the λ/4 plate are layers formed of a composition containing a liquid crystal compound. With such a configuration, the lamination type wavelength plate can be reduced in thickness, and the optical characteristics of each layer can be easily adjusted.

It is more preferable that all of the first λ/2 plate, the second λ/2 plate, and the λ/4 plate are formed of a composition containing a liquid crystal compound.

The composition containing a liquid crystal compound is preferably a composition containing a polymerizable liquid crystal compound. The layer formed of the composition containing a polymerizable liquid crystal compound is preferably a layer formed by fixing the polymerizable liquid crystal compound by polymerization or the like.

The kind of the liquid crystal compound is not particularly limited, and can be classified into a rod-like liquid crystal (rod-like liquid crystal compound) and a disk-like liquid crystal (disk-like liquid crystal compound, discotic liquid crystal (compound)) according to the shape. Furthermore, each liquid crystal compound includes a low molecular weight type and a high molecular weight type. The term high molecular generally refers to a compound having a degree of polymerization of 100 or more (Polymer Physics-Phase Transition Dynamics, written by Masao Doi, p. 2, published by Iwanami Shoten, 1992). In the present invention, any liquid crystal compound can be used.

Two or more kinds of rod-like liquid crystals or two or more kinds of disk-like liquid crystals, or a mixture of a rod-like liquid crystal and a disk-like liquid crystal may be used.

As the rod-like liquid crystal, for example, those described in claim 1 in JP1999-513019A (JP-H11-513019A) and paragraphs [0026] to [0098] in JP2005-289980A can be preferably used. As the disk-like liquid crystal, for example, those described in paragraphs [0020] to [0067] in JP2007-108732A and paragraphs [0013] to [0108] in JP2010-244038A can be preferably used.

In the lamination type wavelength plate, it is preferable that the first $\lambda/2$ plate is formed of a polymerizable liquid crystal composition containing a disk-like liquid crystal, and one of the second $\lambda/2$ plate or the $\lambda/4$ plate is formed of a polymerizable liquid crystal composition containing a disk-like liquid crystal. In this case, it is preferable that the other of the second $\lambda/2$ plate or the $\lambda/4$ plate is formed of a polymerizable liquid crystal composition containing a rod-like liquid crystal.

It is more preferable that both the first $\lambda/2$ plate and the second $\lambda/2$ plate are formed of a polymerizable liquid crystal composition containing a disk-like liquid crystal. In this case, the $\lambda/4$ plate is preferably formed of a polymerizable liquid crystal composition containing a rod-like liquid crystal.

The retardation of the optically anisotropic layer formed of the polymerizable liquid crystal composition containing a rod-like liquid crystal can be adjusted by the thickness of the layer. For example, in a case where the $\lambda/2$ plate and the $\lambda/4$ plate are formed of the same composition, the thickness of the $\lambda/2$ plate may be twice that of the $\lambda/4$ plate.

The thicknesses of each of the $\lambda/2$ plate and the $\lambda/4$ plate may be adjusted in a range of preferably 0.5 to 10 µm, and more preferably 0.5 to 5 µm.

The liquid crystal compound used in the present invention may be a polymerizable liquid crystal compound having a polymerizable group.

The polymerizable liquid crystal compound may be a mixture of two or more kinds thereof, and in that case, at least one preferably has two or more polymerizable groups.

The optically anisotropic layer is preferably a layer formed by fixing the rod-like liquid crystal having a polymerizable group or the disk-like liquid crystal having a polymerizable group by polymerization. In this case, the liquid crystal compound no longer needs to exhibit liquid crystallinity after becoming the optically anisotropic layer.

The kind of the polymerizable group contained in the rod-like liquid crystal or the disk-like liquid crystal is not particularly limited. A functional group allowing an addition polymerization reaction is preferable, and a polymerizable ethylenically unsaturated group or a cyclic polymerizable group is preferable. More specifically, preferable examples thereof include a (meth)acryloyl group, a vinyl group, a styryl group, and an allyl group, and a (meth)acryloyl group is more preferable. A (meth)acryloyl group is a concept including both a methacryloyl group and an acryloyl group.

The method of forming an optically anisotropic layer formed of a composition containing a polymerizable liquid crystal compound is not limited, and examples thereof include known methods.

For example, a composition containing a polymerizable liquid crystal compound is applied to a predetermined substrate (including a temporary substrate) to form a coating film, the liquid crystal compound is aligned in the coating film, and then a curing treatment is performed to manufacture an optically anisotropic layer. An alignment film to be described later may be optionally used. Examples of the curing treatment include a light irradiation treatment such as ultraviolet irradiation, and a heat treatment.

A known method such as a wire bar coating method, an extrusion coating method, a direct gravure coating method, a reverse gravure coating method, and a die-coating method can be used for application of the composition.

In a case where the optically anisotropic layer is formed by curing a composition containing a polymerizable liquid crystal compound, the optically anisotropic layer can be provided by sequential coating or transfer.

That is, an optically anisotropic layer may be formed directly on a substrate constituting a lamination type wavelength plate or another optically anisotropic layer, or an optically anisotropic layer formed on a temporary substrate may be transferred onto a substrate or another optically anisotropic layer. For example, an optically anisotropic layer may be formed on a temporary substrate or a surface of an alignment film provided optionally on the temporary substrate through the above-described procedures, the optically anisotropic layer may be adhered to the substrate or another optically anisotropic layer with an adhesive layer, and then the temporary substrate, or the temporary substrate and the alignment film may be peeled off. By providing an optically anisotropic layer on an optically anisotropic layer by sequential application or transfer, no substrate is included between the optically anisotropic layers, and only the adhesive layer or only the adhesive layer and the alignment film are included.

The composition for forming an optically anisotropic layer may contain a component other than the above-described liquid crystal compound.

For example, the composition may contain a polymerization initiator. A polymerization initiator to be used is selected according to the form of the polymerization reaction, and examples thereof include a thermal polymerization initiator and a photopolymerization initiator. Examples of the photopolymerization initiator include α-carbonyl compound, acyloin ether, α-hydrocarbon-substituted aromatic acyloin compound, polynuclear quinone compound, and combination of triaryl imidazole dimer and p-aminophenyl ketone.

The amount of the polymerization initiator used is preferably 0.01 to 20 mass %, and more preferably 0.5 to 5 mass % with respect to the total solid content of the composition.

In addition, the composition for forming an optically anisotropic layer may contain a polymerizable monomer in view of the uniformity of the coating film and the hardness of the film.

Examples of the polymerizable monomer include a radically polymerizable or cationically polymerizable compound, and a polyfunctional radically polymerizable monomer is preferable. The polymerizable monomer is preferably copolymerizable with the above-described liquid crystal compound containing a polymerizable group. Examples thereof include those described in paragraphs [0018] to [0020] in JP2002-296423A.

The amount of the polymerizable monomer used is preferably 1 to 50 mass %, and more preferably 2 to 30 mass % with respect to the total mass of the liquid crystal compound.

In addition, the composition for forming an optically anisotropic layer may contain a surfactant in view of the uniformity of the coating film and the hardness of the film.

Examples of the surfactant include compounds which have been known, and a fluorine-based compound is particularly preferable. Specific examples thereof include the compounds described in paragraphs [0028] to [0056] of JP2001-330725A and the compounds described in paragraphs [0069] to [0126] of JP2005-062673A.

In addition, the composition for forming an optically anisotropic layer may contain a solvent. As the solvent, an organic solvent is preferably used.

Examples of the organic solvent include amides such as N,N-dimethylformamide, sulfoxides such as dimethyl sulfoxide, heterocyclic compounds such as pyridine, hydrocarbons such as benzene and hexane, alkyl halides such as chloroform and dichloromethane, esters such as methyl acetate, ethyl acetate, and butyl acetate, ketones such as acetone and methyl ethyl ketone, and ethers such as tetrahydrofuran and 1,2-dimethoxyethane. Among these, alkyl halides and ketones are preferable. Two or more kinds of organic solvents may be used in combination.

In addition, the composition for forming an optically anisotropic layer may contain various alignment agents such as vertical alignment accelerators, e.g., polarizer interface-side vertical alignment agents and air interface-side vertical alignment agents, and horizontal alignment accelerators, e.g., polarizer interface-side horizontal alignment agents and air interface-side horizontal alignment agents.

Furthermore, the composition for forming an optically anisotropic layer may contain an adhesion improver, a plasticizer, a polymer, and the like other than the above-described components.

<Other Layers>

In the optical system according to the embodiment of the present invention, the lamination type wavelength plate serving as the first quarter wavelength plate 1003 or the second quarter wavelength plate 1005 may include a layer other than the λ/2 plate and the λ/4 plate as long as the effects of the present invention are not impaired.

Examples of the layer include an alignment film, an adhesive layer, and a transparent support.

(Alignment Film)

The lamination type wavelength plate may include an alignment film having a function of defining the alignment direction of the liquid crystal compound.

The alignment film generally contains a polymer as a main component. The polymer material for an alignment film is described in many literatures, and many commercially available products are available. As the polymer material to be used, polyvinyl alcohol or polyimide and derivatives thereof are preferable. Modified or unmodified polyvinyl alcohol is particularly preferable.

Regarding the alignment film which can be used in the present invention, for example, the modified polyvinyl alcohols described from the 24th line on page 43 to the 8th line on page 49 in WO2001/088574A and in paragraphs [0071] to [0095] in JP3907735B can be referred to.

A known rubbing treatment is usually performed on the alignment film. That is, usually, the alignment film is preferably a rubbed alignment film subjected to the rubbing treatment.

The thickness of the alignment film is not limited, and is often 20 μm or less, preferably 0.01 to 10 μm, more preferably 0.01 to 5 μm, and even more preferably 0.01 to 1 μm.

(Adhesive Layer)

In the optical system according to the embodiment of the present invention, the lamination type wavelength plate, and a circularly polarizing plate and a display device which will be described later may include an adhesive layer between the layers in order to secure the adhesion between the layers.

In this specification, the "adhesion" is used as a concept including "pressure sensitive adhesion".

The adhesive layer may be formed of an adhesive or a pressure sensitive adhesive.

From the viewpoint of the curing method, the adhesive is a hot melt type, a thermosetting type, a photocuring type, a reaction curing type, or a pressure sensitive adhesion type which does not require curing. In addition, as materials of the adhesives of the respective curing methods, acrylate-based compounds, urethane-based compounds, urethane acrylate-based compounds, epoxy-based compounds, epoxy acrylate-based compounds, polyolefin-based compounds, modified olefin-based compounds, polypropylene-based compounds, ethylene vinyl alcohol-based compounds, vinyl chloride-based compounds, chloroprene rubber-based compounds, cyanoacrylate-based compounds, polyamide-based compounds, polyimide-based compounds, polystyrene-based compounds, polyvinyl butyral-based compounds, and the like can be used.

From the viewpoint of workability and productivity, a photocuring type is preferable as the curing method. In addition, from the viewpoint of optical transparency and heat resistance, acrylate-based compounds, urethane acrylate-based compounds, epoxy acrylate-based compounds, and the like are preferably used as the material.

Examples of the pressure sensitive adhesive include an acrylic pressure sensitive adhesive and a polyvinyl alcohol-based adhesive.

Each layer may be adhered using a high-transparency adhesive transfer tape (optical clear adhesive (OCA) tape). As the high-transparency adhesive transfer tape, a commercially available product for an image display device, especially a commercially available product for a surface of an image display portion of an image display device may be used. Examples of the commercially available product include pressure sensitive adhesive sheets (PD-S1 and the like) manufactured by PANAC CO., LTD. and pressure sensitive adhesive sheets of MHM series manufactured by Nichiei Kako Co., Ltd.

(Transparent Support)

The lamination type wavelength plate of the present invention may include a transparent support as a substrate or the like when an optically anisotropic layer is produced. As the transparent support, known transparent supports can be used. For example, as a material for forming the transparent support, cellulosic polymers (hereinafter, also referred to as cellulose acylate) represented by triacetyl cellulose, thermoplastic norbornene-based resins (ZEONEX and ZEONOR manufactured by ZEON CORPORATION, and ARTON manufactured by JSR Corporation), acrylic resins, and polyester-based resins can be used.

The transparent support is preferably an optically anisotropic layer satisfying nx≈ny>nz, that is, a positive C plate (positive C plate (+C plate)).

As described above, in the optical system according to the embodiment of the present invention, the retardance of the first quarter wavelength plate 1003 and the retardance of the second quarter wavelength plate are equal.

Specifically, as described above, the retardance R1 of the first quarter wavelength plate 1003 and the retardance R2 of the second quarter wavelength plate 1005 have the relationship of R1=−R2. That is, the first quarter wavelength plate 1003 and the second quarter wavelength plate 1005 are equal in magnitude of the retardance, and are opposite in positive and negative rotation angles.

In the optical system according to the embodiment of the present invention, various configurations can be used as a configuration for making the retardance of the first quarter wavelength plate 1003 and the retardance of the second quarter wavelength plate 1005 equal.

For example, in a case where both the first quarter wavelength plate 1003 and the second quarter wavelength plate 1005 are single layer type quarter wavelength plates, a configuration in which the same quarter wavelength plates are used as the first quarter wavelength plate 1003 and the second quarter wavelength plate 1005, and these are disposed so that slow axes thereof are orthogonal to each other is exemplified.

In addition, in a case where both the first quarter wavelength plate 1003 and the second quarter wavelength plate 1005 are the lamination type wavelength plates described above, a configuration in which the same optical members (optically anisotropic layers) are used as constituent members, the optical members are disposed in a mirror symmetric way with the half mirror 1004 as a center, and the same optical members in the first quarter wavelength plate 1003 and the second quarter wavelength plate 1005 are disposed so that optic axes thereof are orthogonal to each other is exemplified.

Figure 6:
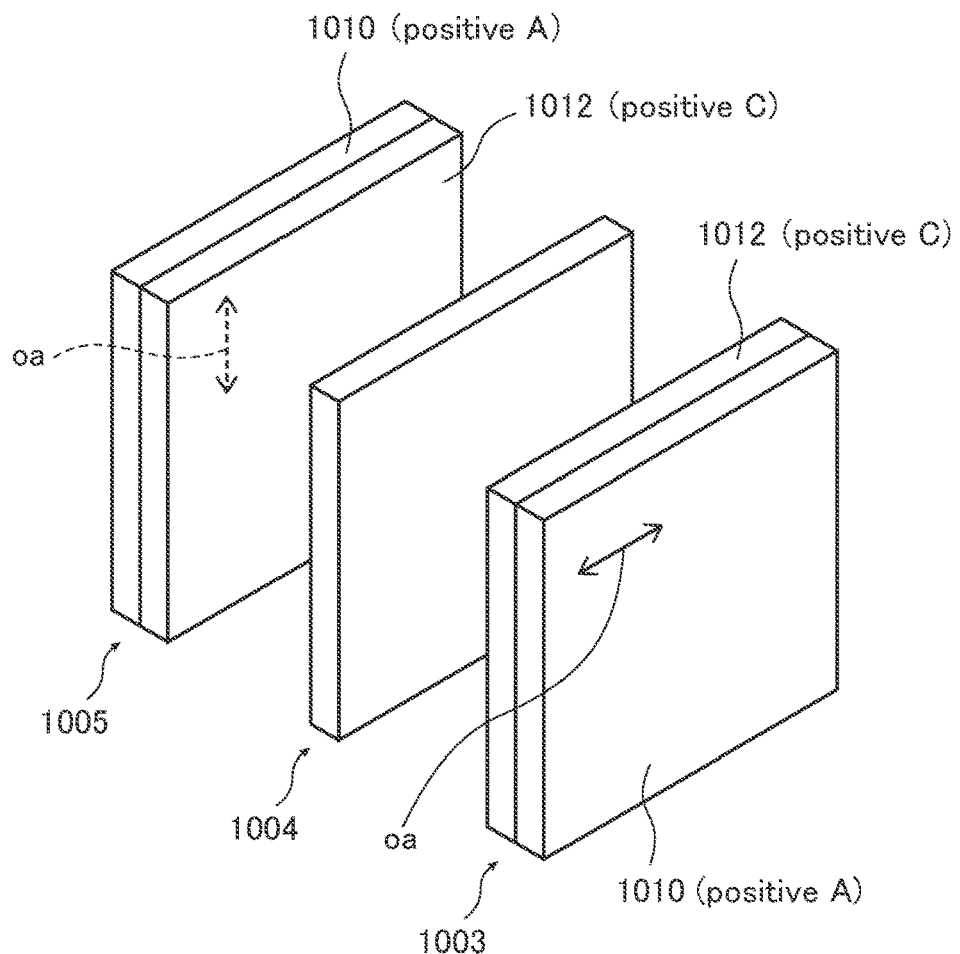
FIG. 6 shows a quarter wavelength plate configuration according to an embodiment of the present invention.

Specifically, for example, as shown in FIG. 6, the quarter wavelength plate is composed of a positive A plate and a positive C plate. In this case, the same positive A plates 1010 and the same positive C plates 1012 are used for the first quarter wavelength plate 1003 and the second quarter wavelength plate 1005. Then, for example, the first quarter wavelength plate 1003 is disposed so that the positive A plate 1010 and the positive C plate 1012 are provided in this order in the traveling direction of the light from the image display device 1001 to the reflective polarizer 1006. The second quarter wavelength plate 1005 is disposed in a mirror symmetric way with respect to the first quarter wavelength plate 1003 with the half mirror 1004 as a center so that the positive C plate 1012 and the positive A 1010 plate are provided in this order in the traveling direction of the light from the image display device 1001 to the reflective polarizer 1006. Then, the optic axes oa of the positive A plates 1010 are made orthogonal to each other in the first quarter wavelength plate 1003 and the second quarter wavelength plate 1005.

In addition, for example, the quarter wavelength plate 1003 and the second quarter wavelength plate 1005 each are composed of a positive A plate, a negative A plate, and a positive C plate. In this case, the same positive A plates, the same negative A plates, and the same positive C plates are used for the quarter wavelength plate 1003 and the second quarter wavelength plate 1005. Then, for example, the first quarter wavelength plate 1003 is disposed so that the positive A plate, the negative A plate, and the positive C plate are provided in this order in the traveling direction of the light from the image display device 1001 to the reflective polarizer 1006. The second quarter wavelength plate 1005 is disposed in a mirror symmetric way with respect to the first quarter wavelength plate 1003 with the half mirror 1004 as a center so that the positive C plate, the negative A plate, and the positive A plate are provided in this order in the traveling direction of the light from the image display device 1001 to the reflective polarizer 1006. Then, the optic axes of the positive A plates and the optic axes of the negative A plates are made orthogonal to each other in the quarter wavelength plate 1003 and the second quarter wavelength plate 1005.

In a case where both the first quarter wavelength plate 1003 and the second quarter wavelength plate 1005 are the lamination type wavelength plates described above, the retardance of the first quarter wavelength plate 1003 and the retardance of the second quarter wavelength plate 1005 can be made equal with such a configuration.

In the optical system according to the embodiment of the present invention, the method of making the retardance of the first quarter wavelength plate 1003 and the retardance of the second quarter wavelength plate equal is not limited to the method in which the two quarter wavelength plates are composed of the same optical members as described above.

That is, by using different optical members (optically anisotropic layers) as the first quarter wavelength plate 1003 and the second quarter wavelength plate 1005, and appropriately selecting the optical characteristics and the slow axis direction of each optical member, the retardance of the first quarter wavelength plate 1003 and the retardance of the second quarter wavelength plate 1005 can be made equal.

In one aspect, the first quarter wavelength plate 1003 uses a positive A plate and the second quarter wavelength plate 1005 uses a negative A plate as in the configuration shown in Example 22 to be described later. In this manner, the retardances in a front direction and in an oblique direction can be made equal.

(Optical Compensation Layer)

The optical system according to the embodiment of the present invention may include an optical compensation layer.

The optical compensation layer is a layer which compensates for the characteristics of light entering the respective optical members such as the linear polarizer 1002, the reflective polarizer 1006, the first quarter wavelength plate 1003, and the second quarter wavelength plate 1005 in a direction at a different angle with respect to the normal direction. In the following description, the light entering the optical member in a direction other than the normal direction is also referred to as "oblique light".

In general, two ideal polarizing plates whose absorption axes are orthogonal to each other do not transmit light entering in a normal direction (the above-described light entering in a front direction), and quench the light. Meanwhile, in a case where oblique light enters at an azimuthal angle different from the axial azimuth of the polarizing plate, the apparent axis deviates from the orthogonal direction, and thus the light leaks. Since the light leak leads to a ghost image of the optical system, the optical compensation layer is required to have a function of compensating for the deviation of the apparent axis with respect to the oblique light.

From this viewpoint, the optical compensation layer which compensates for light leak due to oblique light entering the linear polarizer 1002 and/or the reflective polarizer 1006 is preferably disposed between the linear polarizer 1002 and the reflective polarizer 1006.

In another aspect, the optical compensation layer has an effect of improving the brightness of a main image.

As described above, a main image 1101 obtained by the optical system according to the embodiment of the present invention is light among light rays emitted by the image display device 1001, that has passed through the linear polarizer 1002, the first quarter wavelength plate 1003, the half mirror 1004, and the second quarter wavelength plate 1005 in this order, been then reflected by the reflective polarizer 1006, been transmitted through the second quarter wavelength plate 1005, been reflected again by the half mirror 1004, been transmitted through the second quarter wavelength plate 1005, and been transmitted through the reflective polarizer 1006.

Since oblique light is not orthogonal to the apparent reflection axis and the apparent transmission axis of the reflective polarizer 1006, the brightness decreases in a case where the light is transmitted through the reflective polarizer 1006. From the viewpoint of suppressing the decrease in brightness, the optical compensation layer is preferably disposed between the half mirror 1004 and the reflective polarizer 1006, and is more preferably disposed between the second quarter wavelength plate 1005 and the reflective polarizer 1006. In addition, the optical compensation layer is preferably disposed between the linear polarizer 1002 and the half mirror 1004.

The optical compensation layer is composed of one layer or a plurality of layers. In the present invention, the optical compensation layer is preferably composed of one layer or two layers.

In a case where the optical compensation layer is composed of two layers, the optical compensation layer is a laminate of a first optically anisotropic layer and a second optically anisotropic layer.

The thickness of the optical compensation layer is not limited, and a thickness that can secure the necessary functions may be appropriately set according to the forming material and the like. However, from the viewpoint of reducing the thickness of the optical system, the optical compensation layer preferably has a small thickness as long as it does not impair the optical characteristics, mechanical properties, manufacturing suitability, and the like. The thickness of the optical compensation layer is preferably 1 to 150 μm, more preferably 1 to 70 μm, and even more preferably 1 to 30 μm.

The optical compensation layer is preferably a polymer film or a film (layer) formed of a liquid crystal composition from the viewpoint of ease of manufacturing.

As the polymer film, a cellulose acylate-based film, a cycloolefin-based polymer film (a polymer film formed of a cycloolefin-based polymer), an acrylic polymer film, and the like are preferable. The acrylic polymer film preferably contains an acrylic polymer containing at least one selected from a lactone ring unit, a maleic acid anhydride unit, or a glutaric acid anhydride unit.

As the film formed of a liquid crystal composition, films in which a liquid crystal compound is fixed in an aligned state are preferable. Among these, films which are formed by: forming a coating film by applying a composition containing a liquid crystal compound having a polymerizable group; aligning the liquid crystal compound in the coating film; and fixing the alignment of the liquid crystal compound through a curing treatment are more preferable.

Examples of the liquid crystal compound include a rod-like liquid crystal compound and a disk-like liquid crystal compound. In addition, the liquid crystal compound preferably has a polymerizable group in order to fix the alignment state.

In a case where the optical compensation layer is a film formed of a liquid crystal composition, the optical compensation layer may have an alignment film for aligning a liquid crystal compound. Various known alignment films can be used, and for example, the alignment films exemplified in the description of the lamination type wavelength plate are suitably used.

(In Case Where Optical Compensation Layer Consists of One Layer)

In a case where the optical compensation layer consists of one layer, it is preferable that Re1 (550) and Rth1 (550) of the optical compensation layer, that are an in-plane retardation value at a wavelength of 550 nm and a thickness-direction retardation value at a wavelength of 550 nm, respectively, satisfy Expressions (1) and (2).

$$200 \text{ nm} \leq Re1(550) \leq 400 \text{ nm} \qquad \text{Expression (1):}$$

$$-40 \text{ nm} \leq Rth1(550) \leq 40 \text{ nm} \qquad \text{Expression (2):}$$

In addition, it is more preferable that the optical compensation layer satisfies Expressions (3) and (4).

$$250 \text{ nm} \leq Re1(550) \leq 300 \text{ nm} \qquad \text{Expression (3):}$$

$$-20 \text{ nm} \leq Rth1(550) \leq 20 \text{ nm} \qquad \text{Expression (4):}$$

In addition, it is even more preferable that the optical compensation layer satisfies Expressions (5) and (6).

$$280 \text{ nm} \leq Re1(550) \leq 320 \text{ nm} \qquad \text{Expression (5):}$$

$$-20 \text{ nm} \leq Rth1(550) \leq 20 \text{ nm} \qquad \text{Expression (6):}$$

The optical compensation layer consisting of one layer is obtained by, for example, stretching a polymer film. Specifically, for example, in a case of a film formed of cellulose acetate benzoate that is cellulose acylate substituted with an aromatic acyl group, a method in which a dope prepared by dissolving cellulose acetate benzoate in a solvent is cast on a metal support for film formation, the solvent is dried to obtain a film, and the obtained film is stretched at a large stretching ratio of about 1.3 to 1.9 times to align cellulose molecular chains can be used.

In addition, the optical compensation layer consisting of one layer can be produced by, for example, bonding a shrinkable film to one side or both sides of a polymer film, and heating and stretching the film as described in JP1993-157911A (JP-H05-157911A), JP2006-072309A, and JP2007-298960A.

In the optical compensation layer, Re1 and Rth1 preferably exhibit reverse wavelength dispersibility.

Here, the reverse wavelength dispersibility means that the larger the wavelength λ, the larger the Re1 (λ) and Rth1 (λ).

It is preferable that the optical compensation layer has reverse wavelength dispersibility since a change in tint of a main image can be reduced.

(In Case where Optical Compensation Layer Consists of Two Layers)

As described above, in a case where the optical compensation layer is composed of two layers, the optical compensation layer is a laminate of a first optically anisotropic layer and a second optically anisotropic layer.

In a case where the optical compensation layer consists of two layers, the first optically anisotropic layer is preferably a biaxial film (−B plate or positive A plate) satisfying nx>ny≥nz, and the second optically anisotropic layer is preferably a [quasi]-uniaxial film (positive [quasi] C plate) satisfying nx≈ny<nz.

In addition, in a case where the optical compensation layer has this two-layer configuration, the optical compensation layer is preferably disposed between the linear polarizer 1002 and the first quarter wavelength plate 1003 and/or between the second quarter wavelength plate 1005 and the reflective polarizer 1006.

Specifically, it is preferable that Re1 (550) and Rth1 (550) of the first optically anisotropic layer, that are an in-plane retardation value at a wavelength of 550 nm and a thickness-direction retardation value at a wavelength of 550 nm, respectively, satisfy Expressions (5) and (6), and Re2 (550) and Rth2 (550) of the second optically anisotropic layer, that are an in-plane retardation value at a wavelength of 550 nm and a thickness-direction retardation value at a wavelength of 550 nm, respectively, satisfy Expressions (7) and (8).

$$80 \text{ nm} \leq Re1(550) \leq 200 \text{ nm} \qquad \text{Expression (5):}$$

$$20 \text{ nm} \leq Rth1(550) \leq 150 \text{ nm} \qquad \text{Expression (6):}$$

$$0 \text{ nm} \leq Re2(550) \leq 40 \text{ nm} \qquad \text{Expression (7):}$$

$$-160 \text{ nm} \leq Rth2(550) \leq -40 \text{ nm} \qquad \text{Expression (8):}$$

In addition, it is more preferable that the first optically anisotropic layer satisfies Expressions (9) and (10), and the second optically anisotropic layer satisfies Expressions (11) and (12).

$$100 \text{ nm} \leq Re1(550) \leq 170 \text{ nm} \qquad \text{Expression (9):}$$

$$50 \text{ nm} \leq Rth1(550) \leq 130 \text{ nm} \qquad \text{Expression (10):}$$

$$0 \text{ nm} \leq Re2(550) \leq 40 \text{ nm} \qquad \text{Expression (11):}$$

$$-140 \text{ nm} \leq Rth2(550) \leq -80 \text{ nm} \qquad \text{Expression (12):}$$

It is even more preferable that the first optically anisotropic layer satisfies Expressions (13) and (14), and the second optically anisotropic layer satisfies Expressions (15) and (16).

$$100 \text{ nm} \leq Re1(550) \leq 150 \text{ nm} \qquad \text{Expression (13):}$$

$$50 \text{ nm} \leq Rth1(550) \leq 120 \text{ nm} \qquad \text{Expression (14):}$$

$$0 \text{ nm} \leq Re2(550) \leq 20 \text{ nm} \qquad \text{Expression (15):}$$

$$-140 \text{ nm} \leq Rth2(550) \leq -80 \text{ nm} \qquad \text{Expression (16):}$$

In addition, in a case where the optical compensation layer consists of two layers and is disposed between the linear polarizer 1002 and the first quarter wavelength plate 1003, the slow axis direction of the first optically anisotropic layer is preferably parallel to the absorption axis direction of the linear polarizer 1002. In this case, it is preferable that the linear polarizer 1002, the second optically anisotropic layer, and the first optically anisotropic layer are disposed in this order in the traveling direction of the light from the image display device 1001.

Furthermore, in a case where the optical compensation layer consists of two layers and is disposed between the second quarter wavelength plate 1005 and the reflective polarizer 1006, the slow axis direction of the first optically anisotropic layer is preferably parallel to the reflection axis direction of the reflective polarizer 1006. In this case, it is preferable that the linear polarizer 1002, the second optically anisotropic layer, and the first optically anisotropic layer are disposed in this order in the traveling direction of the light from the image display device 1001.

In addition, as another aspect, in a case where the optical compensation layer consists of two layers and is disposed between the linear polarizer 1002 and the first quarter wavelength plate 1003, the slow axis of the first optically anisotropic layer is preferably orthogonal to the absorption axis of the linear polarizer 1002. In this case, it is preferable that the linear polarizer 1002, the first optically anisotropic layer, and the second optically anisotropic layer are disposed in this order in the traveling direction of the light from the image display device 1001.

Furthermore, in a case where the optical compensation layer consists of two layers and is disposed between the second quarter wavelength plate 1005 and the reflective polarizer 1006, the slow axis direction of the first optically anisotropic layer is preferably parallel to the reflection axis direction of the reflective polarizer 1006. In this case, it is preferable that the linear polarizer 1002, the first optically anisotropic layer, and the second optically anisotropic layer are disposed in this order.

The first optically anisotropic layer can be obtained by stretching a polymer film manufactured by an appropriate method such as a melt film forming method or a solution film forming method. Examples of the stretching method include a machine-direction stretching method using control of a circumferential speed of a roll, a cross-direction stretching method using a tenter, and a biaxial stretching method. Examples of the polymer film include a cellulose acylate film, a cyclic polyolefin film, and a polycarbonate film. More specifically, the description in JP2005-338767A can be referred to.

In addition, for the first optically anisotropic layer, a polymer formed of a liquid crystal composition containing a liquid crystal compound having a polymerizable group exhibiting biaxiality according to the alignment can also be used. Furthermore, as the first optically anisotropic layer, a layer having a desired retardation, which is formed by fixing the alignment state of a liquid crystal compound, can also be used. That is, the first optically anisotropic layer is preferably a film in which a liquid crystal compound is fixed in an aligned state, and more preferably a film in which a rod-like liquid crystal is fixed in an aligned state in a direction horizontal to the substrate surface.

As the liquid crystal compound, a liquid crystal compound exhibiting reverse wavelength dispersibility is also preferably used. Examples of the liquid crystal compound exhibiting reverse wavelength dispersibility include the liquid crystal compound exhibiting reverse wavelength dispersibility described in WO2017/043438A.

The thickness of the first optically anisotropic layer is not limited, and is preferably 1 to 80 μm, more preferably 1 to 40 μm, and even more preferably 1 to 25 μm.

The first optically anisotropic layer is preferably a positive A plate (positive A plate).

Examples of the second optically anisotropic layer include a film formed by stretching a polymer film, which is formed so that the in-plane retardation is not exhibited, in a thickness (nz) direction using a heat shrinkable film or the like. Examples of the polymer film include a cellulose acylate film, a cyclic polyolefin film, and a polycarbonate film.

In addition, as the second optically anisotropic layer, a layer having a desired retardation, which is formed by fixing the alignment state of a liquid crystal compound, can also be formed. That is, the second optically anisotropic layer is preferably a film in which a liquid crystal compound is fixed in an aligned state, and more preferably a film in which a rod-like liquid crystal is fixed in an aligned state in a direction orthogonal to the substrate surface.

As the liquid crystal compound, a liquid crystal compound exhibiting reverse wavelength dispersibility is also preferably used. Examples of the liquid crystal compound exhibiting reverse wavelength dispersibility include the liquid crystal compound exhibiting reverse wavelength dispersibility described in WO2017/043438A.

The thickness of the second optically anisotropic layer is not limited, and is preferably 1 to 80 µm, more preferably 1 to 40 µm, and even more preferably 1 to 25 µm.

The second optically anisotropic layer is preferably a positive C plate (positive C plate).

(Half Mirror)

The half mirror used in the optical system according to the embodiment of the present invention is a semipermeable optical member which regularly reflects a part of incident light and transmits the remaining light.

The half mirror may be a semipermeable reflecting material having no polarization selectivity, or a reflecting material having polarization selectivity. In a case where the half mirror is a reflecting material having polarization selectivity, the polarized light to be reflected and transmitted may be linearly polarized light or circularly polarized light.

(Reflective Polarizer)

The reflective polarizer used in the optical system according to the embodiment of the present invention is an optical member which regularly reflects one polarized light component among incident light rays and transmits the other polarized light component. The polarized light to be reflected and transmitted may be linearly polarized light or circularly polarized light. Above all, a reflective polarizer having linearly polarized light-selective reflection properties is preferable as the reflective polarizer. As described above, in the optical system shown in FIGS. 1A and 1B, the reflective polarizer 1006 is a reflective polarizer having linearly polarized light-selective reflection properties.

As the reflective polarizer having linearly polarized light-selective reflection properties, a film obtained by stretching a layer containing two kinds of polymers as described in JP2011-053705A, a wire grid polarizer, or the like can be used. From the viewpoint of brightness, a film obtained by stretching a layer containing a polymer is preferable. As a commercially available product thereof, a reflective type polarizer (trade name: APF) manufactured by 3M, a wire grid polarizer (trade name: WGF) manufactured by Asahi Kasei Corporation, and the like can be suitably used.

In a case where the reflective polarizer used in the present invention is a reflective polarizer having linearly polarized light-selective reflection properties, the transmission axis of the reflective polarizer can be optionally set according to the axial angle of other constituent elements, and the reflective polarizer is preferably disposed so that the transmission axis thereof forms an angle of about 450 with respect to the slow axis of the second quarter wavelength plate 1005.

Due to such a configuration, when the light reflected by the reflective polarizer 1006 is reflected by the half mirror 1004, passes through the second quarter wavelength plate 1005, and enters the reflective polarizer 1006 again, the polarization direction is rotated by about 90°. Accordingly, the transmittance of the light entering again the reflective polarizer 1006 can be increased, and the brightness of a main image 1101 can be increased.

The difference between the maximum value and the minimum value of the transmittance of the reflective polarizer 1006 in a transmission wavelength range is preferably small. Specifically, the difference between the maximum value and the minimum value of the transmittance of the reflective polarizer 1006 in a transmission wavelength range is preferably 3% or less, more preferably 2.5% or less, and even more preferably 2% or less.

In a case where the difference between the maximum value and the minimum value of the transmittance in a transmission wavelength range is adjusted to 3% or less, the influence of the wavelength with a low transmittance can be reduced, and thus an image having high brightness can be displayed.

In addition, the transmission axis of the reflective polarizer 1006 is preferably approximately orthogonal to the transmission axis of the linear polarizer 1002 used in the present invention.

In the optical system according to the embodiment of the present invention, as schematically shown in FIG. 1B, a linear polarizer 1007 may be provided on the visible side of the reflective polarizer 1006, that is, the reflective polarizer 1006 and a user.

The linear polarizer 1007 is a linear polarizer having a transmission axis in a direction orthogonal to the linearly polarized light reflected by the reflective polarizer 1006. That is, the linear polarizer 1007 is a linear polarizer having an absorption axis in a direction parallel to the reflection axis of the reflective polarizer 1006.

It is preferable that the optical system according to the embodiment of the present invention has the linear polarizer 1007 since a ghost image 1102 can be more suitably suppressed.

As described above, the ghost image 1102 is generated in a case where the light emitted by the image display device 1001 is transmitted without being reflected when first entering the reflective polarizer 1006, and is then visually recognized by the user. Regarding this, in a case where the linear polarizer 1007 having an absorption axis in a direction parallel to the reflection axis of the reflective polarizer 1006 is provided on the visible side of the reflective polarizer 1006, the linearly polarized light unnecessarily transmitted through the reflective polarizer 1006 can be blocked by the linear polarizer 1007. As a result, it is possible to prevent the linearly polarized light unnecessarily transmitted through the reflective polarizer 1006 from being visually recognized by the user as a ghost image 1102.

The linear polarizer 1007 is not limited, and various known transmission type linear polarizers can be used. Suitable examples thereof include those similar to the linear polarizer 1002 described above.

In the optical system according to the embodiment of the present invention shown in FIGS. 1A and 1B, an absorption type polarizer may be disposed on a surface of the reflective polarizer 1006 opposite to the image display device 1001 so that the transmission axis of the absorption type polarizer coincides with the reflective polarizer 1006. In this manner, the light reflected by the skin or the like of a user wearing the optical system is prevented from directly entering the reflective polarizer 1006 and from being reflected, and thus stray light worsening the visibility of a main image 1101 can be suppressed.

In addition, an appropriate retardation plate may be provided between the reflective polarizer and the absorption type polarizer to convert the light transmitted through the reflective polarizer, that becomes a main image, into the polarized light of the transmission axis of the absorption type polarizer.

The above-described optical system shown in FIGS. 1A and 1B has the half mirror 1004, the second quarter wavelength plate 1005, and the reflective polarizer 1006 in this order. Moreover, light reciprocates between the half mirror 1004 and the reflective polarizer 1006 which selectively reflects linearly polarized light, so that the length of an optical path is increased in the limited space, and the miniaturization of the optical system is realized.

Regarding this, in another aspect of the present invention, a reflective polarizer which selectively reflects circularly polarized light is used instead of the second quarter wavelength plate 1005 and the reflective polarizer 1006 which selectively reflects linearly polarized light. In this aspect, light reciprocates between the half mirror 1004 and the reflective polarizer which selectively reflects circularly polarized light, so that the length of an optical path is increased in the limited space, and the miniaturization of the optical system is realized.

The reflective polarizer which selectively reflects circularly polarized light is a reflective polarizer which selectively reflects one of dextrorotatory circularly polarized light and levorotatory circularly polarized light and transmits the other. In the following description, such a polarizer is also referred to as "reflection circular polarizer".

As the reflection circular polarizer, a reflective polarizer having at least one cholesteric liquid crystal layer can be used.

The cholesteric liquid crystal layer may be a single layer or may have a multilayer structure of two or more layers. In a case where the cholesteric liquid crystal layer has two or more layers, lamination coating, lamination bonding, or lamination transfer may be performed. Otherwise, these may be performed in combination.

The cholesteric liquid crystal layer preferably has specular reflection properties.

In addition, the reflection circular polarizer may be provided with an antireflection layer for suppressing surface reflection on either one or both of the cholesteric liquid crystal layer side and the opposite substrate side.

Figure 2:
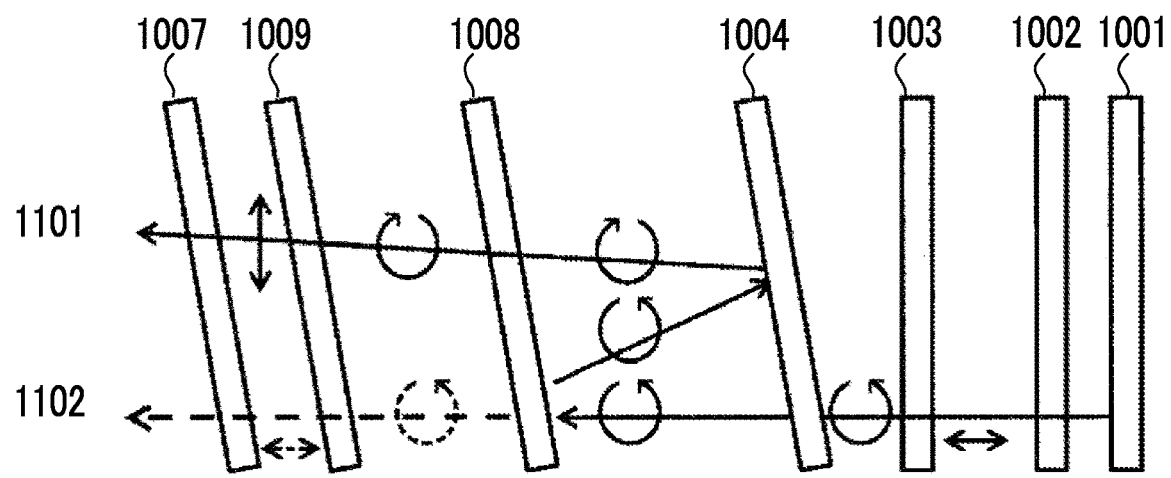
FIG. 2 shows another embodiment of the optical system of the present invention.

FIG. 2 shows an example of a configuration of an optical system according to the embodiment of the present invention having an aspect using a reflective polarizer (reflection circular polarizer) which selectively reflects circularly polarized light.

As shown in FIG. 2, the optical system according to the embodiment of the present invention using the reflection circular polarizer has an image display device 1001, a linear polarizer 1002, a first quarter wavelength plate 1003, a half mirror 1004, and a reflection circular polarizer 1008. In addition, as a preferable aspect, the optical system shown in FIG. 2 has a third quarter wavelength plate 1009 and a linear polarizer 1007 in this order, which are closer to the visible side than the reflection circular polarizer 1008.

Since the optical system shown in FIG. 2 uses the same members as those of the optical system shown in FIGS. 1A and 1B, the same members will be denoted by the same references, and different members will be mainly described below.

In the optical system shown in FIG. 2, a main image 1101 is visually recognized by a user as follows.

Among light rays (light that carries and supports an image) emitted by the image display device 1001, linearly polarized light that has passed through the linear polarizer 1002 is converted into circularly polarized light by the first quarter wavelength plate 1003, and a part thereof is transmitted through the half mirror 1004 as in the example shown in FIGS. 1A and 1B.

The circularly polarized light that has been transmitted through the half mirror 1004 enters the reflection circular polarizer 1008.

The reflection circular polarizer 1008 is a reflection circular polarizer having a cholesteric liquid crystal layer which selectively reflects the circularly polarized light converted by the first quarter wavelength plate 1003. In other words, a transmission axis of the linear polarizer 1002 and a slow axis of the first quarter wavelength plate 1003 are set so that the circularly polarized light converted by the first quarter wavelength plate 1003 turns into circularly polarized light in a revolution direction that is selectively reflected by the cholesteric liquid crystal layer of the reflection circular polarizer 1008.

In the example shown in the drawing, for example, the light transmitted through the first quarter wavelength plate 1003 is converted into levorotatory circularly polarized light. Accordingly, the reflection circular polarizer 1008 (cholesteric liquid crystal layer) selectively reflects the levorotatory circularly polarized light.

A part of the levorotatory circularly polarized light reflected by the reflection circular polarizer 1008 is reflected by the half mirror 1004. At the time of reflection by the half mirror 1004, the levorotatory circularly polarized light turns into dextrorotatory circularly polarized light in the reverse revolution direction.

The dextrorotatory circularly polarized light reflected by the half mirror 1004 enters again the reflection circular polarizer 1008. As described above, the reflection circular polarizer 1008 selectively reflects levorotatory circularly polarized light. The circularly polarized light becomes levorotatory circularly polarized light in a case where it first enters the reflection circular polarizer 1008, and is reflected by the reflection circular polarizer 1008. However, in a case where the circularly polarized light enters again the reflection circular polarizer 1008, due to the reflection by the half mirror 1004, the revolution direction is reversed from that at the time when the circularly polarized light enters first, and the light turns into dextrorotatory circularly polarized light.

Therefore, the dextrorotatory circularly polarized light entering again the reflection circular polarizer 1008 is transmitted through the reflection circular polarizer 1008 and is visually recognized by a user as a main image 1101.

In this optical system, light reciprocates between the half mirror 1004 and the reflection circular polarizer 1008, so that the length of an optical path can be increased in the limited space, and this contributes to the miniaturization of the optical system.

In addition, in the optical system shown in FIG. 2, the reflective polarizer is the reflection circular polarizer 1008 which selectively reflects circularly polarized light. Therefore, the reflection circular polarizer 1008 basically reflects circularly polarized light in a revolution direction that is selectively reflected regardless of the direction of the slow axis of the first quarter wavelength plate 1003. As a result, even in the optical system shown in FIG. 2, the light that is unnecessarily transmitted through the reflection circular polarizer 1008 and becomes a ghost image 1102 can be reduced, and the ghost image 1102 which is visually recognized by a user can thus be reduced.

As a preferable aspect, the optical system shown in FIG. 2 has a third quarter wavelength plate 1009 and a linear polarizer 1007 in this order on the visible side of the reflection circular polarizer 1008 in order to suppress stray light or the like that becomes a ghost image 1102.

A slow axis of the third quarter wavelength plate 1009 and a transmission axis of the linear polarizer 1007 are set so that the circularly polarized light transmitted through the reflection circular polarizer 1008, that is the dextrorotatory circularly polarized light in the example shown in the drawing, is converted by the third quarter wavelength plate 1009 and becomes linearly polarized light that is transmitted through the linear polarizer 1007.

As the third quarter wavelength plate 1009, various known quarter wavelength plates can be used as in the case of the above-described first quarter wavelength plate 1003 and the like.

Here, in the optical system shown in FIG. 2, as described above, the reflection circular polarizer 1008 selectively reflects circularly polarized light. Accordingly, the relationship between the first quarter wavelength plate 1003 and the third quarter wavelength plate 1009 in terms of retardance is not limited.

As described above, according to the optical system shown in FIG. 2, the reflection circular polarizer 1008 is used to reduce the circularly polarized light that is unnecessarily transmitted through the reflection circular polarizer 1008 and becomes a ghost image 1102.

However, a part of the circularly polarized light that is emitted by the image display device 1001, passes through the linear polarizer 1002, is converted into circularly polarized light by the first quarter wavelength plate 1003, and is transmitted through the half mirror 1004 is transmitted without being reflected by the reflection circular polarizer 1008.

The circularly polarized light transmitted through the reflection circular polarizer 1008 in a case where it first enters the reflection circular polarizer 1008 becomes a ghost image 1102 and is visually recognized by a user.

In U.S. Ser. No. 10/495,798B, a configuration in which three layers of cholesteric liquid crystal cells having different transmission ranges are used as a reflection circular polarizer is exemplified, and this case has problems in that a ghost image is likely to be generated due to a large change in reflectivity/transmittance in a selective reflection wavelength range, and the brightness of a main image is reduced.

In contrast, the optical system shown in FIG. 2 has the third quarter wavelength plate 1009 and the linear polarizer 1007 which are closer to the visible side than the reflection circular polarizer 1008. As described above, the slow axis of the third quarter wavelength plate 1009 and the transmission axis of the linear polarizer 1007 are set so that the circularly polarized light reflected by the half mirror 1004 and transmitted through the reflection circular polarizer 1008, that is the dextrorotatory circularly polarized light in the example shown in the drawing, is converted by the third quarter wavelength plate 1009 and becomes linearly polarized light in a direction of transmission through the linear polarizer 1007.

The light first entering the reflection circular polarizer 1008 is circularly polarized light in a revolution direction that is reflected by the reflection circular polarizer 1008, and in the example shown in the drawing, the circularly polarized light is levorotatory circularly polarized light. That is, the circularly polarized light that first enters the reflection circular polarizer 1008 and is unnecessarily transmitted is also levorotatory circularly polarized light in a revolution direction to be reflected by the reflection circular polarizer 1008.

Accordingly, the levorotatory circularly polarized light transmitted through the reflection circular polarizer 1008 is converted by the third quarter wavelength plate 1009 and becomes linearly polarized light in a direction orthogonal to the transmission axis of the linear polarizer 1007. As a result, the linearly polarized light is blocked by the linear polarizer 1007, and is not visually recognized by a user as a ghost image 1102.

The reflection circular polarizer 1008 used in the optical system of FIG. 2 has at least one cholesteric liquid crystal layer. In a case where the reflection circular polarizer 1008 has two or more cholesteric liquid crystal layers, each cholesteric liquid crystal layer may be laminated by a known method such as lamination coating, lamination bonding, or lamination transfer, or a plurality of layers may be laminated by performing the above methods in combination.

In addition, the reflection circular polarizer may be provided with an antireflection layer for suppressing surface reflection on either one or both of the liquid crystal layer side and the opposite substrate side.

As is well known, the cholesteric liquid crystal layer is obtained by fixing a cholesteric liquid crystalline phase in which a liquid crystal compound is cholesterically aligned. The cholesteric liquid crystalline phase is a liquid crystalline phase in which a liquid crystal compound is spirally turned in a thickness direction and aligned.

The cholesteric liquid crystal layer has wavelength-selective reflection properties according to the spiral pitch of the spiral structure of the liquid crystal compound which is spirally turned and aligned. Specifically, the longer the spiral pitch, the longer the wavelength of circularly polarized light selectively reflected by the cholesteric liquid crystal layer. The spiral pitch of the spiral structure in the cholesteric liquid crystal layer is a length in the thickness direction (spiral axis direction) in which the spirally aligned liquid crystal compound (optic axis) rotates 360°.

In addition, the cholesteric liquid crystal layer has circularly polarized light-selective reflection/transmission properties of reflecting either dextrorotatory circularly polarized light or levorotatory circularly polarized light according to the spiral revolution direction of the spiral structure of the cholesteric liquid crystalline phase, and transmitting the opposite circularly polarized light. As described above, in the example shown in the drawing, the cholesteric liquid crystal layer of the reflection circular polarizer 1008 selectively reflects levorotatory circularly polarized light and transmits dextrorotatory circularly polarized light.

The reflection circular polarizer 1008 used in the optical system according to the embodiment of the present invention is required to reflect/transmit light in a visible light range according to the wavelength range of colors that can be displayed by the image display device 1001, that is, the emission spectrum of the image display device 1001. That is, the wider the wavelength range of the emission spectrum of the image display device 1001, the more it is necessary to reflect the light in a wider visible light range.

Therefore, in one aspect of the optical system according to the embodiment of the present invention using the reflection circular polarizer 1008 having a cholesteric liquid crystal layer, at least one cholesteric liquid crystal layer of the reflection circular polarizer has a pitch gradient structure in which the spiral pitch changes in the thickness direction.

The reflection circular polarizer 1008 having a cholesteric liquid crystal layer has, for example, a support, an alignment film formed on a surface of the support, and a cholesteric liquid crystal layer formed on a surface of the alignment film. In the cholesteric liquid crystal layer having a pitch gradient structure, for example, the spiral pitch gradually increases or decreases in a direction to be separated from the alignment film in the thickness direction.

The cholesteric liquid crystal layer having a pitch gradient structure is suitably used in a case where, for example, an image display device in which the emission spectrum during white display spans a wide wavelength range, such as a liquid crystal display device having a backlight unit using a white light source such as a fluorescent lamp, is used as the image display device 1001.

In the following description, such an image display device 1001 is also referred to as "broadband light source type image display device 1001" for convenience.

As described above, the cholesteric liquid crystal layer selectively reflects circularly polarized light of a wavelength according to the length of the spiral pitch of the spiral structure.

In the cholesteric liquid crystal layer having a pitch gradient structure, the spiral pitch changes in the layer thickness direction. Therefore, the cholesteric liquid crystal layer has a wider selective reflection/transmission wavelength range than a layer with a fixed cholesteric liquid crystalline phase having a uniform spiral pitch, and exhibits selective reflection/transmission properties in a wide wavelength range.

This feature is different from that in a configuration in which a plurality of cholesteric liquid crystal layers having different fixed spiral pitches are laminated as described in U.S. Ser. No. 10/495,798B exemplified above as an example of the related art. That is, due to the effect of the pitch gradient structure, the change in reflectivity/transmittance in a selective reflection wavelength range is reduced, and it is possible to achieve both the reduction of a ghost image and the improvement of brightness of a main image as compared with an example of the related art in which the reflectivity/transmittance greatly changes.

Specifically, the reflection wavelength range of the cholesteric liquid crystal layer is preferably 1 to 100 nm, more preferably 1 to 150 nm, and even more preferably 1 to 200 nm. In this example, the reflection wavelength range of the cholesteric liquid crystal layer described above is shown as an example, but the reflection wavelength range of the reflection circular polarizer 1008 is not limited to the example since it may be set according to the full width at half maximum of the maximal value of the light source spectrum of the image display device 1001.

In a case where a cross-section (a cross-section in the thickness direction) of the cholesteric liquid crystal layer is observed by a scanning electron microscope (SEM), a stripe pattern derived from the spiral structure of the cholesteric liquid crystalline phase, in which bright portions (bright lines) and dark portions (dark lines) parallel to the main surface are alternately provided in the thickness direction, is observed in a SEM image of the cross-section. Two bright portions and two dark portions correspond to the spiral pitch in the spiral structure of the cholesteric liquid crystal layer.

In a usual cholesteric liquid crystal layer, the intervals between bright portions and dark portions are constant in the thickness direction.

In contrast, in the cholesteric liquid crystal layer having a pitch gradient structure, the intervals between bright portions and dark portions change in the thickness direction. For example, in the cholesteric liquid crystal layer having a pitch gradient structure, the intervals between bright portions and dark portions gradually increase or decrease in a direction to be separated from the alignment film in the thickness direction.

For example, the cholesteric liquid crystal layer having a pitch gradient structure can be formed as follows.

In general, a cholesteric liquid crystal layer is formed of a liquid crystal composition containing a polymerizable liquid crystal compound, a chiral agent for spirally aligning the liquid crystal compound, a polymerization initiator, and the like. The cholesteric liquid crystal layer is formed as follows: the liquid crystal composition is applied to a surface of the alignment film, the liquid crystal compound is spirally aligned by heating or the like, and then polymerized by ultraviolet irradiation or the like to obtain a liquid crystal polymer, and the composition is cured.

The cholesteric liquid crystal layer having a pitch gradient structure can be formed as follows: using a chiral agent whose helical twisting power (HTP) changes by light irradiation, light irradiation for changing the HTP of the chiral agent is performed prior to or simultaneously with the spiral alignment of the liquid crystal compound, and then the composition is cured. For example, in a case where using a chiral agent whose HTP is reduced by light irradiation, light irradiation for changing the HTP is performed from a side opposite to the alignment film, a cholesteric liquid crystal layer having a pitch gradient structure in which the spiral pitch gradually increases in a direction to be separated from the alignment film in the thickness direction is obtained.

The polymerizable liquid crystal compound may be a rod-like liquid crystal compound or a disk-like liquid crystal compound.

Examples of the rod-like polymerizable liquid crystal compound which forms the cholesteric liquid crystalline phase include a rod-like nematic liquid crystal compound. As the rod-like nematic liquid crystal compound, azomethines, azoxys, cyanobiphenyls, cyanophenyl esters, benzoic acid esters, cyclohexanecarboxylic acid phenyl esters, cyanophenylcyclohexanes, cyano-substituted phenylpyrimidines, alkoxy-substituted phenylpyrimidines, phenyldioxanes, tolans, alkenylcyclohexylbenzonitriles, and the like are preferably used. Not only low-molecular-weight liquid crystal compounds but also high-molecular-weight liquid crystal compounds can be used.

As the disk-like liquid crystal compound, for example, those described in JP2007-108732A and JP2010-244038A can be preferably used.

The chiral agent has a function of inducing a spiral structure of the cholesteric liquid crystalline phase. Since the sense or spiral pitch of the spiral to be induced vary from compound to compound, the chiral compound may be selected according to the purpose.

Known compounds can be used as the chiral agent, and the chiral agent preferably has a cinnamoyl group. In the formation of the cholesteric liquid crystal layer having a pitch gradient structure, a chiral agent whose HTP changes by light irradiation is used as described above. As the chiral agent whose HTP changes by light irradiation, various known chiral agents can be used.

Examples of the chiral agent include the compounds described in Liquid Crystal Device Handbook, Chapter 3, Section 4-3, TN, STN Chiral Agents, p. 199, the 142nd Committee of Japan Society for Promotion of Science, 1989), JP2003-287623A, JP2002-302487A, JP2002-80478A, JP2002-80851A, JP2010-181852A, and JP2014-034581A.

In the optical system according to the embodiment of the present invention using the broadband light source type image display device 1001, at least one cholesteric liquid crystal layer of the reflection circular polarizer 1008 may have a pitch gradient structure.

Accordingly, for example, in a case where the reflection circular polarizer 1008 has two cholesteric liquid crystal layers, only one layer may have a pitch gradient structure, and the other layer may be a usual cholesteric liquid crystal layer. In this case, for example, a configuration in which a cholesteric liquid crystal layer having a pitch gradient structure selectively reflects red light and green light, and a usual cholesteric liquid crystal layer selectively reflects blue light, and a configuration in which a cholesteric liquid crystal layer having a pitch gradient structure selectively reflects green light to blue light and a usual cholesteric liquid crystal layer selectively reflects red light are exemplified.

Otherwise, in a case where the reflection circular polarizer 1008 has two cholesteric liquid crystal layers, both the two cholesteric liquid crystal layers may be cholesteric liquid crystal layers having a pitch gradient structure.

Furthermore, the reflection circular polarizer 1008 may have only one cholesteric liquid crystal layer having a pitch gradient structure, and the cholesteric liquid crystal may reflect all of red light, green light, and blue light.

In the aspect in which the reflection circular polarizer 1008 having a cholesteric liquid crystal layers used in the optical system according to the embodiment of the present invention, a configuration in which the reflection circular polarizer 1008 has only a usual cholesteric liquid crystal layer having no pitch gradient structure can also be used.

Specifically, in a case where the image display device 1001 is a device using a light source in which the light source spectrum during white display has at least two or more maximal values in a visible range, and the full width at half maximum of a peak corresponding to each maximal value is 60 nm or less, a reflection circular polarizer 1008 having only a usual cholesteric liquid crystal layer is suitably used.

Examples of such an image display device 1001 include a liquid crystal display using a backlight unit which has a blue light source such as a blue light emitting diode (LED) and a wavelength conversion layer including quantum dots, and emits blue light emitted by the blue light source, and red light and green light obtained by converting the blue light by the quantum dots to apply white light.

In addition, even in a case where the image display device 1001 is a self-luminous image display device such as a micro light emitting diode (LED) display, a reflection circular polarizer 1008 having only a usual cholesteric liquid crystal layer is suitably used.

In the following description, such an image display device 1001 is also referred to as "multipeak type image display device 1001" for convenience.

In such a multipeak type image display device 1001, the emission spectrum during white display has at least two maximal values unlike a case of the above-described broadband light source type image display device 1001. That is, the spectrum of the light of the image displayed by the multipeak type image display device 1001 does not have an emission spectrum in a wide wavelength range as in the above-described broadband light source type image display device 1001, but has peaks corresponding to red light, green light, and blue light, respectively.

Accordingly, the cholesteric liquid crystal layer constituting the reflection circular polarizer 1008 does not need to have selective reflection characteristics over the wide wavelength range as in the pitch gradient configuration, and may reflect only light of a wavelength range corresponding to the respective peaks of the colors.

In response to this, in a case where the multipeak type image display device 1001 is used, the reflection wavelength range of the cholesteric liquid crystal layer constituting the reflection circular polarizer 1008, which corresponds to any one maximal value of the spectrum during white display of the image display device 1001, is equal to or wider than a wavelength range of the full width at half maximum of a peak (emission profile) of the corresponding maximal value and is equal to or narrower than a wavelength range at 5% of the corresponding maximal value.

In a case where the multipeak type image display device 1001 is used, at least one cholesteric liquid crystal layer, preferably all of the cholesteric liquid crystal layers of the reflection circular polarizer 1008 have the above reflection wavelength range. The cholesteric liquid crystal layer may satisfy the conditions of the reflection wavelength range in the full width at half maximum in the reflection wavelength characteristics (reflection profile).

Hereinafter, description will be given with reference to FIG. 5.

Figure 5:
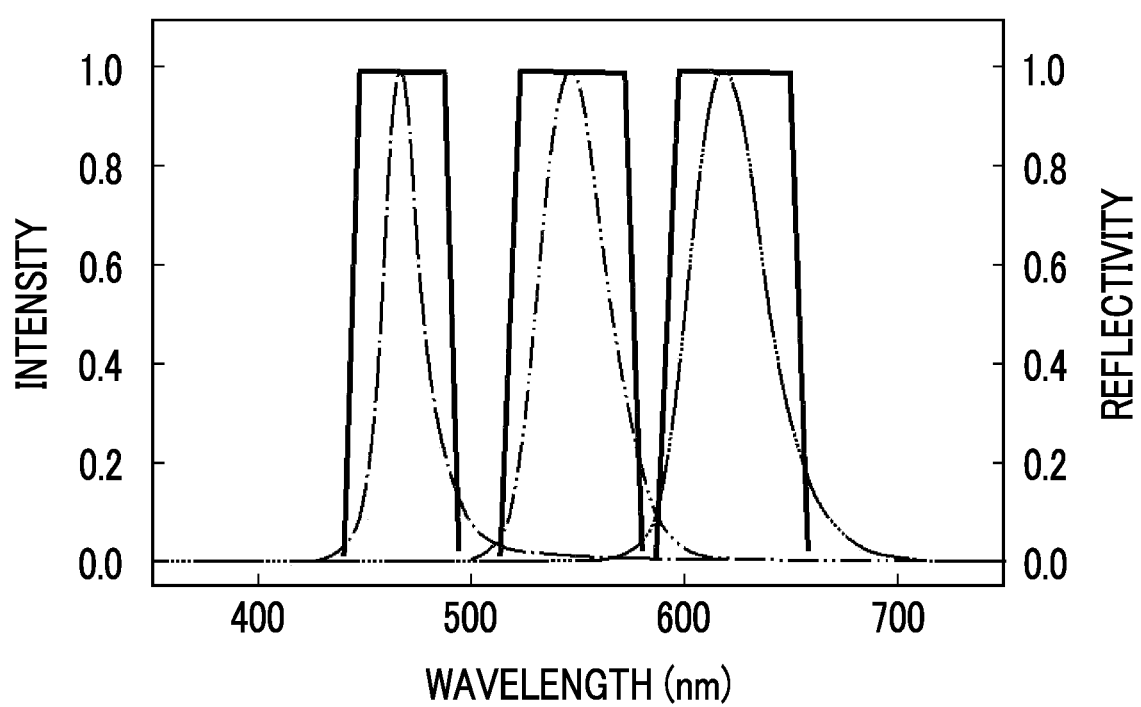
FIG. 5 is a graph for describing a further embodiment of the optical system of the present invention.

In FIG. 5, the solid lines represent the reflection wavelength characteristics of the cholesteric liquid crystal layer, and the chain lines represent the emission spectrum of the image display device 1001 during white display.

In FIG. 5, the horizontal axis represents the wavelength. In addition, the left side of the vertical axis represents the luminescence intensity corresponding to the emission spectrum, standardized by setting the maximum intensity to 1. Furthermore, the right side of the vertical axis represents the reflectivity corresponding to the reflection wavelength characteristics, standardized by setting the maximum reflectivity to 1.

As shown in FIG. 5, the multipeak type image display device 1001 has a peak of blue light represented by the alternate long and short dash line, a peak of green light represented by the alternate long and two short dashes line, and a peak of red light represented by the alternate long and three short dashes line in a case where white display is performed. That is, in this example, the emission spectrum of the image display device 1001 during white display has three maximal values (peak tops).

In response to this, the reflection circular polarizer 1008 has three cholesteric liquid crystal layers.

One layer is a cholesteric liquid crystal layer corresponding to the peak of blue light represented by the alternate long and short dash line. This cholesteric liquid crystal layer has a reflection wavelength range which is wider than a wavelength range of the full width at half maximum of the peak of blue light, that is, under an intensity of 0.5, and is narrower than a wavelength range at 5% of the maximal value of blue light, that is, under an intensity of 0.05.

Another layer is a cholesteric liquid crystal layer corresponding to the peak of green light represented by the alternate long and two short dashes line. This cholesteric liquid crystal layer has a reflection wavelength range which is wider than a wavelength range of the full width at half maximum of the peak of green light, that is, under an intensity of 0.5, and is narrower than a wavelength range at 5% of the maximal value of green light, that is, under an intensity of 0.05.

A further layer is a cholesteric liquid crystal layer corresponding to the peak of red light represented by the alternate long and three short dashes line. This cholesteric liquid crystal layer has a reflection wavelength range which is wider than a wavelength range of the full width at half maximum of the peak of red light, that is, under an intensity of 0.5, and is narrower than a wavelength range at 5% of the maximal value of red light, that is, under an intensity of 0.05.

In a case where such a multipeak type image display device 1001 is used in the optical system according to the embodiment of the present invention, the reflection wavelength range of the cholesteric liquid crystal layer constituting the reflection circular polarizer 1008 is required to include the wavelength at the maximal value of the corresponding peak of the image display device 1001.

Here, it is preferable that the center of the reflection wavelength range of the cholesteric liquid crystal layer is positioned on the longer wavelength side than the maximal value of the corresponding peak of the image display device 1001.

As is well known, in a case where oblique light enters the cholesteric liquid crystal layer, the cholesteric liquid crystal layer exhibits a so-called blue shift (short-wave shift) in which the reflection wavelength range shifts to the short wavelength side. Therefore, in a case where the center of the reflection wavelength range of the cholesteric liquid crystal layer is positioned on the slightly longer wavelength side than the maximal value of the corresponding peak of the image display device 1001, the cholesteric liquid crystal layer can suitably reflect light of a predetermined wavelength range even in a case where a blue shift occurs.

In the optical system according to the embodiment of the present invention, even in a case where the multipeak type image display device 1001 is used, the reflection circular polarizer 1008 may optionally have at least one cholesteric liquid crystal layer having a pitch gradient structure.

In the optical system according to the embodiment of the present invention using the reflection circular polarizer 1008, the difference in transmittance in a visible light region is preferably small in the reflection circular polarizer 1008. Specifically, the difference between the maximum value and the minimum value of the transmittance of the reflection circular polarizer 1008 in a visible light region is preferably 3% or less, more preferably 2.5% or less, and even more preferably 2% or less.

In a case where the difference between the maximum value and the minimum value of the transmittance in a visible light region is adjusted to 3% or less, the color balance of a main image 1101 can be made suitable. In addition, the influence of wavelengths at which the reflectivity is low is reduced, and thus a main image 1101 having high brightness can be displayed.

The optical system according to the embodiment of the present invention having the reflection circular polarizer 1008 preferably has at least one retardation layer obtained by fixing the vertical alignment of a liquid crystal compound having a polymerizable group.

Alternatively, in the optical system according to the embodiment of the present invention, the reflection circular polarizer 1008 preferably has, as cholesteric liquid crystal layers, a rod-like cholesteric liquid crystal layer consisting of a rod-like liquid crystal compound and a disk-like cholesteric liquid crystal layer obtained by vertically aligning and fixing a disk-like liquid crystal compound (discotic liquid crystal compound).

The rod-like cholesteric liquid crystal layer and the disk-like cholesteric liquid crystal layer each may be a single layer, or a plurality of the rod-like cholesteric liquid crystal layers and a plurality of the disk-like cholesteric liquid crystal layers may be provided.

In this case, the rod-like cholesteric liquid crystal layer and the disk-like cholesteric liquid crystal layer are different in central wavelength (central wavelength of selective reflection) of light that is selectively reflected. That is, the rod-like cholesteric liquid crystal layer and the disk-like cholesteric liquid crystal layer selectively reflect different colors (wavelength ranges) of light although their wavelength ranges may partially overlap.

In addition, in a case where one or more cholesteric liquid crystal layers constituting the reflection circular polarizer 1008 have a pitch gradient structure, any one or both of the rod-like cholesteric liquid crystal layer and the disk-like cholesteric crystal layer may have the pitch gradient structure. It is preferable that the rod-like cholesteric liquid crystal layer has a pitch gradient structure in terms of ease of production and the like.

The cholesteric liquid crystal layer constituting the reflection circular polarizer 1008 has an optical retardation in a case where oblique light enters, that is, light enters in a direction other than the normal, whereby Rth that is a thickness-direction retardation is generated. In a case where Rth is generated, the incident circularly polarized light collapses and becomes elliptically polarized light. Since the elliptically polarized light is converted into a circularly polarized light component and a linearly polarized light component, the linearly polarized light component is not reflected by the cholesteric liquid crystal layer and is transmitted.

That is, in a case where oblique light enters the reflection circular polarizer 1008, the leakage light unnecessarily transmitted through the reflection circular polarizer 1008 that is shown by the broken line in FIG. 2, increases, and a ghost image 1102 is easily visually recognized.

Regarding this, the optical system according to the embodiment of the present invention having the reflection circular polarizer 1008 preferably has at least one retardation layer obtained by fixing the vertical alignment of a liquid crystal compound having a polymerizable group. Alternatively, in the optical system according to the embodiment of the present invention having the reflection circular polarizer 1008, the reflection circular polarizer 1008 preferably has at least one disk-like cholesteric liquid crystal layer obtained by vertically aligning and fixing a disk-like liquid crystal compound.

The retardation layer and the disk-like cholesteric liquid crystal layer act as the above-described C plate. Therefore, in a case where the optical system has the retardation layer or the disk-like cholesteric liquid crystal layer, Rth (retardation) generated in a case where oblique light enters the reflection circular polarizer 1008 is compensated, the leakage light can be suppressed, and thus a ghost image 1102 can be more suitably suppressed.

In addition, in a case where the optical system has the third quarter wavelength plate 1009 and the linear polarizer 1007, a retardation is applied to the light passing through the reflection circular polarizer 1008 (cholesteric liquid crystal layer), and thus the light is absorbed by the linear polarizer 1007 after passing through the third quarter wavelength plate 1009. Therefore, light leak can be suppressed, and a ghost image can thus be more suitably suppressed.

In addition, in a case where the optical system according to the embodiment of the present invention has one or more retardation layers described above, or one or more disk-like cholesteric liquid crystal layers described above, total Rth of the retardation layers and total Rth of the disk-like cholesteric liquid crystal layers preferably satisfy the following expression.

$$|Rth(550)| \geq 200 \text{ nm} \qquad \text{Expression}$$

Here, Rth (550) represents a retardation in the thickness direction of the retardation layer at a wavelength of 550 nm.

In addition, total Rth of the retardation layers more preferably satisfies $|Rth(550)| \geq 400$ nm. The total Rth of the retardation layers even more preferably satisfy $|Rth(550)| \geq 600$ nm.

It is preferable that each of the total Rth of the retardation layers and the total Rth of the disk-like cholesteric liquid crystal layers is within such a range, and the reason for this is that, since Rth received in the cholesteric liquid crystal layer in a case where oblique light enters the cholesteric liquid crystal layer of the reflection circular polarizer 1008 can be more suitably compensated and light leak can be suppressed, a ghost image can be more suitably suppressed.

In addition, in a case where the optical system has the third quarter wavelength plate 1009 and the linear polarizer 1007, a retardation is more suitably applied to the light passing through the cholesteric liquid crystal layer (reflection circular polarizer 1008), and thus the light is absorbed by the linear polarizer 1007 after passing through the third quarter wavelength plate 1009. Therefore, light leak can be suppressed, and a ghost image can thus be more suitably suppressed.

The position of the retardation layer is not limited, and the retardation layer may be positioned at any location as long as the location is in a region in which the light is circularly polarized light. That is, the position of the retardation layer may be any one of a position between the first quarter wavelength plate 1003 and the half mirror 1004, a position between the half mirror 1004 and the reflection circular polarizer 1008, or a position between the reflection circular polarizer 1008 and the third quarter wavelength plate 1009. In addition, in a case where the reflection circular polarizer 1008 has a plurality of cholesteric liquid crystal layers, the retardation layer may be disposed between the cholesteric liquid crystal layers.

In any configuration, a ghost image can be suppressed. In addition, in a case where a plurality of cholesteric liquid crystal layers are provided, the retardation layer may be adjacent to the layers between the layers.

The position of the retardation layer is preferably closer to the image display device 1001 than the reflection circular polarizer 1008. In addition, the position of the retardation layer is more preferably adjacent to the reflection circular polarizer 1008.

In addition, the disk-like cholesteric liquid crystal layer may also be disposed at any one of a position closer to the image display device 1001 than the rod-like cholesteric liquid crystal layer, or a position closer to the visible side (closer to the third quarter wavelength plate 1009) than the rod-like cholesteric liquid crystal layer.

The position of the disk-like cholesteric liquid crystal layer is also preferably closer to the image display device 1001 than the reflection circular polarizer 1008. In addition, the position of the disk-like cholesteric liquid crystal layer is more preferably adjacent to the rod-like cholesteric liquid crystal layer.

That is, either the retardation layer or the reflection circular polarizer 1008 (cholesteric liquid crystal layer) may be disposed closer to the image display device 1001 from the viewpoint of suppressing a ghost image. Similarly, either the disk-like cholesteric liquid crystal layer or the rod-like cholesteric liquid crystal layer may be disposed closer to the image display device 1001 from the viewpoint of suppressing a ghost image.

In a case where the retardation layer is positioned closer to the image display device 1001 than the reflection circular polarizer 1008 (cholesteric liquid crystal layer), and in a case where the disk-like cholesteric liquid crystal layer is positioned closer to the image display device 1001 than the rod-like cholesteric liquid crystal layer, Rth received in the reflection circular polarizer 1008 (cholesteric liquid crystal layer) or the rod-like cholesteric liquid crystal layer is previously compensated by the retardation layer or the disk-like cholesteric liquid crystal layer, and thus a ghost image 1102 can be suppressed.

In a case where the reflection circular polarizer 1008 (cholesteric liquid crystal layer) is positioned closer to the image display device 1001 than the retardation layer, and in a case where the rod-like cholesteric liquid crystal layer is positioned closer to the image display device 1001 than the disk-like cholesteric liquid crystal layer, a ghost image can be suppressed by the following actions. That is, in this configuration, by applying a retardation to the light passing through the reflection circular polarizer 1008 (cholesteric liquid crystal layer) or the rod-like cholesteric liquid crystal layer, the revolution direction of the circularly polarized light is changed, and then the linearly polarized light converted from the circularly polarized light by the third quarter wavelength plate 1009 is changed into linearly polarized light in a direction orthogonal to the transmission axis of the linear polarizer 1007. Whereby, the light is absorbed by the linear polarizer 1007, and a ghost image 1102 can be suppressed.

Figure 7:
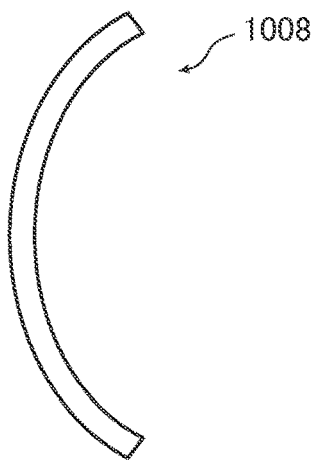
FIG. 7 shows a reflection circular polarizer having a curved shape according to an embodiment of the present invention.

In addition, the reflection circular polarizer 1008 may be processed into a curved surface shape as shown in FIG. 7.

As will be described later, in the optical system according to the embodiment of the present invention, for example, a lens may be optionally disposed in order to magnify a main image 1101 to be observed by a user.

In addition, the reflection circular polarizer 1008 can also be formed into a lens shape from the viewpoint of suppressing stray light, ghost, and the like.

In a case where the reflection circular polarizer 1008 is subjected to curved surface processing, the image display device 1001 may be positioned on the convex side or the concave side. That is, in a case where the reflection circular polarizer 1008 is subjected to curved surface processing, the reflection circular polarizer 1008 may act as a convex lens (concave mirror) or as a concave lens (convex mirror).

Whether the reflection circular polarizer 1008 acts as a convex lens or a concave lens may be appropriately determined according to the action of the reflection circular polarizer 1008 to be required according to the lens and other optical elements disposed in the optical system.

In a case where the reflection circular polarizer 1008 is subjected to curved surface processing, the reflection circular polarizer 1008 (cholesteric liquid crystal layer) preferably has a liquid crystal polymer obtained by polymerizing a liquid crystal composition containing a liquid crystal compound having one polymerizable group.

Due to such a configuration, the reflection circular polarizer 1008 is suitably stretched in a case where it is processed into a curved surface shape. As a result, damages such as cracks due to the processing into a curved surface shape are prevented, and the reflection circular polarizer 1008 can be suitably processed into a desired curved surface shape.

In a case where the reflection band of the reflection circular polarizer deviates due to the deformation during curved surface processing/forming, the reflection band can be adjusted so as to be a desired reflection wavelength range after forming with reference to WO2020/122245A.

For example, by performing isomerization exposure using a mask in which the transmitted light quantity varies from part to part, and changing the reflection band in advance in the plane, the reflection band can be adjusted to be in a desired reflection range after forming in both a part greatly deformed and a part slightly deformed during forming.

In the optical system according to the embodiment of the present invention, the thicknesses of the polarizers (reflective polarizer 1006 and reflection circular polarizer 1008) are not limited, and the thickness with which required performance can be exhibited may be appropriately set according to the forming material and the like.

The thickness of the polarizer is preferably 35 μm or less, and more preferably 3 to 25 μm from the viewpoint of excellent handleability and excellent optical characteristics.

By setting the thickness of the polarizer as above, the thickness of the optical system can be reduced.

(Polarizer Protective Film)

A polarizer protective film may be disposed on the surface of the polarizer. The polarizer protective film may be disposed on only one side or both sides of the polarizer. The polarizer mentioned here includes all of the linear polarizer 1002, the linear polarizer 1007, the reflective polarizer 1006, and the reflection circular polarizer 1008.

The configuration of the polarizer protective film is not particularly limited. The polarizer protective film may be, for example, a so-called transparent support, a so-called hard coating layer, or a laminate of a transparent support and a hard coating layer.

As the hard coating layer, known layers can be used, and examples thereof include a layer obtained by polymerizing and curing a polyfunctional monomer.

The thickness of the polarizer protective film is not particularly limited, and is preferably 40 µm or less, and more preferably 25 µm or less due to reasons such as the miniaturization of the optical system.

The optical system according to the embodiment of the present invention may optionally have a lens for the purpose of magnifying a main image 1101 to be visually recognized by a user.

The lens may be a convex lens, a concave lens, or a planar lens. An optical member constituting the optical system according to the embodiment of the present invention may be formed on a surface of the lens. Specific examples thereof include a configuration in which a curved half mirror 1004 is formed on a convex surface of a lens.

The pancake lens described in U.S. Pat. No. 3,443,858A is suitably used as a lens shape.

In the present invention, an antireflection layer can be appropriately provided on a constituent member (optical member) such as a quarter wavelength plate constituting the optical system according to the embodiment of the present invention.

By providing the antireflection layer on the constituent member, it is possible to suppress unintended reflection at the interface between the members, and it is possible to provide an optical system in which a ghost image 1102 is suppressed. In addition, the transmittance of each optical member is improved, and the brightness of a main image 1101 can be improved.

In one aspect, the antireflection layer is preferably provided on the surface of the first quarter wavelength plate 1003 on the side of the half mirror 1004. In another aspect, the antireflection layer is preferably provided on the surface of the half mirror 1004 on the side of the first quarter wavelength plate 1003. Furthermore, in a further aspect of the present invention, the antireflection layer is preferably provided on the surface of the reflection circular polarizer 1008 on the side of the half mirror 1004.

It is also preferable that a plurality of antireflection layers are provided, and it is preferable that an antireflection layer is provided on each of the surfaces of the constituent members of the optical system according to the embodiment of the present invention, which are not bonded to other members and an adjacent layer thereto is air.

EXAMPLES

Hereinafter, the characteristics of the present invention will be described in greater detail with examples and comparative examples. Materials, used amounts, ratios, treatment contents, treatment procedures, and the like shown in the following examples can be appropriately changed unless the changes cause deviance from the gist of the present invention. Therefore, the range of the present invention will not be restrictively interpreted by the following specific examples.

(Preparation of Cellulose Ester Solution A-1)

The following composition was put into a mixing tank. The composition was stirred while being heated to dissolve the components, and thus a cellulose ester solution A-1 was prepared.

| Composition of Cellulose Ester Solution A-1 | |
|---|---|
| Cellulose Acetate (degree of acetylation: 2.86) | 100 parts by mass |
| Methylene Chloride (first solvent) | 320 parts by mass |
| Methanol (second solvent) | 83 parts by mass |
| 1-Butanol (third solvent) | 3 parts by mass |
| Triphenyl Phosphate | 7.6 parts by mass |
| Biphenyl Diphenyl Phosphate | 3.8 parts by mass |

(Preparation of Matting Agent Dispersion B-1)

The following composition was put into a disperser and stirred to dissolve the components, and thus a matting agent dispersion B-1 was prepared.

| Composition of Matting Agent Dispersion B-1 | |
|---|---|
| Silica Particle Dispersion (average particle diameter: 16 nm) AEROSIL R972 (manufactured by NIPPON AEROSIL CO., LTD.) | 10.0 parts by mass |
| Methylene Chloride | 72.8 parts by mass |
| Methanol | 3.9 parts by mass |
| Butanol | 0.5 parts by mass |
| Cellulose Ester Solution A-1 | 10.3 parts by mass |

(Preparation of Ultraviolet Absorber Solution C-1)

The following composition was put into another mixing tank. The composition was stirred while being heated to dissolve the components, and thus an ultraviolet absorber solution C-1 was prepared.

| Composition of Ultraviolet Absorber Solution C-1 | |
|---|---|
| Ultraviolet Absorber (UV-1 below) | 10.0 parts by mass |
| Ultraviolet absorber (UV-2 below) | 10.0 parts by mass |
| Methylene Chloride | 55.7 parts by mass |
| Methanol | 10 parts by mass |
| Butanol | 1.3 parts by mass |
| Cellulose Ester Solution A-1 | 12.9 parts by mass |

(UV-1)

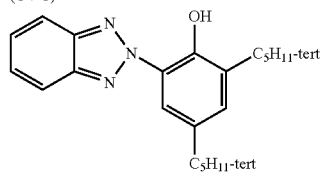

Composition of Ultraviolet Absorber Solution C-1

(UV-2)

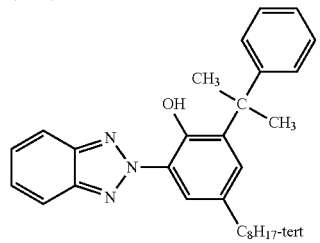

(Production of Cellulose Ester Film)

To a mixture obtained by mixing 94.6 parts by mass of the cellulose ester solution A-1 and 1.3 parts by mass of the matting agent dispersion B-1, the ultraviolet absorber solution C-1 was added so that the amount of each of the ultraviolet absorber (UV-1) and the ultraviolet absorber (UV-2) was 1.0 parts by mass per 100 parts by mass of cellulose acylate.

After that, the mixture was sufficiently stirred while being heated to dissolve the components, and a dope was prepared. The obtained dope was heated to 30° C., and the heated dope was cast on a mirror stainless steel support which a drum having a diameter of 3 m through a casting geeser. The surface temperature of the mirror stainless steel support was set to −5° C., and the coating width was 1,470 mm.

The film (dope film) formed by casting the dope was dried by applying drying air at 34° C. on the drum at 150 m³/min, and the film was peeled off from the drum in a state in which the residual solvent in the film was 150%. The film was stretched by 15% along a film transport direction (longitudinal direction) in a case where it was peeled off.

After that, the film was transported while being held at both ends in a width direction (a direction orthogonal to the casting direction) of the film by a pin tenter (pin tenter shown in FIG. 3 in JP1992-1009A (JP-H4-1009A)), and no stretching treatment was performed in the width direction of the film.

Furthermore, the obtained film was further dried by being transported between rolls of a heat treatment device, and a cellulose acylate film (T1) was produced.

The produced elongated cellulose acylate film (T1) had a residual solvent amount of 0.2% and a thickness of 40 μm, and its Re and Rth at 550 nm were 0.8 nm and 40 nm, respectively.

(Alkali Saponification Treatment)

By passing the above-described cellulose acylate film (T1) through a dielectric heating roll at a temperature of 60° C., the surface temperature of the cellulose acylate film was increased to 40° C. After that, an alkali solution having the following composition was applied to a band surface of the cellulose acylate film using a bar coater at 14 ml/m².

Next, the cellulose acylate film coated with the alkali solution was transported for 10 seconds under a steam type far-infrared heater manufactured by Noritake Co., Limited, heated to 110° C. Subsequently, to the obtained cellulose acylate film, pure water was applied at 3 ml/m² using the same bar coater. Then, the obtained cellulose acylate film was repeatedly subjected to water washing by a fountain coater and draining by an air knife three times.

After that, the obtained cellulose acylate film was transported to a drying zone at 70° C. for 10 seconds and dried to produce an alkali-saponified cellulose acylate film.

| Alkali Solution Composition | |
| --- | --- |
| Potassium Hydroxide | 4.7 parts by mass |
| Water | 15.8 parts by mass |
| Isopropanol | 63.7 parts by mass |
| Surfactant SF-1: $C_{14}H_{29}O(CH_2CH_2O)_{20}H$ | 1.0 part by mass |
| Propylene Glycol | 14.8 parts by mass |

(Formation of Alignment Film)

An alignment film coating liquid (A) having the following composition was continuously applied to the alkali-saponified surface of the cellulose acylate film (T1) using a #14 wire bar.

After that, the cellulose acylate film coated with the alignment film coating liquid (A) was dried for 60 seconds by hot air at 60° C., and further dried for 120 seconds by hot air at 100° C., and an alignment film was formed.

| Composition of Alignment Film Coating Liquid (A) | |
| --- | --- |
| Following Modified Polyvinyl Alcohol | 10 parts by mass |
| Water | 308 parts by mass |
| Methanol | 70 parts by mass |
| Isopropanol | 29 parts by mass |
| Photopolymerization Initiator (IRGACURE 2959, manufactured by BASF SE) | 0.8 parts by mass |

Modified Polyvinyl Alcohol

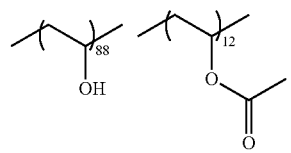

(Formation of Optically Anisotropic Layer A)

The alignment film produced as above was continuously rubbed. In this case, the longitudinal direction of the elongated film was parallel to the transport direction, and the angle formed by the longitudinal direction (transport direction) of the film and the rotation axis of a rubbing roller was 90°.

In this rubbing treatment, in a case where the longitudinal direction (transport direction) of the film is set to 900 and the counterclockwise direction is expressed as a positive value with reference to the width direction of the film (0°) observed from the alignment film side, the rotation axis of the rubbing roller is 0°. In other words, the position of the rotation axis of the rubbing roller is a position orthogonal to the longitudinal direction of the film.

An optically anisotropic layer coating liquid (A) containing a disk-like liquid crystal (discotic liquid crystal (DLC)) compound and having the following composition was continuously applied onto the alignment film rubbed as described above using a #5.0 wire bar. The film transportation speed (V) was 26 m/min.

In order to dry the solvent of the coating liquid and to align and age the disk-like liquid crystal, the film coated with the optically anisotropic layer coating liquid (A) was heated for 90 seconds by hot air at 115° C. and subsequently heated for 60 seconds by hot air at 80° C.

After that, ultraviolet (UV) irradiation (exposure amount: 70 mJ/cm²) was performed on the obtained film at 80° C. to fix the alignment of the liquid crystal compound.

The thickness of an optically anisotropic layer A was 2.0 µm. It was confirmed that the average tilt angle of the disc plane of the DLC compound with respect to the film surface was 900 and the DLC compound was aligned to be vertical to the film surface. In addition, the angle of the slow axis was parallel to the rotation axis of the rubbing roller.

The obtained optically anisotropic layer A was transferred to a glass plate (Eagle XG, manufactured by CORNING, Inc., thickness: 0.7 mm), and the optical anisotropy was measured using AxoScan OPMF-1 (manufactured by Axometrics, Inc). Re (550) was 240 nm, and the refractive index anisotropy was expressed by nz=nx>ny.

| Composition of Optically Anisotropic Layer Coating Liquid (A) | |
| --- | --- |
| Following Disk-Like Liquid Crystal (A) | 80 parts by mass |
| Following Disk-Like Liquid Crystal (B) | 20 parts by mass |
| Ethylene Oxide-Modified Trimethylolpropane Triacrylate V#360 (manufactured by OSAKA ORGANIC CHEMICAL INDUSTRY LTD.) | 5 parts by mass |
| Photopolymerization Initiator (IRGACURE 907, manufactured by BASF SE) | 4 parts by mass |
| Following Pyridinium Salt (A) | 2 parts by mass |
| Following Polymer A | 0.2 parts by mass |
| Following Polymer B | 0.1 parts by mass |
| Following Polymer C | 0.1 parts by mass |
| Methyl Ethyl Ketone | 211 parts by mass |

Disk-Like Liquid Crystal (A)

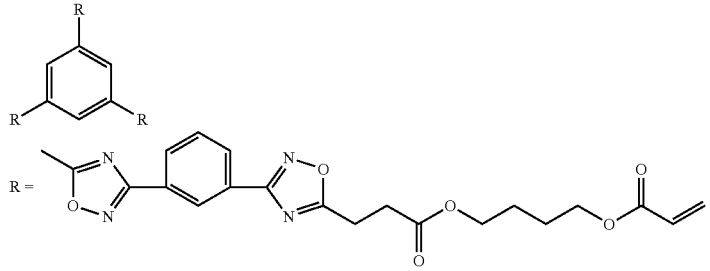

Disk-Like Liquid Crystal (B)

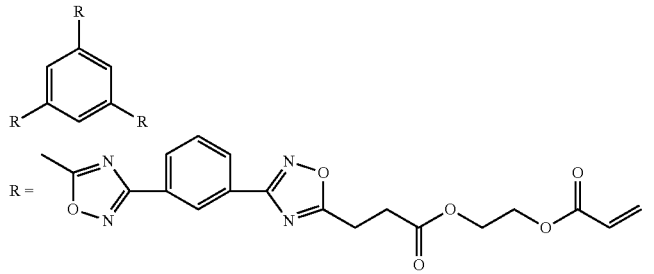

Pyridinium Salt (A)

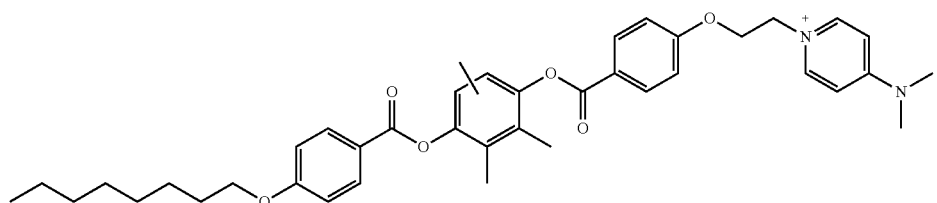

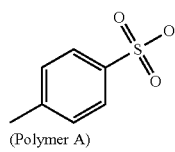

(Polymer A)

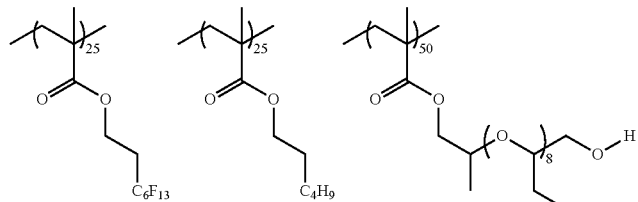

(Polymer B)

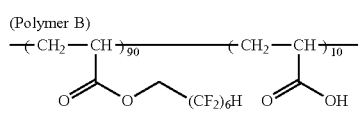

| Composition of Optically Anisotropic Layer Coating Liquid (A) |
| --- |
| (Polymer C) |

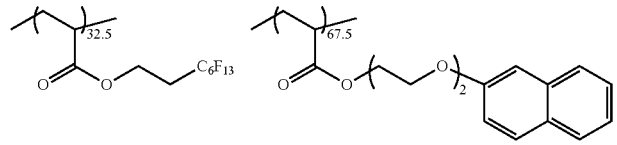

(Production of Optically Anisotropic Layer A2)

An optically anisotropic layer A2 was produced in the same manner as in the case of the optically anisotropic layer A, except that the amount of the optically anisotropic layer coating liquid (A) to be applied was adjusted. The thickness of the optically anisotropic layer A2 was 1.0 µm, and Re (550) was 120 nm.

(Production of Optically Anisotropic Layer A3)

An optically anisotropic layer A3 was produced in the same manner as in the case of the optically anisotropic layer A, except that the amount of the optically anisotropic layer coating liquid (A) to be applied was adjusted. The thickness of the optically anisotropic layer A2 was 1.1 µm, and Re (550) was 138 nm.

(Formation of Optically Anisotropic Layer B)

An alignment film was formed on the cellulose acylate film (T1) according to the same procedures as in (Production of Optically Anisotropic Layer A), and the alignment film was continuously rubbed. In this case, the longitudinal direction of the elongated film was parallel to the transport direction, and the angle formed by the longitudinal direction (transport direction) of the film and the rotation axis of the rubbing roller was 90° (in a case where the longitudinal direction (transport direction) of the film is set to 90° and the counterclockwise direction is expressed as a positive value with reference to the width direction of the film observed from the alignment film side, the rotation axis of the rubbing roller is 0°. In other words, the position of the rotation axis of the rubbing roller is a position orthogonal to the longitudinal direction of the film).

An optically anisotropic layer coating liquid (B) containing a rod-like liquid crystal and having the following composition was continuously applied onto the alignment film after the rubbing treatment using a #2.8 wire bar. The film transportation speed (V) was 26 m/min. In order to dry the solvent of the coating liquid and to align and age the rod-like liquid crystal, the film coated with the optically anisotropic layer coating liquid (B) was heated for 60 seconds by hot air at 60° C.

After that, UV irradiation was performed on the obtained film at 60° C. to fix the alignment of the rod-like liquid crystal, and an optically anisotropic layer B was thus produced. The thickness of the optically anisotropic layer B was 1.6 µm.

It was confirmed that the average tilt angle of the long axis of the rod-like liquid crystal with respect to the film surface was 0° and the rod-like liquid crystal was aligned to be horizontal to the film surface. The angle of the slow axis was orthogonal to the rotation axis of the rubbing roller, and was 90° in a case where the longitudinal direction of the film was 900 (the width direction of the film was set to 0° and the counterclockwise direction was expressed as a positive value with reference to the width direction of the film (0°) observed from the alignment film side). The obtained optically anisotropic layer B was transferred to a glass plate (Eagle XG, manufactured by CORNING, Inc., thickness: 0.7 mm), and the optical anisotropy was measured using AxoScan. Re (550) was 240 nm, and the refractive index anisotropy was expressed by nx>ny=nz.

(Production of Optically Anisotropic Layer B2)

An optically anisotropic layer B2 was produced in the same manner as in the case of the optically anisotropic layer B, except that the thickness of the optically anisotropic layer was controlled so that Re (550) was 120 nm.

(Production of Optically Anisotropic Layer B3)

An optically anisotropic layer B3 was produced in the same manner as in the case of the optically anisotropic layer B, except that the thickness of the optically anisotropic layer was controlled so that Re (550) was 138 nm.

| Composition of Optically Anisotropic Layer Coating Liquid (B) | |
| --- | --- |
| Rod-Like Liquid Crystal-1 | 80 parts by mass |
| Rod-Like Liquid Crystal-2 | 20 parts by mass |
| Photopolymerization Initiator (IRGACURE 907, manufactured by BASF SE) | 3 parts by mass |
| Sensitizer (KAYACURE DETX, manufactured by Nippon Kayaku Co., Ltd.) | 1 part by mass |
| Above Polymer C | 1.0 part by mass |
| Methyl Ethyl Ketone | 193 parts by mass |

[Rod-Like Liquid Crystal-1]

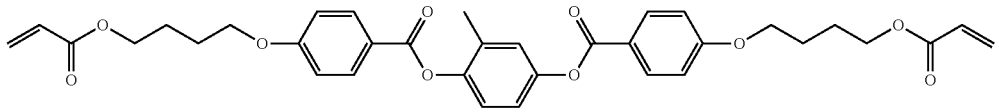 [SMILES: C=CC(=O)OCCCCOc1ccc(C(=O)Oc2ccc(OC(=O)c3ccc(OCCCCOC(=O)C=C)cc3)c(C)c2)cc1]

| Composition of Optically Anisotropic Layer Coating Liquid (B) |
| --- |
| [Rod-Like Liquid Crystal-2] 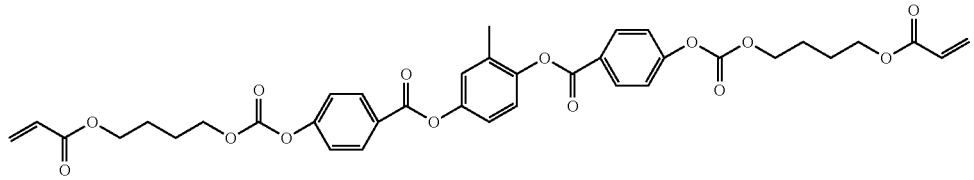 [SMILES: C=CC(=O)OCCCCOC(=O)Oc1ccc(C(=O)Oc2ccc(OC(=O)c3ccc(OC(=O)OCCCCOC(=O)C=C)cc3)c(C)c2)cc1] |

(Production of Optically Anisotropic Layer C)

A film having a cellulose acylate film, an alignment film, and an optically anisotropic layer C was obtained in the same manner as in the case of the positive A plate described in paragraphs 0102 to 0126 in JP2019-215416A.

The optically anisotropic layer C is a positive A plate, and the thickness of the positive A plate is controlled so that Re (550) is 240 nm.

(Production of Optically Anisotropic Layer C2)

A film having a cellulose acylate film, an alignment film, and an optically anisotropic layer C2 was obtained in the same manner.

In the optically anisotropic layer C2, the thickness of the positive A plate is controlled so that Re (550) is 120 nm.

(Production of Optically Anisotropic Layer C3)

A film having a cellulose acylate film, an alignment film, and an optically anisotropic layer C3 was obtained in the same manner.

In the optically anisotropic layer C3, the thickness of the positive A plate is controlled so that Re (550) is 138 nm.

(Production of Optically Anisotropic Layer D)

A film having a cellulose acylate film, an alignment film, and an optically anisotropic layer D was obtained in the same manner as in the case of the positive C plate described in paragraph 0164 in US2018/174015A.

The optically anisotropic layer D is a positive C plate, and the thickness of the positive C plate is controlled so that Rth (550) is −72 nm.

(Production of Optically Anisotropic Layer D2)

A film having a cellulose acylate film, an alignment film, and an optically anisotropic layer D2 was obtained in the same manner as in the case of the positive C plate described in paragraph 0124 in JP2015-200861A.

The optically anisotropic layer D2 is a positive C plate, and the thickness of the positive C plate is controlled so that Rth (550) is −72 nm.

(Production of Laminate)

A pressure sensitive adhesive (SK-2057, manufactured by Soken Chemical & Engineering Co., Ltd.) was applied onto a glass plate (Eagle XG, manufactured by CORNING, Inc., thickness: 0.7 mm) to form a pressure sensitive adhesive layer. Next, the glass with the pressure sensitive adhesive layer disposed thereon was bonded to the film having a cellulose acylate film, an alignment film, and an optically anisotropic layer A produced as above so that the pressure sensitive adhesive layer and the optically anisotropic layer A were firmly stuck to each other. After that, the cellulose acylate film and the alignment film were peeled off from the obtained bonding material.

Furthermore, a pressure sensitive adhesive (SK-2057, manufactured by Soken Chemical & Engineering Co., Ltd.) was applied onto the optically anisotropic layer A in the obtained laminate to form a pressure sensitive adhesive layer. Next, the laminate with the pressure sensitive adhesive layer disposed thereon was bonded to the film having a cellulose acylate film, an alignment film, and an optically anisotropic layer B2 produced as above so that the pressure sensitive adhesive layer and the optically anisotropic layer B2 were firmly stuck to each other. After that, the cellulose acylate film and the alignment film were peeled off from the obtained bonding material.

Through the above procedures, a laminate 103-1 in which the glass plate, the optically anisotropic layer A (optically anisotropic layer a (see Table 1)), and the optically anisotropic layer B2 (optically anisotropic layer b (same as above)) were disposed in this order was produced. In a case where the counterclockwise direction was expressed as a positive value with reference to one side of the glass plate (0°) observed from the glass plate side, the angle of the slow axis of the optically anisotropic layer A (optically anisotropic layer a) was 15°, and the angle of the slow axis of optically anisotropic layer B2 (optically anisotropic layer b) was 750.

Laminates 102, 104-1 to 106-1, and 103-2 to 106-2 were produced by changing the kind of the optically anisotropic layer as in the combinations of the optically anisotropic layers a to d shown in Table 1 and adjusting the angle of the slow axis during bonding.

TABLE 1

| | Optically Anisotropic Layer a | | | | | Optically Anisotropic Layer b | | | | | Optically Anisotropic Layer c | | | | | Optically Anisotropic Layer d | | | | Lamination Order ←Back Front→ |
|---|---|---|---|---|---|---|---|---|---|---|---|---|---|---|---|---|---|---|---|---|
| Kind | Kind | Material | Angle of Slow Axis | Retardance @ 550 nm | Wavelength Dispersion Δn(450)/Δn(550) | Kind | Material | Angle of Slow Axis | Retardance | Wavelength Dispersion Δn(450)/Δn(550) | Kind | Material | Angle of Slow Axis | Retardance | Wavelength Dispersion Δn(450)/Δn(550) | Kind | Material | Rth | Wavelength Dispersion Δn(450)/Δn(550) | |
| Laminate 101 | optically anisotropic layer B3 | RLC | 45° | 138 nm | 1.09 | | absence | | | | | absence | | | | | absence | | | a |
| Laminate 102 | optically anisotropic layer B | RLC | 15° | 240 nm | 1.09 | optically anisotropic layer B2 | RLC | 75° | 120 nm | 1.09 | | absence | | | | | absence | | | a/b |
| Laminate 103-1 | optically anisotropic layer B | DLC | 15° | 240 nm | 1.05 | optically anisotropic layer B2 | RLC | 75° | 120 nm | 1.09 | | absence | | | | | absence | | | a/b |
| Laminate 103-2 | optically anisotropic layer A | DLC | −15° | 240 nm | 1.05 | optically anisotropic layer B2 | RLC | −75° | 120 nm | 1.09 | | absence | | | | | absence | | | a/b |
| Laminate 104-1 | optically anisotropic layer C | RLC | 15° | 240 nm | 0.87 | optically anisotropic layer C2 | RLC | 75° | 120 nm | 0.87 | | absence | | | | | absence | | | a/b |
| Laminate 104-2 | optically anisotropic layer C | RLC | −15° | 240 nm | 0.87 | optically anisotropic layer C2 | RLC | −75° | 120 nm | 0.87 | | absence | | | | | absence | | | a/b |
| Laminate 105-1 | optically anisotropic layer A | DLC | 15° | 240 nm | 1.05 | optically anisotropic layer C2 | RLC | 75° | 120 nm | 0.87 | | absence | | | | | absence | | | a/b |
| Laminate 105-2 | optically anisotropic layer A | DLC | −15° | 240 nm | 1.05 | optically anisotropic layer C2 | RLC | −75° | 120 nm | 0.87 | | absence | | | | | absence | | | a/b |
| Laminate 106-1 | optically anisotropic layer C | RLC | 15° | 240 nm | 0.87 | optically anisotropic layer A2 | DLC | 75° | 120 nm | 1.05 | | absence | | | | | absence | | | a/b |
| Laminate 106-2 | optically anisotropic layer C | RLC | −15° | 240 nm | 0.87 | optically anisotropic layer A2 | RLC | 75° | 120 nm | 1.05 | | absence | | | | | absence | | | a/b |
| Laminate 107-1 | optically anisotropic layer C3 | RLC | 45° | 138 nm | 0.87 | | absence | | | | | absence | | | | Optically Anisotropic Layer D | RLC | −72 nm | 0.87 | a/d |
| Laminate 107-2 | optically anisotropic layer C3 | RLC | −45° | 138 nm | 0.87 | | absence | | | | | absence | | | | Optically Anisotropic Layer D | RLC | −72 nm | 0.87 | a/d |
| Laminate 108-1 | optically anisotropic layer C3 | RLC | 45° | 138 nm | 0.87 | | absence | | | | | absence | | | | Optically Anisotropic Layer D | RLC | −72 nm | 0.87 | d/a |

TABLE 1-continued

| | Optically Anisotropic Layer a | | | | | Optically Anisotropic Layer b | | | | | | Optically Anisotropic Layer c | | | | | Optically Anisotropic Layer d | | | | Lamination Order ←Back Front→ |
|---|---|---|---|---|---|---|---|---|---|---|---|---|---|---|---|---|---|---|---|---|---|
| | Kind | Material | Angle of Slow Axis | Retardance @ 550 nm | Wavelength Dispersion Δn(450)/Δn(550) | Kind | Material | Angle of Slow Axis | Retardance | Wavelength Dispersion Δn(450)/Δn(550) | | Kind | Material | Angle of Slow Axis | Retardance | Wavelength Dispersion Δn(450)/Δn(550) | Kind | Material | Rth | Wavelength Dispersion Δn(450)/Δn(550) | |
| Laminate 108-2 | optically anisotropic layer C3 | RLC | −45° | 138 nm | 0.87 | absence | | | | | | absence | | | | | Optically Anisotropic Layer D | RLC | −72 nm | 0.87 | d/a |
| Laminate 109-1 | optically anisotropic layer A | DLC | 5° | 240 nm | 1.05 | optically anisotropic layer A | DLC | 30° | 240 nm | 1.05 | | Optically Anisotropic Layer B2 | RLC | 95° | 120 nm | 1.09 | | absence | | | a/b/c |
| Laminate 109-2 | optically anisotropic layer A | DLC | −5° | 240 nm | 1.05 | optically anisotropic layer A | DLC | −30° | 240 nm | 1.05 | | Optically Anisotropic Layer B2 | RLC | −95° | 120 nm | 1.09 | | absence | | | a/b/c |
| Laminate 110-1 | optically anisotropic layer A | DLC | 5° | 240 nm | 1.05 | optically anisotropic layer A | DLC | 30° | 240 nm | 1.05 | | Optically Anisotropic Layer B2 | RLC | 95° | 120 nm | 1.09 | Cellulose Acylate Film T2 | Cellulose Acylate | −5 nm | — | d/a/b/c |
| Laminate 110-2 | optically anisotropic layer A | DLC | −5° | 240 nm | 1.05 | optically anisotropic layer A | DLC | −30° | 240 nm | 1.05 | | Optically Anisotropic Layer B2 | RLC | −95° | 120 nm | 1.09 | Cellulose Acylate Film T2 | Cellulose Acylate | −5 nm | — | d/a/b/c |
| Laminate 111-1 | optically anisotropic layer A | DLC | 5° | 240 nm | 1.05 | optically anisotropic layer A | DLC | 30° | 240 nm | 1.05 | | Optically Anisotropic Layer B2 | RLC | 95° | 120 nm | 1.09 | Optically Anisotropic Layer D | RLC | −72 nm | 0.87 | d/a/b/c |
| Laminate 111-2 | optically anisotropic layer A | DLC | −5° | 240 nm | 1.05 | optically anisotropic layer A | DLC | −30° | 240 nm | 1.05 | | Optically Anisotropic Layer B2 | RLC | −95° | 120 nm | 1.09 | Optically Anisotropic Layer D | RLC | −72 nm | 0.87 | d/a/b/c |
| Laminate 112-1 | optically anisotropic layer C | RLC | 5° | 240 nm | 0.87 | optically anisotropic layer C | RLC | 30° | 240 nm | 0.87 | | Optically Anisotropic Layer C2 | RLC | 95° | 120 nm | 0.87 | absence | | | | a/b/c |
| Laminate 112-2 | optically anisotropic layer C | RLC | −5° | 240 nm | 0.87 | optically anisotropic layer C | RLC | −30° | 240 nm | 0.87 | | Optically Anisotropic Layer C2 | RLC | −95° | 120 nm | 0.87 | absence | | | | a/b/c |

TABLE 1-continued

| | Optically Anisotropic Layer a | | | | | Optically Anisotropic Layer b | | | | | Optically Anisotropic Layer c | | | | | Optically Anisotropic Layer d | | | | Lamination Order ←Back Front→ |
|---|---|---|---|---|---|---|---|---|---|---|---|---|---|---|---|---|---|---|---|---|
| | Kind | Material | Angle of Slow Axis | Retardance @ 550 nm | Wavelength Dispersion Δn(450)/Δn(550) | Kind | Material | Angle of Slow Axis | Retardance | Wavelength Dispersion Δn(450)/Δn(550) | Kind | Material | Angle of Slow Axis | Retardance | Wavelength Dispersion Δn(450)/Δn(550) | Kind | Material | Rth | Wavelength Dispersion Δn(450)/Δn(550) | |
| Laminate 113-1 | optically anisotropic layer C | RLC | 15° | 240 nm | 0.87 | optically anisotropic layer C | RLC | 75° | 116 nm | 0.87 | absence | | | | | Optically Anisotropic Layer D | RLC | −72 nm | 0.87 | a/b/d |
| Laminate 113-2 | optically anisotropic layer C | RLC | −15° | 240 nm | 0.87 | optically anisotropic layer C | RLC | −75° | 116 nm | 0.87 | absence | | | | | Optically Anisotropic Layer D | RLC | −72 nm | 0.87 | a/b/d |
| Laminate 114-1 | optically anisotropic layer C3 | RLC | 45° | 138 nm | 0.87 | absence | | | | | absence | | | | | Optically Anisotropic Layer D2 | RLC | −72 nm | absence | a/d |
| Laminate 114-2 | optically anisotropic layer C3 | RLC | −45° | 138 nm | 0.87 | absence | | | | | absence | | | | | Optically Anisotropic Layer D2 | RLC | −72 nm | absence | a/d |
| Laminate 115 | optically anisotropic layer B3 | RLC | 45° | 138 nm | 1.09 | absence | | | | | absence | | | | | absence | | | | a |
| Laminate 116 | optically anisotropic layer A3 | DLC | 45° | 138 nm | 1.05 | absence | | | | | absence | | | | | absence | | | | a |

By changing the kind of the optically anisotropic layer and adjusting the angle of the bonding axis in the same procedures, laminates 107-1, 107-2, 108-1, 108-2, 114-1, 114-2, 115, and 116 were produced.

(Production of Laminate)

A pressure sensitive adhesive (SK-2057, manufactured by Soken Chemical & Engineering Co., Ltd.) was applied onto a glass plate (Eagle XG, manufactured by CORNING, Inc., thickness: 0.7 mm) to form a pressure sensitive adhesive layer. Next, the glass with the pressure sensitive adhesive layer disposed thereon was bonded to the film having a cellulose acylate film, an alignment film, and a first optically anisotropic layer A produced as above so that the pressure sensitive adhesive layer and the first optically anisotropic layer A were firmly stuck to each other. After that, the cellulose acylate film and the alignment film were peeled off from the obtained bonding material.

Furthermore, a pressure sensitive adhesive (SK-2057, manufactured by Soken Chemical & Engineering Co., Ltd.) was applied onto the first optically anisotropic layer A in the obtained laminate to form a pressure sensitive adhesive layer. Next, the laminate with the pressure sensitive adhesive layer disposed thereon was bonded to the film having a cellulose acylate film, an alignment film, and a second optically anisotropic layer A produced as above so that the pressure sensitive adhesive layer and the second optically anisotropic layer A were firmly stuck to each other. After that, the cellulose acylate film and the alignment film were peeled off from the obtained bonding material.

Furthermore, a pressure sensitive adhesive (SK-2057, manufactured by Soken Chemical & Engineering Co., Ltd.) was applied onto the second optically anisotropic layer A in the obtained laminate to form a pressure sensitive adhesive layer. Next, the laminate with the pressure sensitive adhesive layer disposed thereon was bonded to the film having a cellulose acylate film, an alignment film, and an optically anisotropic layer B2 produced as above so that the pressure sensitive adhesive layer and the optically anisotropic layer B2 were firmly stuck to each other.

Through the above procedures, a laminate 109-1 in which the glass plate, the first optically anisotropic layer A (optically anisotropic layer a), the second optically anisotropic layer A (optically anisotropic layer b), and the optically anisotropic layer B2 (optically anisotropic layer c) were disposed in this order was produced. In a case where the counterclockwise direction was expressed as a positive value with reference to one side of the glass plate (0°) observed from the glass plate side, the angle of the slow axis of the first optically anisotropic layer A (optically anisotropic layer a) was 5°, the angle of the slow axis of the second optically anisotropic layer A (optically anisotropic layer b) was 30°, and the angle of the slow axis of the optically anisotropic layer B2 (optically anisotropic layer c) was 950.

By changing the kind of the optically anisotropic layer as in the combinations described in Table 1 and adjusting the angle of the bonding axis, laminates 109-2, 111-1 to 113-1, and 111-2 to 113-2 were produced.

(Preparation of Cellulose Acylate Solution)

1] Cellulose Acylate

The following cellulose acylate A-2 was used. Each cellulose acylate was dried by being heated to 120° C. to have a moisture content of 0.5 mass % or less, and then 20 parts by mass thereof was used.

Cellulose Acylate A-2:

A cellulose acetate powder having a degree of substitution of 2.86 was used.

The viscosity average polymerization degree of the cellulose acylate A-2 was 300, the degree of acetyl substitution at 6-position was 0.89, the acetone extraction was 7 mass %, the ratio of the mass average molecular weight to the number average molecular weight was 2.3, the moisture content was 0.2 mass %, the viscosity of a 6 mass % dichloromethane solution was 305 mPa·s, the residual acetic acid amount was 0.1 mass % or less, the Ca content was 65 ppm, the Mg content was 26 ppm, the iron content was 0.8 ppm, the sulfate ion content was 18 ppm, the yellow index was 1.9, and the amount of free acetic acid was 47 ppm.

The average particle size of the powder was 1.5 mm, and the standard deviation was 0.5 mm.

2] Solvent

The following solvent A was used in an amount of 80 parts by mass. The moisture content of each solvent was 0.2 mass % or less.

Solvent A: dichloromethane/methanol/butanol=81/18/1 (mass ratio)

3] Additive

The following A-1 was added in an amount of 15 mass % as a compound controlling the optical anisotropy. The amount to be added is expressed in unit of mass % when the amount of the cellulose acylate is 100 mass %. The amount of the additive to be added to the cellulose acylate solution was adjusted so as to be the above-described amount.

(Compound Having Repeating Unit)

A-1: acetic acid esters at both ends of condensate of ethanediol with adipic acid (1/1 molar ratio), number average molecular weight: 1,000, hydroxyl number: 0 mgKOH/g 4] Dissolution The above-described cellulose acylate was gradually added while the above-described solvent and additive were put into a 4,000-liter stainless steel dissolution tank having a stirring blade, stirred, and dispersed. After the addition was completed, the mixture was stirred for 2 hours at room temperature, swollen for 3 hours, and then stirred again to obtain a cellulose acylate solution.

The dope before concentration obtained as described above was flushed in a tank under normal pressure at 80° C., and the evaporated solvent was recovered and separated by a condenser. The concentration of solid contents of the dope after flushing was 24.8% by mass.

The condensed solvent was sent to a recovery step in order to be reused as a solvent in the preparation process (recovering is performed by a distillation step, a dehydration step, and the like).

In the flush tank, stirring was performed by rotating a shaft having an anchor blade on its central shaft at a peripheral speed of 0.5 m/sec to perform defoaming. The temperature of the dope in the tank was 25° C., and the average retention time in the tank was 50 minutes.

5] Filtration

Next, the dope first passed through a sintered fiber metal filter having a nominal pore diameter of 10 μm, and then passed through a sintered fiber filter having the same nominal pore diameter of 10 μm. The temperature of the dope after filtration was adjusted to 36° C., and the dope was stored in a 2000-L stainless steel stock tank.

(Production of Film)

1] Casting Step

Subsequently, the dope in the stock tank was fed. Using a casting die having a width of 2.1 m, casting was performed with a dope flow rate at a die projecting port adjusted by setting a casting width to 2,000 mm. In order to adjust the temperature of the dope to 36° C., the inlet temperature of a heat-transmitting medium to be supplied into a jacket provided in the casting die was set to 36° C. The die, the feed block, and the pipe were all kept warm at 36° C. during the operation process.

2) Casting Drying

Subsequently, the dope which had been cast and cooled on a drum disposed in a space set to 15° C., and turned into a gel was stripped off as a gelled film (web) when it was rotated by 320° on the drum. In this case, the stripping speed was adjusted with respect to the support speed, and the stretching ratio was 6% in the MD direction.

3) Conditions of Tenter Transport and Drying Step

The stripped web was transported in a drying zone while being fixed at both ends by a tenter having pin clips, and dried by drying air. No positive stretching was performed in this step.

4) Conditions of Post-Drying Step

The optical film after edge cutting, obtained by the above-described method, was further dried in a roller transport zone. The material of the roller was aluminum or carbon steel, and the surface of the roller was plated with hard chromium. Regarding the surface shape of the roller, a roller having a flat surface shape and a roller having a surface matted through blasting were used. The produced optical film was subjected to a post-heat treatment for 15 hours at 115° C.

5) Conditions of Post-Treatment and Winding

The optical film after drying was cooled to 30° C. or lower, and edges at both ends thereof were cut off. The edges were cut off by installing two devices for slitting an end portion of a film at each of both (right and left) end portions of the film (the number of the slitting devices per side was two), and slitting the end portions of the film.

Furthermore, knurling was performed on both ends of the optical film. Knurls were applied by performing embossing from one side.

In this manner, an optical film having a final product width of 1,400 mm was obtained and wound by a winder, and a cellulose acylate film T2 was produced. Re and Rth of the obtained cellulose acylate film T2 were 2 nm and −5 nm, respectively.

A laminate 110-1 was produced in the same manner as in the case of the laminate 109-1, except that the cellulose acylate film T2 was used instead of the glass plate.

In addition, a laminate 110-2 was produced in the same manner as in the case of the laminate 109-2, except that the cellulose acylate film T2 was used instead of the glass plate.

The laminates 101, 102, 103-1 to 113-1, and 103-2 to 113-2 shown in Table 1 obtained as above were all quarter wavelength plates.

<Production of Laminate 201>

A laminate 201 in which a support, an optically anisotropic layer a, and an optically anisotropic layer b were laminated in this order was obtained in the same manner as in the case of the retardation plate described in Example 1 in JP2014-209219A.

The laminate 201 contains a twist-aligned liquid crystal compound having a spiral axis in a thickness direction. Re (550) of the laminate 201 was 140 nm, and the slow axis was 45°.

<Production of Laminate 202>

A laminate 202 in which a support, an optically anisotropic layer a, an optically anisotropic layer b, and an optically anisotropic layer c were laminated in this order was obtained in the same manner as in the case of the retardation plate described in Example 2 in JP2014-209219A.

The laminate 202 contains a twist-aligned liquid crystal compound having a spiral axis in a thickness direction. Re (550) of the laminate 202 was 140 nm, and the slow axis was 45°.

<Production of Laminate 301 (Formation of First Optically Anisotropic Layer and Second Optically Anisotropic Layer)>

[Preparation of Composition 1 for Photo-Alignment Film]

8.4 parts by mass of the following copolymer C3 and 0.3 parts by mass of the following thermal acid generator D1 were added to butyl acetate/methyl ethyl ketone (80 parts by mass/20 parts by mass), and a composition for photo-alignment film was prepared.

Copolymer C3 (weight average molecular weight: 40,000)

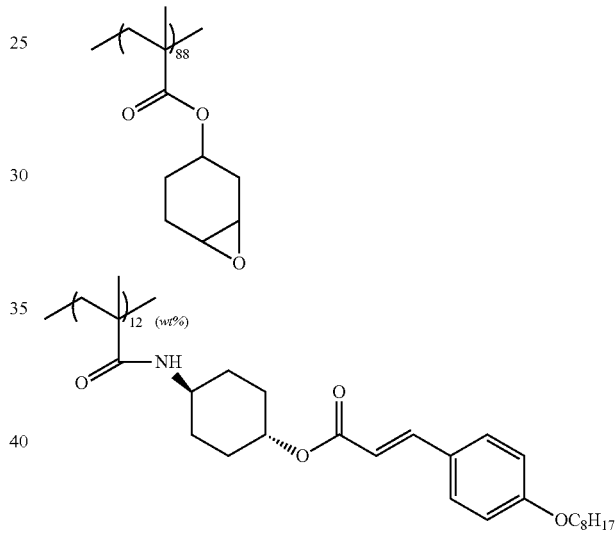

Thermal Acid Generator D1

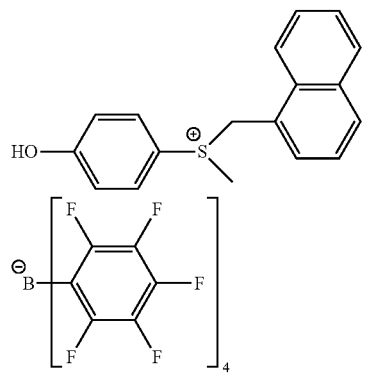

[Production of Photo-Alignment Film 1]

The composition 1 for photo-alignment film prepared previously was applied to one surface of the cellulose acylate film T2 using a bar coater. After coating, the solvent was removed by drying on a hot plate at 80° C. for 5 minutes, and a photoisomerization composition layer having a thickness of 0.2 μm was formed. The photoisomerization composition layer thus obtained was irradiated with polarized ultraviolet rays (10 mJ/cm², using an ultra-high pressure mercury lamp) to form a photo-alignment film 1.

A laminate 301 was produced in the same manner as described in JP2016-148724, except that on the photo-alignment film 1 produced as above, a first optically anisotropic layer was formed using the following composition 3 for forming optically anisotropic layer, and a second optically anisotropic layer was formed using the following composition 4 for forming optically anisotropic layer.

In the laminate 301, a cellulose acylate film T2, a photo-alignment film 1, an optically anisotropic layer formed of the composition 3 for forming optically anisotropic layer, and an optically anisotropic layer formed of the composition 4 for forming optically anisotropic layer are laminated in this order.

| Optically Anisotropic Layer Forming Composition 3 | |
|---|---|
| Liquid Crystal Compound R1 | 42.00 parts by mass |
| Liquid Crystal Compound R2 | 42.00 parts by mass |
| Liquid Crystal Compound R4 | 4.00 parts by mass |
| Polymerizable Compound A1 | 12.00 parts by mass |
| Polymerization Initiator S1 | 0.50 parts by mass |
| Leveling Agent P1 | 0.15 parts by mass |
| HISOLVE MTEM (manufactured by TOHO Chemical Industry Co., Ltd.) | 2.00 parts by mass |
| NK Ester A-200 (manufactured by SHIN-NAKAMURA CHEMICAL CO., LTD.) | 1.00 part by mass |
| Methyl Ethyl Ketone | 424.8 parts by mass |

Liquid Crystal Compound R1

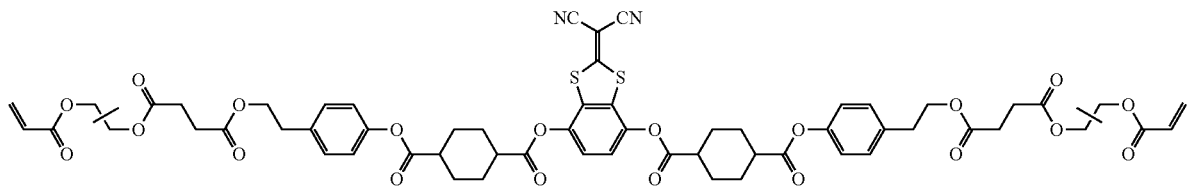

Liquid Crystal Compound R2

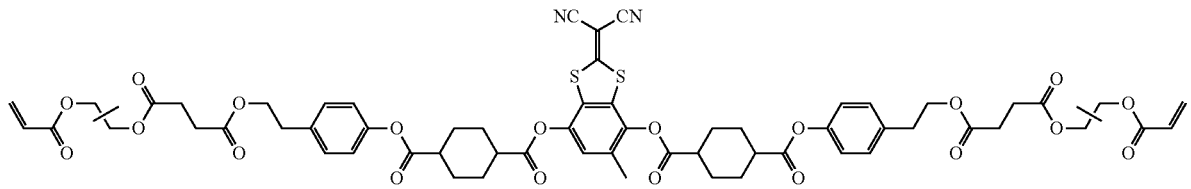

Liquid Crystal Compound R4

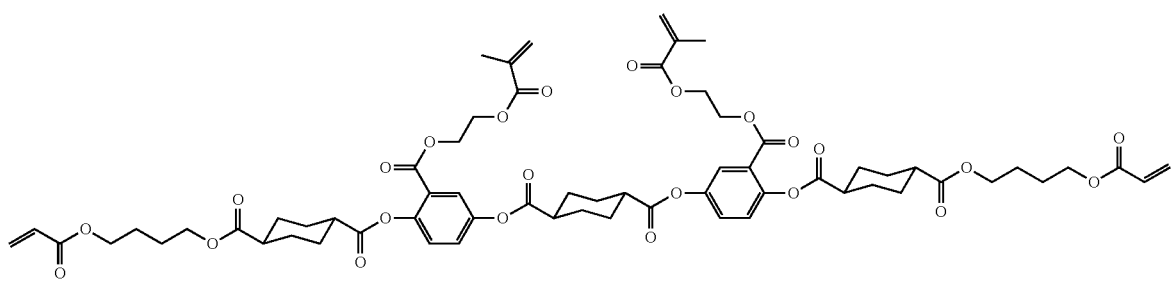 [SMILES: C=CC(=O)OCCCCOC(=O)C1CCC(C(=O)Oc2ccc(OC(=O)C3CCC(C(=O)Oc4ccc(OC(=O)C5CCC(C(=O)OCCCCOC(=O)C=C)CC5)c(C(=O)OCCOC(=O)C(=C)C)c4)CC3)cc2C(=O)OCCOC(=O)C(=C)C)CC1]

Polymerizable Compound A1

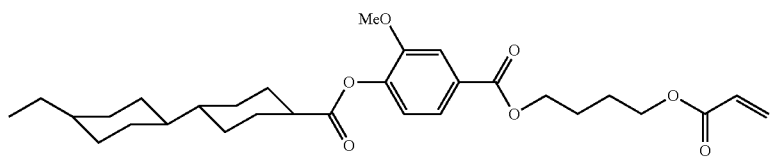 [SMILES: C=CC(=O)OCCCCOC(=O)c1ccc(OC(=O)C2CCC(C3CCC(CC)CC3)CC2)c(OC)c1]

Polymerization Initiator S1

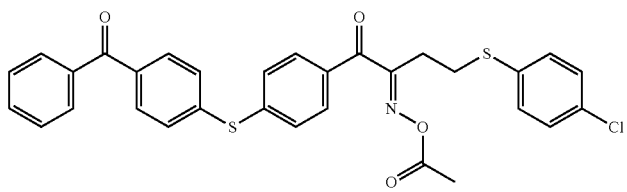 [SMILES: CC(=O)O/N=C(\CCSc1ccc(Cl)cc1)C(=O)c1ccc(Sc2ccc(C(=O)c3ccccc3)cc2)cc1]

Optically Anisotropic Layer Forming Composition 3

Leveling agent P1

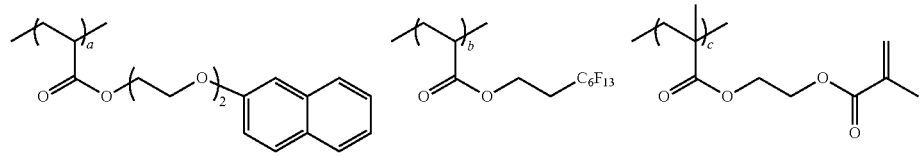

Optically Anisotropic Layer Forming Composition 4

| | |
|---|---|
| Liquid Crystal Compound R1 | 10.0 parts by mass |
| Liquid Crystal Compound R2 | 54.0 parts by mass |
| Liquid Crystal Compound R3 | 28.0 parts by mass |
| Liquid Crystal Compound R4 | 8.0 parts by mass |
| Compound B1 | 4.5 parts by mass |
| Following Monomer K1 | 12.0 parts by mass |
| Polymerization Initiator S1 | 1.5 parts by mass |
| Surfactant P2 | 0.4 parts by mass |
| Surfactant P3 | 0.5 parts by mass |
| Acetone | 175.0 parts by mass |
| Propylene Glycol Monomethyl Ether Acetate | 75.0 parts by mass |

<Production of Laminate 302>

A laminate 302 was produced in the same manner as in the case of the optical compensation layer 1 described in WO2018/207797A, except that in the composition A, the amount of the liquid crystal compound R1 was 100 parts by mass and the amount of the liquid crystal compounds R2 and R3 was 0 part by mass.

<Production of Laminate 303>

A laminate 303 was produced in the same manner as in the case of the optical compensation layer 3 described in WO2018/207797A.

<Production of Head-Mounted Display>

Optical systems 1 to 17, 50, and 51 which were head-mounted displays were produced by using and incorporating the laminates 101 to 114-2, 201, and 202 as first and second quarter wavelength plates as in the combinations shown in Table 2 in the optical system shown in FIG. 1B.

Oculus Rift S manufactured by OCULUS VR, which was a commercially available head-mounted display, was disassembled, and an image display device (1001) in the display and a linear polarizer (1002) bonded to a surface of the display were used and disposed so that an angle of the absorption axis of the linear polarizer was 90°.

As a half mirror (1004), a dielectric multilayer film half mirror (available from Shibuya Optical Co., Ltd., trade name: H216) (angle of absorption axis: 90°) having a transmittance of 50% and a reflectivity of 50% were used by being bonded to a convex surface of a lens having a diameter of 5 cm and a curvature radius of 10 cm.

As a reflective polarizer (1006), DBEF manufactured by 3M was disposed so that an angle of the transmission axis was 90°. A linear polarizer (1007) was disposed on the visible side of the reflective polarizer so that an angle of the absorption axis was 0°.

In addition, the first quarter wavelength plate and the second quarter wavelength plate were disposed in the direction described in Table 2 so that the reference axis of the laminate was 0°. The angle of the slow axis was made the same as that of the reference axis of the laminate with reference to the horizontal direction of the head-mounted display (0°), and the clockwise direction was defined as a positive direction in a case where the image display device was viewed from the visible side. In addition, the front side of the laminate is the liquid crystal composition surface side of the laminate.

An optical system 61 was produced in the same manner as in the case of the optical system 17, except that the optically anisotropic layer 4 of the laminate 301 was bonded to the half mirror surface side of the reflective polarizer with a pressure sensitive adhesive, and the cellulose acylate film T2 was peeled off to obtain an optical compensation layer.

The optically anisotropic layer 4 of the laminate 301 was bonded to the first quarter wavelength plate side of the linear polarizer with a pressure sensitive adhesive, and the cellulose acylate film T2 was peeled off to obtain an optical compensation layer.

Then, to the surface from which the cellulose acylate film T2 had been peeled off, the laminate 114-1 which was a first quarter wavelength plate was attached in the direction shown in Table 2.

Except for these points, an optical system 62 was produced in the same manner as in the case of the optical system 61.

An optical system 63 was produced in the same manner as in the case of the optical system 62, except that instead of the laminate 301, the laminate 302 was used as an optical compensation layer.

An optical system 64 was produced in the same manner as in the case of the optical system 62, except that instead of the laminate 301, the laminate 303 was used as an optical compensation layer.

An optical system 71 was produced in the same manner as in the case of the optical system 62, except that the laminate 115 (positive A plate (optically anisotropic layer B3)) was used as the first quarter wavelength plate, and the laminate 116 (negative A plate (optically anisotropic layer A3)) was used as the second quarter wavelength plate.

TABLE 2

| | | First Quarter Wavelength Plate | | Second Quarter Wavelength Plate | | Optical Compensation Layer Kind | Determination Whether Retardance of First Quarter Wavelength Plate and Retardance of Second Quarter Wavelength Plate are Equal or Not | Grade | |
|---|---|---|---|---|---|---|---|---|---|
| | | Kind | Incident Surface (surface facing image display device) | Kind | Incident Surface (surface facing image display device) | | | Ghost Image Visibility | Brightness of Main Image |
| Comparative Example 1 | Optical System 1 | laminate 101 | back side | laminate 101 | front side | absence | not equal | D | D |
| Comparative Example 2 | Optical System 2 | laminate 102 | back side | laminate 102 | front side | absence | not equal | D | D |
| Example 1 | Optical System 3 | laminate 103-1 | back side | laminate 103-2 | front side | absence | equal | C | B |
| Example 2 | Optical System 4 | laminate 104-1 | back side | laminate 104-2 | front side | absence | equal | B | B |
| Example 3 | Optical System 5 | laminate 105-1 | back side | laminate 105-2 | front side | absence | equal | B | B |
| Example 4 | Optical System 6 | laminate 106-1 | back side | laminate 106-2 | front side | absence | equal | B | B |
| Example 5 | Optical System 7 | laminate 107-1 | back side | laminate 107-2 | front side | absence | equal | B | B |
| Example 6 | Optical System 8 | laminate 108-1 | back side | laminate 108-2 | front side | absence | equal | B | B |
| Example 7 | Optical System 9 | laminate 109-1 | back side | laminate 109-2 | front side | absence | equal | A | B |
| Example 8 | Optical System 10 | laminate 110-1 | back side | laminate 110-2 | front side | absence | equal | A | A |
| Example 9 | Optical System 11 | laminate 111-1 | back side | laminate 111-2 | front side | absence | equal | A | A |
| Example 10 | Optical System 12 | laminate 112-1 | back side | laminate 112-2 | front side | absence | equal | A | A |
| Example 11 | Optical System 13 | laminate 113-1 | back side | laminate 113-2 | front side | absence | equal | A | A |
| Example 12 | Optical System 14 | laminate 109-1 | back side | laminate 109-2 | front side | absence | equal | AA | A |
| Example 13 | Optical System 15 | laminate 112-1 | back side | laminate 112-2 | front side | absence | equal | AA | A |
| Example 14 | Optical System 16 | laminate 113-1 | back side | laminate 113-2 | front side | absence | equal | AA | A |
| Example 15 | Optical System 50 | laminate 201 | back side | laminate 201 | front side | absence | equal | B | B |
| Example 16 | Optical System 51 | laminate 202 | back side | laminate 202 | front side | absence | equal | B | A |
| Example 17 | Optical System 17 | laminate 114-1 | back side | laminate 114-2 | front side | absence | equal | B | B |
| Example 18 | Optical System 61 | laminate 114-1 | back side | laminate 114-2 | front side | laminate 301 | equal | AA | A |
| Example 19 | Optical System 62 | laminate 114-1 | back side | laminate 114-2 | front side | laminate 301 | equal | AA | A |
| Example 20 | Optical System 63 | laminate 114-1 | back side | laminate 114-2 | front side | laminate 302 | equal | AA | A |
| Example 21 | Optical System 64 | laminate 114-1 | back side | laminate 114-2 | front side | laminate 303 | equal | AA | A |
| Example 22 | Optical System 71 | laminate 115 | back side | laminate 116 | front side | laminate 301 | equal | AA | A |

In Table 2, the column of Determination (equal retardance) shows whether the retardance of the first quarter wavelength plate and the retardance of the second quarter wavelength plate are equal.

In this column, whether the retardance of the first quarter wavelength plate and the retardance of the second quarter wavelength plate were equal (equal) or not (not equal) was determined on the basis of whether in the laminate in which the first quarter wavelength plate and the second quarter wavelength plate were bonded with a pressure sensitive adhesive, the result of the measurement of Re ($\lambda$) regarding incident light at a polar angle of 0° by AxoScan was $7\pi/30$ or less, and whether the result of the measurement of Re ($\lambda$) regarding incident light at a polar angle of 30° by AxoScan was $3\pi/50$ or less.

The wavelength $\lambda$ was selected from three wavelengths of $\lambda=450$ nm, 550 nm, and 630 nm, and the result was "equal" only in a case where the above expressions were satisfied at any of the wavelengths.

<Production of Cholesteric Reflective Polarizer 1>

As a temporary support, a polyethylene terephthalate (PET) film (A4100, manufactured by TOYOBO CO., LTD.) having a thickness of 50 μm was prepared. The PET film has an easy adhesion layer on one side.

The following composition was stirred and dissolved in a container kept warm at 70° C., and reflective layer coating liquids Ch-A, Ch-B, and Ch-C were thus prepared.

| Reflective Layer Coating Liquid Ch-A | |
|---|---|
| Methyl Ethyl Ketone | 120.9 parts by mass |
| Cyclohexanone | 21.3 parts by mass |
| Following Rod-Like Liquid Crystal Mixture | 100.0 parts by mass |
| Photopolymerization Initiator B | 1.00 part by mass |
| Following Chiral Agent A | 2.50 parts by mass |
| Following surfactant F1 | 0.027 parts by mass |
| Following Surfactant F2 | 0.067 parts by mass |

(Reflective Layer Coating Liquid Ch-B)

The reflective layer coating liquid Ch-B was prepared in the same manner as in the case of the reflective layer coating liquid Ch-A, except that the amount of the chiral agent A was changed to 3.50 parts by mass.

(Reflective Layer Coating Liquid Ch-C)

The reflective layer coating liquid Ch-C was prepared in the same manner as in the case of the reflective layer coating liquid Ch-A, except that the amount of the chiral agent A was changed to 4.50 parts by mass.

Rod-Like Liquid Crystal Mixture

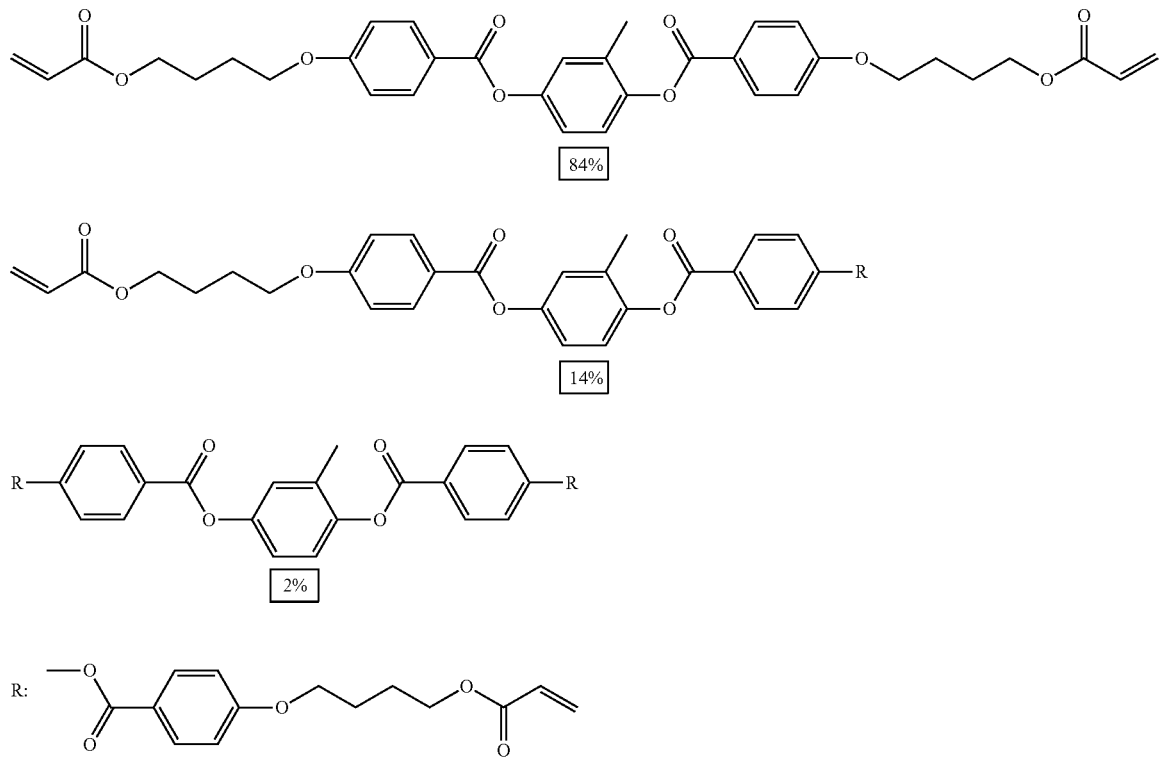

In the mixture, the numerical values represent mass %. In addition, R is a group bonded by an oxygen atom. Further, the average molar absorption coefficient of the rod-like liquid crystal at a wavelength of 300 to 400 nm was 140/mol-cm.

Chiral Agent A

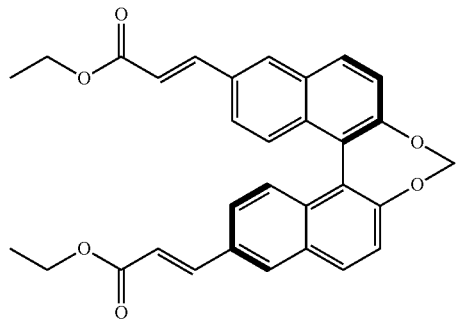

Surfactant F1

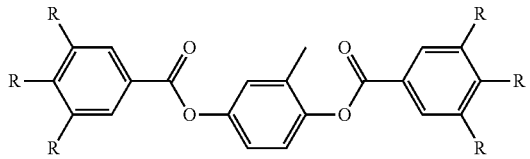

Surfactant F2

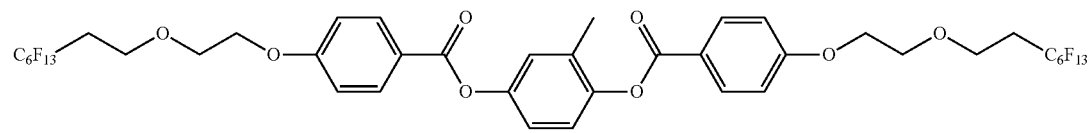

Photopolymerization Initiator B

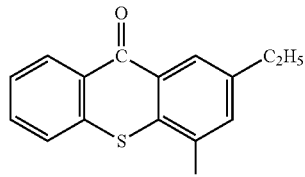

R = 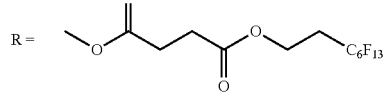

The chiral agent A is a chiral agent whose HTP is reduced by light.

A surface of the PET film shown above, having no easy adhesion layer, was rubbed, and the reflective layer coating liquid Ch-A prepared as above was applied using a #8 wire bar coater, and then dried for 120 seconds at 110° C.

After that, a cholesteric liquid crystal layer 1 was formed by applying light of a metal halide lamp having an illuminance of 80 mW with an irradiation dose of 500 mJ/cm² at 100° C. under a low oxygen atmosphere (100 ppm or less). The light irradiation was performed from the side of the cholesteric liquid crystal layer 1.

A cholesteric liquid crystal layer 2 was produced in the same procedures as in the case of the cholesteric liquid crystal layer 1, except that the coating liquid was Ch-B.

A cholesteric liquid crystal layer 3 was produced in the same procedures as in the case of the cholesteric liquid crystal layer 1, except that the coating liquid was Ch-C.

Cross-sections of the produced cholesteric liquid crystal layers 1, 2, and 3 were observed using a SEM, and a stripe pattern composed of bright portions and dark portions was observed in all of the cross-sections. In that case, intervals of the stripe pattern between the bright portions and the dark portions in the cholesteric liquid crystal layer did not change in the layer.

In addition, the thickness of each of the cholesteric liquid crystal layers 1, 2, and 3 was 4 μm.

As a support, a triacetyl cellulose (TAC) film (TG40, manufactured by FUJIFILM Corporation) was prepared.

The cholesteric liquid crystal layers 1, 2, and 3 were transferred to the support using a pressure sensitive adhesive (NCF-D692 (15), manufactured by Lintec Corporation), and a cholesteric reflective polarizer 1 in which the three cholesteric liquid crystal layers were laminated on the support (TAC film) was thus produced.

<Production of Cholesteric Reflective Polarizer 2>

As a temporary support, a PET film (A4100, manufactured by TOYOBO CO., LTD.) having a thickness of 50 m was prepared. The PET film has an easy adhesion layer on one side.

The following composition was stirred and dissolved in a container kept warm at 70° C., and a reflective layer coating liquid Ch-D was thus prepared.

| Reflective Layer Coating Liquid Ch-D | |
|---|---|
| Methyl Ethyl Ketone | 120.9 parts by mass |
| Cyclohexanone | 21.3 parts by mass |
| Following Rod-Like Liquid Crystal Mixture | 100.0 parts by mass |
| Photopolymerization Initiator B | 1.00 part by mass |
| Above Chiral Agent A | 3.90 parts by mass |
| Above Surfactant F1 | 0.027 parts by mass |
| Above Surfactant F2 | 0.067 parts by mass |

A surface of the PET film shown above, having no easy adhesion layer, was rubbed, and the reflective layer coating liquid Ch-A prepared as above was applied using a #19 wire bar coater, and then dried for 120 seconds at 110° C.

After that, a cholesteric liquid crystal layer 4 was formed by applying light of a metal halide lamp having an illuminance of 30 mW with an irradiation dose of 130 mJ/cm² at 90° C. under a low oxygen atmosphere (100 ppm or less) through an optical filter (SH0350, manufactured by Asahi Spectra Co., Ltd.), and applying light of a metal halide lamp having an illuminance of 80 mW with an irradiation dose of 500 mJ/cm² at 100° C. The light irradiation was performed from the side of the cholesteric liquid crystal layer 4.

A cross-section of the produced cholesteric liquid crystal layer 4 was observed using a SEM, and a stripe pattern composed of bright portions and dark portions was observed. In that case, it was confirmed that intervals of the stripe pattern between the bright portions and the dark portions in the cholesteric liquid crystal layer decreased toward the PET support.

In addition, the thickness of the cholesteric liquid crystal layer 4 was 12 μm.

As a transfer support, a TAC film (TG40, manufactured by FUJIFILM Corporation) was prepared.

The cholesteric liquid crystal layer 4 was transferred to the support using a pressure sensitive adhesive (NCF-D692 (15), manufactured by Lintec Corporation), and a cholesteric reflective polarizer 2 was thus produced.

<Production of Cholesteric Reflective Polarizer 3>

A cholesteric liquid crystal layer 4 was formed in the same manner as in the case of the cholesteric reflective polarizer 2, except that the cholesteric reflective polarizer 2 was used as a transfer support, and a cholesteric reflective polarizer 3 was thus produced.

<Production of Cholesteric Reflective Polarizer 4A>

A cholesteric reflective polarizer 4A was produced in the same manner as in the case of the cholesteric reflective polarizer 2, except that the amount of the chiral agent A was changed to 3.50 parts by mass to prepare a coating liquid Ch-E, and a cholesteric liquid crystal layer 5 was formed by applying light of a metal halide lamp having an illuminance of 70 mW with an irradiation dose of 110 mJ/cm$^2$ at 90° C. through an optical filter (SH0350, manufactured by Asahi Spectra Co., Ltd.).

<Production of Cholesteric Reflective Polarizer 4>

A cholesteric reflective polarizer 4 was produced by forming a cholesteric liquid crystal layer 6 in the same manner as in the case of the cholesteric reflective polarizer 4A, except that the amount of the chiral agent A was changed to 4.50 parts by mass to prepare a coating liquid Ch-F, and the cholesteric reflective polarizer 4A was used as a transfer support.

A cross-section of the produced cholesteric liquid crystal layer 6 was observed using a SEM, and a stripe pattern composed of bright portions and dark portions was observed.

In that case, it was confirmed that intervals of the stripe pattern between the bright portions and the dark portions in the cholesteric liquid crystal layer decreased toward the PET support.

Table 3 shows the characteristics of the cholesteric reflective polarizers 1 to 4 produced as above.

<Production of Cholesteric Reflective Polarizer 8 with Retardation Layer>

A cholesteric reflective polarizer 8 was produced in the same procedures as in the case of the cholesteric reflective polarizer 5, except that the retardation layer was transferred twenty times.

<Production of Cholesteric Reflective Polarizer 9 with Retardation Layer>

A cholesteric reflective polarizer 9 was produced in the same procedures as in the case of the cholesteric reflective polarizer 5, except that the retardation layer was transferred four times to the side of the cholesteric liquid crystal layer 4 and twenty times to the tack film side.

<Production of Cholesteric Reflective Polarizer 10 with Retardation Layer>

After the cholesteric reflective polarizer 4A having the cholesteric liquid crystal layer 5 formed therein was produced, the retardation layer was transferred twice to the surface of the cholesteric reflective polarizer 4A using a pressure sensitive adhesive (NCF-D692 (15), manufactured by Lintec Corporation).

After that, a cholesteric reflective polarizer 10 was produced by forming a cholesteric liquid crystal layer 6 in the same manner as in the case of the cholesteric reflective polarizer 4, except that the amount of the chiral agent A was changed to 4.50 parts by mass to prepare a coating liquid Ch-F, and the cholesteric reflective polarizer 4A obtained by transferring the retardation layer was used as a transfer support.

TABLE 3

|  | Pitch Gradient of Cholesteric Liquid Crystal Layer | Cholesteric Layer | Minimum Transmittance @ 450 to 650 nm [%] | Maximum Transmittance @ 450 to 650 nm [%] | Maximum Transmittance- Minimum Transmittance [%] |
| --- | --- | --- | --- | --- | --- |
| Linear Reflective Polarizer | — |  | 45.4 | 48.5 | 3.1 |
| Cholesteric Reflective Polarizer 1 | absence | three layers | 35.2 | 53.7 | 18.5 |
| Cholesteric Reflective Polarizer 2 | presence | one layer | 48.5 | 51.4 | 2.9 |
| Cholesteric Reflective Polarizer 3 | presence | two layers | 48.4 | 50.4 | 2.0 |
| Cholesteric Reflective Polarizer 4 | presence | two layers | 48.5 | 49.8 | 1.3 |

<Production of Cholesteric Reflective Polarizer 5 with Retardation Layer>

A retardation film was produced under the same conditions, except that the application amount was 9.5 cc/m$^2$ in the production method described in Example 1 in JP2019-95553A.

The optical anisotropy was measured by AxoScan, and in that case, Rth was −100 nm.

In order to use the retardation film as a retardation layer, the retardation film was transferred twice to the side of the cholesteric liquid crystal layer 4 of the cholesteric reflective polarizer 2 using a pressure sensitive adhesive (NCF-D692 (15), manufactured by Lintec Corporation), and a cholesteric reflective polarizer 5 was thus produced.

<Production of Cholesteric Reflective Polarizer 6 with Retardation Layer>

A cholesteric reflective polarizer 6 was produced in the same procedures as in the case of the cholesteric reflective polarizer 5, except that the retardation layer was transferred four times.

<Production of Cholesteric Reflective Polarizer 7 with Retardation Layer>

A cholesteric reflective polarizer 7 was produced in the same procedures as in the case of the cholesteric reflective polarizer 5, except that the retardation layer was transferred ten times to the tack film side.

(Reflective Layer Coating Liquid Ch-G)

A reflective layer coating liquid Ch-G was prepared in the same manner as in the case of the reflective layer coating liquid Ch-A, except that the amount of the chiral agent A was changed to 3.00 parts by mass.

(Reflective Layer Coating Liquid Ch-H)

A reflective layer coating liquid Ch-H was prepared in the same manner as in the case of the reflective layer coating liquid Ch-A, except that the amount of the chiral agent A was changed to 3.30 parts by mass.

(Reflective Layer Coating Liquid Ch-I)

A reflective layer coating liquid Ch-I was prepared in the same manner as in the case of the reflective layer coating liquid Ch-A, except that the amount of the chiral agent A was changed to 3.60 parts by mass.

(Reflective Layer Coating Liquid Ch-J)

A reflective layer coating liquid Ch-J was prepared in the same manner as in the case of the reflective layer coating liquid Ch-A, except that the amount of the chiral agent A was changed to 4.00 parts by mass.

(Reflective Layer Coating Liquid Ch-K)

A reflective layer coating liquid Ch-K was prepared in the same manner as in the case of the reflective layer coating liquid Ch-A, except that the amount of the chiral agent A was changed to 4.40 parts by mass.

A surface of the PET film shown above, having no easy adhesion layer, was rubbed, and the reflective layer coating liquid Ch-A prepared as above was applied using a #8.2 wire bar coater, and then dried for 120 seconds at 110° C. After that, a cholesteric liquid crystal layer 7 was formed by applying light of a metal halide lamp having an illuminance of 30 mW with an irradiation dose of 40 mJ/cm² at 90° C. under a low oxygen atmosphere (100 ppm or less) through an optical filter (SH0350, manufactured by Asahi Spectra Co., Ltd.), and applying light of a metal halide lamp having an illuminance of 80 mW with an irradiation dose of 500 mJ/cm² at 100° C. The light irradiation was performed from the side of the cholesteric liquid crystal layer 7.

A cross-section of the produced cholesteric liquid crystal layer 7 was observed using a SEM, and a stripe pattern composed of bright portions and dark portions was observed. In that case, it was confirmed that intervals of the stripe pattern between the bright portions and the dark portions in the cholesteric liquid crystal layer decreased toward the PET support.

In addition, the thickness of the cholesteric liquid crystal layer 7 was 4.1 µm.

A surface of the PET film shown above, having no easy adhesion layer, was rubbed, and the reflective layer coating liquid Ch-G prepared as above was applied using a #7.6 wire bar coater, and then dried for 120 seconds at 110° C. After that, a cholesteric liquid crystal layer 8 was formed by applying light of a metal halide lamp having an illuminance of 80 mW with an irradiation dose of 500 mJ/cm² at 100° C. under a low oxygen atmosphere (100 ppm or less). The light irradiation was performed from the side of the cholesteric liquid crystal layer 8.

A cholesteric liquid crystal layer 9 was formed in the same procedures as in the case of the cholesteric liquid crystal layer 8, except that the reflective layer coating liquid was Ch-H, and a #7.2 wire bar coater was used.

A cholesteric liquid crystal layer 10 was formed in the same procedures as in the case of the cholesteric liquid crystal layer 8, except that the reflective layer coating liquid was Ch-I, and a #6.6 wire bar coater was used.

A cholesteric liquid crystal layer 11 was formed in the same procedures as in the case of the cholesteric liquid crystal layer 8, except that the reflective layer coating liquid was Ch-J, and a #6.2 wire bar coater was used.

A cholesteric liquid crystal layer 12 was formed in the same procedures as in the case of the cholesteric liquid crystal layer 8, except that the reflective layer coating liquid was Ch-K, and a #5.6 wire bar coater was used.

Cross-sections of the produced cholesteric liquid crystal layers 8, 9, 10, 11, and 12 were observed using a SEM, and a stripe pattern composed of bright portions and dark portions was observed in all of the cross-sections. In that case, intervals of the stripe pattern between the bright portions and the dark portions in the cholesteric liquid crystal layer did not change in the layer.

In addition, the thicknesses of the cholesteric liquid crystal layers 8, 9, 10, 11, and 12 were 3.8 µm, 3.6 µm, 3.3 µm, 3.1 µm, and 2.8 µm, respectively.

<Production of Cholesteric Reflective Polarizer 11 with Retardation Layer>

As a support, a TAC film (TG40, manufactured by FUJIFILM Corporation) was prepared.

The cholesteric liquid crystal layer 7 was transferred to the support using a pressure sensitive adhesive (NCF-D692 (15), manufactured by Lintec Corporation), and the first light reflection layer (thickness: 5.8 µm) described in Example 22 in JP6277088B was transferred to the cholesteric liquid crystal layer 7 in the same manner as in Example 22 as a first retardation layer.

A second retardation layer was transferred in the same manner as in the case of the first retardation layer, except that the cholesteric liquid crystal layer 8 was transferred to the first retardation layer in the same manner as in the case of the cholesteric liquid crystal layer 7, and the film thickness of the cholesteric liquid crystal layer 8 was 4.3 µm.

A third retardation layer was transferred in the same manner as in the case of the first retardation layer, except that the cholesteric liquid crystal layer 9 was transferred to the second retardation layer in the same manner as in the case of the cholesteric liquid crystal layer 7, and the film thickness of the cholesteric liquid crystal layer 9 was 2.4 µm.

A fourth retardation layer was transferred in the same manner as in the case of the first retardation layer, except that the cholesteric liquid crystal layer 10 was transferred to the third retardation layer in the same manner as in the case of the cholesteric liquid crystal layer 7, and the film thickness of the cholesteric liquid crystal layer 10 was 1.4 µm.

A fifth retardation layer was transferred in the same manner as in the case of the first retardation layer, except that the cholesteric liquid crystal layer 11 was transferred to the fourth retardation layer in the same manner as in the case of the cholesteric liquid crystal layer 7, and the film thickness of the cholesteric liquid crystal layer 11 was 0.7 µm.

Furthermore, the cholesteric liquid crystal layer 12 was transferred to the fifth retardation layer in the same manner as in the case of the cholesteric liquid crystal layer 7.

Accordingly, a cholesteric reflective polarizer 11 having a total of 11 layers, i.e., 6 cholesteric liquid crystal layers and 5 retardation layers, was produced on the support (TAC film).

The layer structure of the cholesteric reflective polarizer 11 is schematically shown in FIG. 4.

<Production of Cholesteric Reflective Polarizer 12 with Retardation Layer>

The retardation layer was transferred three times to the cholesteric reflective polarizer 1, and a cholesteric reflective polarizer 12 was produced.

<Production of Cholesteric Reflective Polarizer 13 with Retardation Layer>

(Reflective Layer Coating Liquid Ch-L)

A reflective layer coating liquid Ch-L was prepared in the same manner as in the case of the reflective layer coating liquid Ch-A, except that the amount of the chiral agent A was changed to 4.45 parts by mass.

(Reflective Layer Coating Liquid Ch-M)

A reflective layer coating liquid Ch-M was prepared in the same manner as in the case of the reflective layer coating liquid Ch-A, except that the amount of the chiral agent A was changed to 3.40 parts by mass.

A surface of the PET film shown above, having no easy adhesion layer, was rubbed, and the reflective layer coating liquid Ch-L prepared as above was applied using a #5.6 wire bar coater, and then dried for 120 seconds at 110° C. After that, a cholesteric liquid crystal layer 13 was formed by applying light of a metal halide lamp having an illuminance of 80 mW with an irradiation dose of 500 mJ/cm² at 85° C. under a low oxygen atmosphere (100 ppm or less). The light irradiation was performed from the side of the cholesteric liquid crystal layer 13.

A cross-section of the produced cholesteric liquid crystal layer 13 was observed using a SEM, and a stripe pattern composed of bright portions and dark portions was observed. In that case, intervals of the stripe pattern between the bright portions and the dark portions in the cholesteric liquid crystal layer did not change in the layer.

In addition, the thickness of the cholesteric liquid crystal layer 13 was 2.8 µm.

A surface of the PET film shown above, having no easy adhesion layer, was rubbed, and the reflective layer coating liquid Ch-M prepared as above was applied using a #12 wire bar coater, and then dried for 120 seconds at 110° C. After that, a cholesteric liquid crystal layer 14 was formed by applying light of a metal halide lamp having an illuminance of 30 mW with an irradiation dose of 60 mJ/cm$^2$ at 75° C. under a low oxygen atmosphere (100 ppm or less) through an optical filter (SH0350, manufactured by Asahi Spectra Co., Ltd.), and applying light of a metal halide lamp having an illuminance of 80 mW with an irradiation dose of 500 mJ/cm$^2$ at 100° C. The light irradiation was performed from the side of the cholesteric liquid crystal layer 14.

A cross-section of the produced cholesteric liquid crystal layer 14 was observed using a SEM, and a stripe pattern composed of bright portions and dark portions was observed. In that case, it was confirmed that intervals of the stripe pattern between the bright portions and the dark portions in the cholesteric liquid crystal layer decreased toward the PET support.

In addition, the thickness of the cholesteric liquid crystal layer 14 was 7.3 µm.

A retardation film was produced under the same conditions, except that the application amount was 28 cc/m$^2$ in the production method described in Example 1 in JP2019-95553A.

The optical anisotropy was measured by AxoScan, and in that case, Rth (550) was −300 nm.

As a transfer support, FUJITAC ZRD40 manufactured by FUJIFILM Corporation was prepared. The cholesteric liquid crystal layers 14 and 13 were transferred to the support using a pressure sensitive adhesive (NCF-D692 (5), manufactured by Lintec Corporation), so that the two cholesteric liquid crystal layers were laminated on the support (TAC film). Next, in order to use the retardation film as a retardation layer, the retardation film was transferred once to the side of the cholesteric liquid crystal layer 13 using a pressure sensitive adhesive (NCF-D692 (15), manufactured by Lintec Corporation), and a cholesteric reflective polarizer 13 was thus produced.

<Production of Cholesteric Reflective Polarizer 14 with Retardation Layer>

As a transfer support, FUJITAC ZRD40 manufactured by FUJIFILM Corporation was prepared. The cholesteric liquid crystal layer 14 was transferred to the support using a pressure sensitive adhesive (NCF-D692 (5), manufactured by Lintec Corporation), so that the one cholesteric liquid crystal layer was laminated on the support (TAC film). Next, the same retardation film as that of the cholesteric reflective polarizer 13 with a retardation layer was transferred to the cholesteric liquid crystal layer 14 using a pressure sensitive adhesive (NCF-D692 (15), manufactured by Lintec Corporation). Finally, the cholesteric liquid crystal layer 13 was transferred using a pressure sensitive adhesive (NCF-D692 (5), manufactured by Lintec Corporation), and a cholesteric reflective polarizer 14 with a retardation layer was thus produced.

<Production of Cholesteric Reflective Polarizer 15 with Retardation Layer>

A cholesteric liquid crystal layer 15 was formed in the same procedures as in the case of the cholesteric liquid crystal layer 14, except that instead of the rubbed PET film, the cholesteric liquid crystal layer 13 applied on the PET shown above was used as a support.

A cross-section of the produced cholesteric liquid crystal layer 15 was observed using a SEM, and a stripe pattern composed of bright portions and dark portions was observed. It was confirmed that intervals of the stripe pattern between the bright portions and the dark portions in the cholesteric liquid crystal layer were 7.3 µm in a region where the intervals decreased toward the PET support side, and were 2.8 µm in a region where the intervals did not change toward the PET support side.

In addition, the thickness of the cholesteric liquid crystal layer 15 was 10.1 µm.

As a transfer support, FUJITAC ZRD40 manufactured by FUJIFILM Corporation was prepared. The cholesteric liquid crystal layer 15 was transferred to the support using a pressure sensitive adhesive (NCF-D692 (5), manufactured by Lintec Corporation), so that the cholesteric liquid crystal layer was laminated on the support (TAC film). Next, the same retardation film as that of the cholesteric reflective polarizer 13 with a retardation layer was transferred once to the cholesteric liquid crystal layer 15 using a pressure sensitive adhesive (NCF-D692 (15), manufactured by Lintec Corporation), and a cholesteric reflective polarizer 15 was thus produced.

<Production of Cholesteric Reflective Polarizer 16 with Retardation Layer>

The cholesteric liquid crystal layer 15 was temporarily transferred to MASTACK AS3-304, manufactured by FUJIMORI KOGYO CO., LTD. Then, the cholesteric liquid crystal layer 15 was transferred again to FUJITAC ZRD40 manufactured by FUJIFILM Corporation using a pressure sensitive adhesive (NCF-D692 (5), manufactured by Lintec Corporation), so that the cholesteric liquid crystal layer was laminated on the support (TAC film). Next, the same retardation film as that of the cholesteric reflective polarizer 13 with a retardation layer was transferred once to the cholesteric liquid crystal layer 15 using a pressure sensitive adhesive (NCF-D692 (15), manufactured by Lintec Corporation), and a cholesteric reflective polarizer 16 was thus produced.

<Production of Cholesteric Reflective Polarizer 17 with Retardation Layer>

As a transfer support, FUJITAC ZRD40 manufactured by FUJIFILM Corporation was prepared. The cholesteric liquid crystal layer 15 was transferred to the support using a pressure sensitive adhesive (NCF-D692 (5), manufactured by Lintec Corporation), so that the cholesteric liquid crystal layer was laminated on the support (TAC film). A surface of the cholesteric liquid crystal layer 15 was subjected to a corona treatment with a discharge amount of 150 W·min/m$^2$, and a composition 1 for forming retardation layer prepared with the following composition was applied to the surface subjected to the corona treatment using a wire bar.

Then, heating was performed for 90 seconds with hot air at 70° C. in order to dry the solvent of the composition and to align and age the liquid crystal compound. Ultraviolet irradiation (300 mJ/cm$^2$) was performed at 40° C. with an oxygen concentration of 0.1% under a nitrogen purge to fix the alignment of the liquid crystal compound, and a cholesteric reflective polarizer 17 with a retardation layer was thus prepared. Rth (550) of the retardation layer was −300 nm.

| Retardation Layer Forming Composition 1 | |
|---|---|
| Liquid Crystal Compound R1 | 10.0 parts by mass |
| Liquid Crystal Compound R2 | 54.0 parts by mass |
| Liquid Crystal Compound R3 | 28.0 parts by mass |
| Polymerizable Compound C1 | 8.0 parts by mass |
| Compound D1 | 4.5 parts by mass |
| Monomer K1 | 8.0 parts by mass |
| Polymerization Initiator S1 | 3.0 parts by mass |
| Surfactant F3 | 0.4 parts by mass |
| Surfactant F4 | 0.5 parts by mass |
| Methyl Ethyl Ketone | 175.0 parts by mass |
| Cyclopentanone | 75.0 parts by mass |
| Methanol | 12.5 parts by mass |
| Isopropanol | 12.5 parts by mass |

Liquid Crystal Compound R1

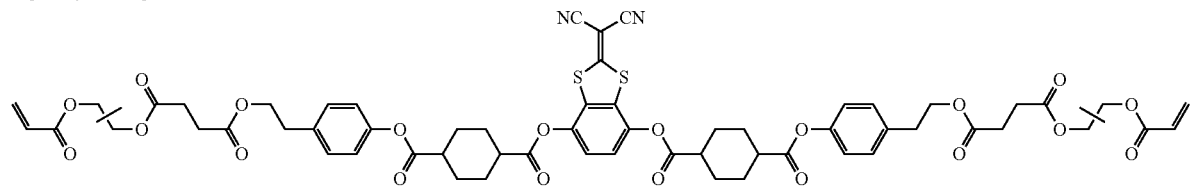

Liquid Crystal Compound R2

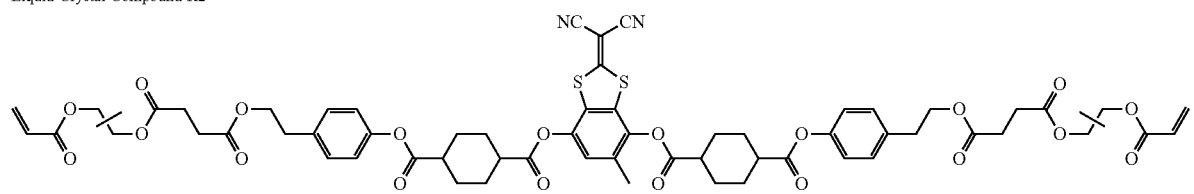

Liquid Crystal Compound R3
Mixture of Following Liquid Crystal Compounds (RA), (RB), and (RC) of 83:15:2 (mass ratio)
(RA)

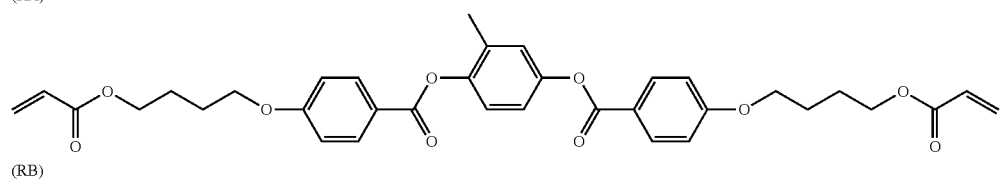

(RB)

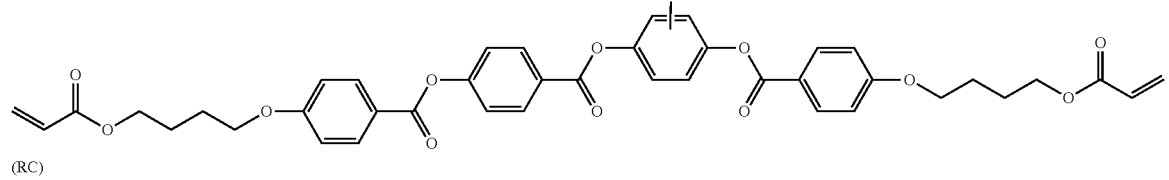

(RC)

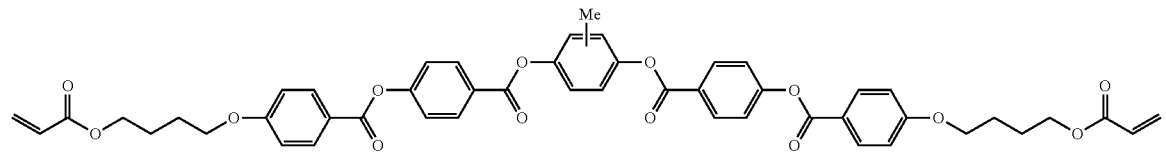

Polymerizable Compound C1

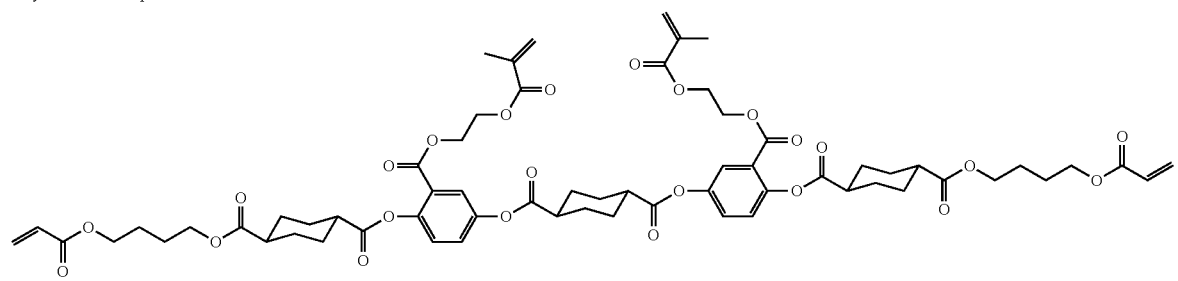

| Retardation Layer Forming Composition 1 |
|---|

Compound D1

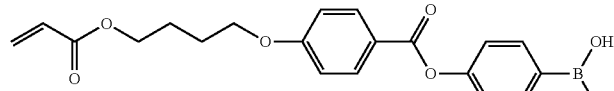

Monomer K1: A-600 (manufactured by SHIN-NAKAMURA CHEMICAL CO., LTD.)
Polymerization Initiator S1

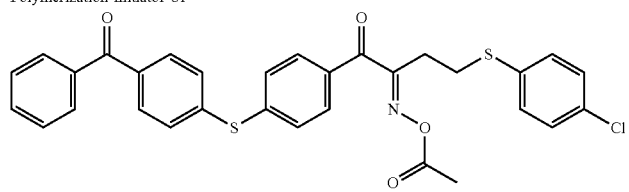

Surfactant F3

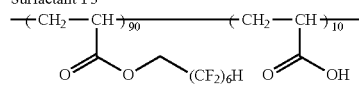

Mw: 15 k
The numerical values in the structure represent mass %
Surfactant F4 (weight average molecular weight: 11,200)
(In the following formula: a to d satisfy a:b:c:d = 56:10:29:5, and each represents the content (mol %) of each repeating unit with respect to all the repeating units in the resin.)

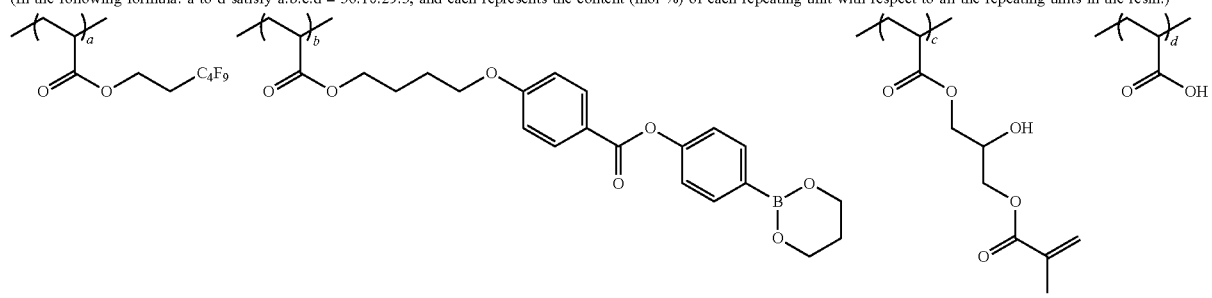

In the cholesteric liquid crystal layers with a retardation layer described above, the retardation layers were all obtained by fixing a vertically aligned rod-like liquid crystal compound.

<Production of Cholesteric Reflective Polarizer 18>

(Reflective Layer Coating liquid Ch-N)

The following composition was stirred and dissolved in a container kept warm at 50° C., and a reflective layer coating liquid Ch-N was thus prepared.

| Reflective Layer Coating Liquid Ch-N | |
|---|---|
| Above Disk-Like Liquid Crystal (A) | 80 parts by mass |
| Above Disk-Like Liquid Crystal (B) | 20 parts by mass |
| Polymerizable Monomer E1 | 10 parts by mass |
| Surfactant F5 | 0.3 parts by mass |
| Photopolymerization Initiator (IRGACURE 907, manufactured by BASF SE) | 3 parts by mass |
| Chiral Agent A | 5.04 parts by mass |

| -continued | |
|---|---|
| Reflective Layer Coating Liquid Ch-N | |
| Methyl Ethyl Ketone | 290 parts by mass |
| Cyclohexanone | 50 parts by mass |

Polymerizable Monomer E1

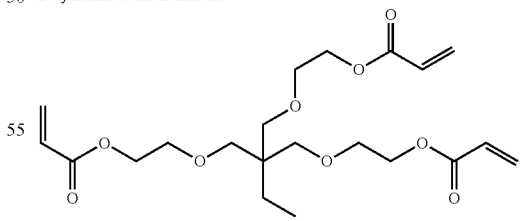

Surfactant F5 a/b = 98/2

As a transfer support, FUJITAC ZRD40 manufactured by FUJIFILM Corporation was prepared. The cholesteric liquid crystal layer 14 was transferred to the support using a pressure sensitive adhesive (NCF-D692 (5), manufactured by Lintec Corporation), so that the cholesteric liquid crystal layer was laminated on the support (TAC film). A surface of the cholesteric liquid crystal layer 14 was subjected to a corona treatment with a discharge amount of 150 W·min/m², and the reflective layer coating liquid Ch-N prepared with the above-described composition was applied to the surface subjected to the corona treatment using a wire bar.

Subsequently, the coating film was dried for 2 minutes at 70° C. to vaporize the solvent, and then heated and aged for 3 minutes at 115° C. to obtain a uniform alignment state. After that, the coating film was held at 45° C. and irradiated with ultraviolet rays (300 mJ/cm²) using a high pressure mercury lamp under a nitrogen atmosphere to produce a cholesteric liquid crystal layer 16, and a cholesteric reflective polarizer 18 was thus obtained.

A cross-section of the produced cholesteric liquid crystal layer 16 was observed using a SEM, and a stripe pattern composed of bright portions and dark portions was observed. In that case, it was confirmed that intervals of the stripe pattern between the bright portions and the dark portions in the cholesteric liquid crystal layer were 4.0 μm in a region where the intervals did not change toward the TAC film support side, and were 7.3 μm in a region where the intervals increased toward the TAC film support.

In addition, the thickness of the cholesteric liquid crystal layer 16 was 11.3 μm.

<Production of Cholesteric Reflective Polarizer 19>

The cholesteric liquid crystal layer 14 was temporarily transferred to MASTACK AS3-304, manufactured by FUJIMORI KOGYO CO., LTD. Then, the cholesteric liquid crystal layer 14 was transferred again to FUJITAC ZRD40 manufactured by FUJIFILM Corporation using a pressure sensitive adhesive (NCF-D692 (5), manufactured by Lintec Corporation), so that the cholesteric liquid crystal layer was laminated on the support (TAC film).

A surface of the cholesteric liquid crystal layer 14 was subjected to a corona treatment with a discharge amount of 150 W·min/m², and the reflective layer coating liquid Ch-N prepared with the above-described composition was applied to the surface subjected to the corona treatment using a wire bar.

Subsequently, the coating film was dried for 2 minutes at 70° C. to vaporize the solvent, and then heated and aged for 3 minutes at 115° C. to obtain a uniform alignment state. After that, the coating film was held at 45° C. and irradiated with ultraviolet rays (300 mJ/cm²) using a high pressure mercury lamp under a nitrogen atmosphere to produce a cholesteric liquid crystal layer 17, and a cholesteric reflective polarizer 19 was thus obtained.

A cross-section of the produced cholesteric liquid crystal layer 17 was observed using a SEM, and a stripe pattern composed of bright portions and dark portions was observed. In that case, it was confirmed that intervals of the stripe pattern between the bright portions and the dark portions in the cholesteric liquid crystal layer were 4.0 μm in a region where the intervals did not change toward the TAC film support side, and were 7.3 μm in a region where the intervals increased toward the TAC film support.

In addition, the thickness of the cholesteric liquid crystal layer 17 was 11.3 μm.

Since the thickness of the cholesteric liquid crystal layer 14 in the cholesteric reflective polarizers 18 and 19 was 7.3 μm, the disk-like cholesteric liquid crystal layer consisting of the reflective layer coating liquid Ch-N having a disk-like liquid crystal compound had a thickness of 4.0 μm.

The optical anisotropy of the disk-like cholesteric liquid crystal layer having a thickness of 4.0 μm was measured by AxoScan, and in that case, Rth (550) was −260 nm. In addition, the disk-like cholesteric liquid crystal layer was a layer obtained by fixing a vertically aligned disk-like liquid crystal compound.

<Production of Cholesteric Reflective Polarizer 20 with Retardation Layer>

The cholesteric liquid crystal layer 13 applied onto the PET shown above was temporarily transferred to MASTACK AS3-304, manufactured by FUJIMORI KOGYO CO., LTD.

After that, the reflective layer coating liquid Ch-M was applied to the side of the cholesteric liquid crystal layer 13 (a surface of the cholesteric liquid crystal layer 13 brought into contact with the rubbed support) using a #12 wire bar coater, and then dried for 120 seconds at 110° C. After that, a cholesteric liquid crystal layer 14 was formed by applying light of a metal halide lamp having an illuminance of 30 mW with an irradiation dose of 60 mJ/cm² at 75° C. under a low oxygen atmosphere (100 ppm or less) through an optical filter (SH0350, manufactured by Asahi Spectra Co., Ltd.), and applying light of a metal halide lamp having an illuminance of 80 mW with an irradiation dose of 500 mJ/cm² at 100° C. The light irradiation was performed from the side of the cholesteric liquid crystal layer 14.

After that, a laminate of the cholesteric liquid crystal layers 13 and 14 was transferred to FUJITAC ZRD40 manufactured by FUJIFILM Corporation using a pressure sensitive adhesive (NCF-D692 (5), manufactured by Lintec Corporation), so that a cholesteric liquid crystal layer 18 was laminated on the support (TAC film).

A cross-section of the produced cholesteric liquid crystal layer 18 was observed using a SEM, and a stripe pattern composed of bright portions and dark portions was observed. It was confirmed that intervals of the stripe pattern between the bright portions and the dark portions in the cholesteric liquid crystal layer were 2.8 μm in a region where the intervals did not change toward the TAC support side, and were 7.3 m in a region where the intervals increased toward the TAC support side. In addition, the thickness of the cholesteric liquid crystal layer 18 was 10.1 μm.

A surface of the cholesteric liquid crystal layer 18 was subjected to a corona treatment with a discharge amount of 150 W·min/m², and the above-described composition 1 for forming retardation layer was applied to the surface subjected to the corona treatment using a wire bar. Then, heating was performed for 90 seconds with hot air at 70° C. in order to dry the solvent of the composition and to align and age the liquid crystal compound. Ultraviolet irradiation (300 mJ/cm²) was performed at 40° C. with an oxygen concentration of 0.1% under a nitrogen purge to fix the alignment of the liquid crystal compound, and a cholesteric reflective polarizer 20 with a retardation layer was thus produced. Rth (550) of the retardation layer was −300 nm.

Table 4 shows the characteristics of the cholesteric reflective polarizers 5 to 20 produced as above.

TABLE 4

| | Presence or Absence and Rth Value of Retardation Layer Closer to Visible Side Than Support | Support | Pitch Gradient of Cholesteric Liquid Crystal Layer | Cholesteric Liquid Crystal Layer | Presence or Absence and Rth Value of Retardation Layer Closer to Image Display Side Than Support | Minimum Transmittance @ 450 to 650 nm [%] | Maximum Transmittance @ 450 to 650 nm [%] | Maximum Transmittance-Minimum Transmittance [%] |
|---|---|---|---|---|---|---|---|---|
| Cholesteric Reflective Polarizer 5 | absence | tack film | presence | Cholesteric Liquid Crystal Layer 4 | −200 | 48.5 | 51.4 | 2.9 |
| Cholesteric Reflective Polarizer 6 | absence | | presence | Cholesteric Liquid Crystal Layer 4 | −400 | 48.5 | 51.4 | 2.9 |
| Cholesteric Reflective Polarizer 7 | −1000 | | presence | Cholesteric Liquid Crystal Layer 4 | absence | 48.5 | 51.4 | 2.9 |
| Cholesteric Reflective Polarizer 8 | −2000 | | presence | Cholesteric Liquid Crystal Layer 4 | absence | 48.5 | 51.4 | 2.9 |
| Cholesteric Reflective Polarizer 9 | −2000 | | presence | Cholesteric Liquid Crystal Layer 4 | −400 | 48.5 | 51.4 | 2.9 |
| Cholesteric Reflective Polarizer 10 | absence | | presence | Cholesteric Liquid Crystal Layer 5 Cholesteric Liquid Crystal Layer 6 | −200 | 48.5 | 49.8 | 1.3 |
| Cholesteric Reflective Polarizer 11 | absence | | presence | Cholesteric Liquid Crystal Layer 7 Cholesteric Liquid Crystal Layer 8 Cholesteric Liquid Crystal Layer 9 Cholesteric Liquid Crystal Layer 10 Cholesteric Liquid Crystal Layer 11 Cholesteric Liquid Crystal Layer 12 | −1460 | 47.9 | 50.2 | 2.3 |
| Cholesteric Reflective Polarizer 12 | absence | | absence | Cholesteric Liquid Crystal Layer 1 Cholesteric Liquid Crystal Layer 2 Cholesteric Liquid Crystal Layer 3 | −300 | 35.2 | 53.7 | 18.5 |
| Cholesteric Reflective Polarizer 13 | absence | | presence | Cholesteric Liquid Crystal Layer 13 Cholesteric Liquid Crystal Layer 14 | −300 | 20.2 | 51.1 | 30.9 |
| Cholesteric Reflective Polarizer 14 | absence | | presence | Cholesteric Liquid Crystal Layer 13 Cholesteric Liquid Crystal Layer 14 | −300 | 20.2 | 51.1 | 30.9 |
| Cholesteric Reflective Polarizer 15 | absence | | presence | Cholesteric Liquid Crystal Layer 15 | −300 | 20.2 | 51.1 | 30.9 |
| Cholesteric Reflective Polarizer 16 | absence | | presence | Cholesteric Liquid Crystal Layer 15 | −300 | 20.2 | 50.9 | 30.7 |
| Cholesteric Reflective Polarizer 17 | absence | | presence | Cholesteric Liquid Crystal Layer 15 | −300 | 20.2 | 51.1 | 30.9 |

TABLE 4-continued

| | Presence or Absence and Rth Value of Retardation Layer Closer to Visible Side Than Support | Support | Pitch Gradient of Cholesteric Liquid Crystal Layer | Cholesteric Liquid Crystal Layer | Presence or Absence and Rth Value of Retardation Layer Closer to Image Display Side Than Support | Minimum Transmittance @ 450 to 650 nm [%] | Maximum Transmittance @ 450 to 650 nm [%] | Maximum Transmittance-Minimum Transmittance [%] |
|---|---|---|---|---|---|---|---|---|
| Cholesteric Reflective Polarizer 18 | absence | | presence | Cholesteric Liquid Crystal Layer 16 | absence | 12.5 | 50.8 | 38.3 |
| Cholesteric Reflective Polarizer 19 | absence | | presence | Cholesteric Liquid Crystal Layer 17 | absence | 12.5 | 50.8 | 38.3 |
| Cholesteric Reflective Polarizer 20 | absence | | presence | Cholesteric Liquid Crystal Layer 18 | −300 | 20.2 | 51.1 | 30.9 |

Comparative Example 10 and Examples 81 to 90, 92 to 98, and 100

As shown in FIG. 5, the second quarter wavelength plate and the reflective polarizer were removed from the optical system 2 of Comparative Example 2, and the produced cholesteric reflective polarizers 1 to 11 and 13 to 20 were disposed instead as a reflection circular polarizer to produce an optical system 80 of Comparative Example 10 and optical systems 90 to 100, 102 to 108, and 110 of Examples 81 to 90 and 92 to 98 were produced (see FIG. 2).

The cholesteric reflective polarizers 1 to 11 and 13 to 20 were disposed so that the TAC film side thereof was on the visible side.

Example 99

An optical system 109 of Example 99 was produced in the same manner as in the case of the optical system 108, except that the linear polarizer (1007 in FIG. 2) was changed to an absorption type polarizer produced as described later in the optical system 108 of Example 98.

[Production of Absorption Type Polarizer]

<Production of Transparent Support 1>

An alignment layer forming coating liquid PA1 to be described later was continuously applied onto a cellulose acylate film (TAC substrate having a thickness of 40 μm; TG40 manufactured by FUJIFILM Corporation) using a wire bar. The support on which the coating film had been formed was dried for 120 seconds with hot air at 140° C., and then the coating film was irradiated with polarized ultraviolet rays (10 mJ/cm², using an ultra-high pressure mercury lamp) to form a photoalignment layer PAL. Thus, a TAC film with a photoalignment layer was obtained.

The film thickness was 0.3 μm.

| (Alignment Layer Forming Coating liquid PA1) | |
|---|---|
| Following Polymer PA-1 | 100.00 parts by mass |
| Following Acid Generator PAG-1 | 5.00 parts by mass |
| Following Acid Generator CPI-110TF | 0.005 parts by mass |
| Xylene | 1220.00 parts by mass |
| Methyl Isobutyl Ketone | 122.00 parts by mass |

Polymer PA-1

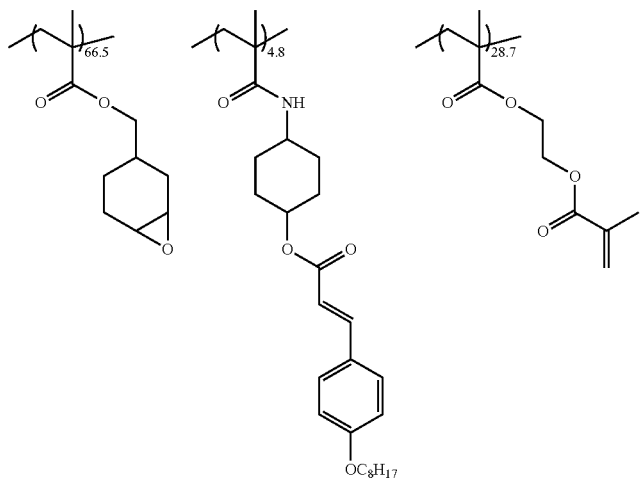

| (Alignment Layer Forming Coating liquid PA1) |
|---|

Acid Generator PAG-1

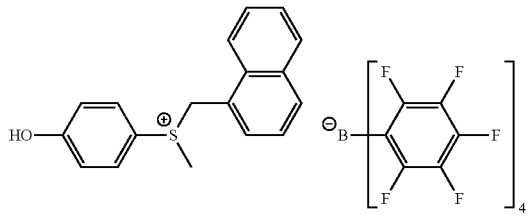

Acid Generator CPI-110F

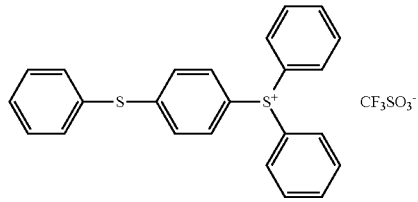

<Formation of Light Absorption Anisotropic Layer P1>

The following composition P1 for forming light absorption anisotropic layer was continuously applied onto the obtained alignment layer PA1 using a wire bar to form a coating layer P1.

Next, the coating layer P1 was heated for 30 seconds at 140° C., and cooled to room temperature (23° C.).

Next, the coating layer was heated for 60 seconds at 90° C., and cooled again to room temperature.

After that, the coating layer was irradiated with light for 2 seconds under irradiation conditions of an illuminance of 200 mW/cm$^2$ using an LED lamp (central wavelength: 365 nm), and thus a light absorption anisotropic layer P1 was produced on the alignment layer PA1.

The film thickness was 1.6 μm.

The above laminate was defined as a laminate 1B.

| Composition of Light Absorption Anisotropic Layer Forming Composition P1 | |
|---|---|
| Following Dichroic Substance D-1 | 0.25 parts by mass |
| Following Dichroic Substance D-2 | 0.36 parts by mass |
| Following Dichroic Substance D-3 | 0.59 parts by mass |
| Following Polymer Liquid Crystalline Compound P-1 | 2.21 parts by mass |
| Following Low-Molecular-Weight Liquid Crystalline Compound M-1 | 1.36 parts by mass |
| Polymerization Initiator IRGACURE OXE-02 (manufactured by BASF SE) | 0.200 parts by mass |
| Following Surfactant F-1 | 0.026 parts by mass |
| Cyclopentanone | 46.00 parts by mass |
| Tetrahydrofuran | 46.00 parts by mass |
| Benzyl Alcohol | 3.00 parts by mass |

D-1

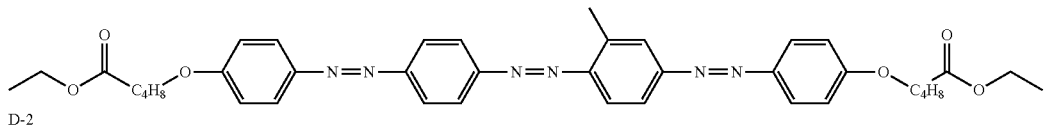

D-2

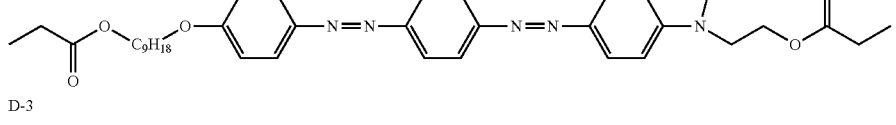

D-3

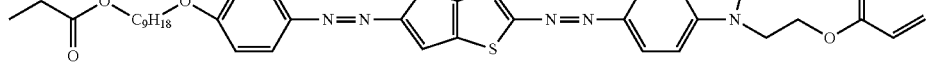

Polymer Liquid Crystalline Compound P-1

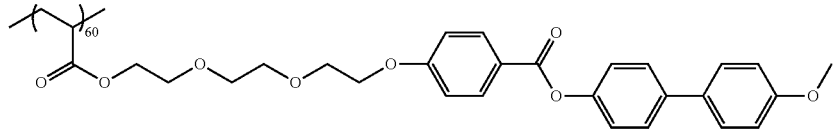

Composition of Light Absorption Anisotropic Layer Forming Composition P1

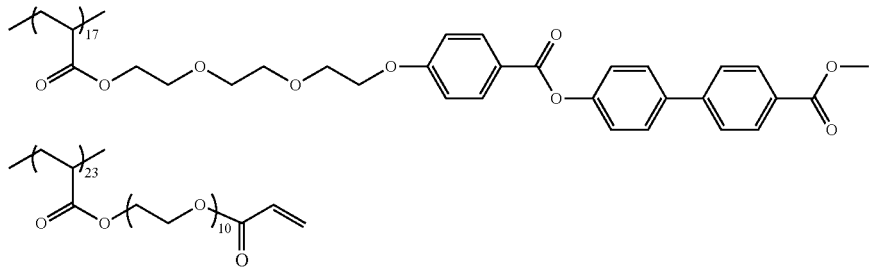

Low-Molecular-Weight Liquid Crystalline Compound M-1

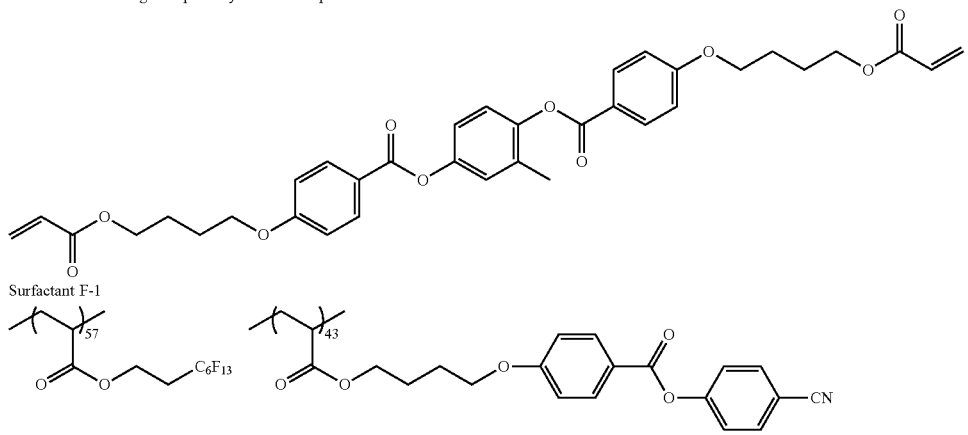

Surfactant F-1

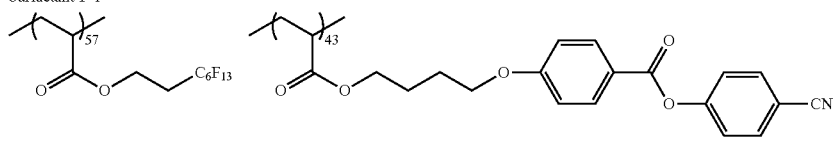

<Creation of UV Adhesive>

The following UV adhesive composition was prepared.

| UV Adhesive Composition | |
|---|---|
| CEL2021P (manufactured by Daicel Corporation) | 70 parts by mass |
| 1,4-Butanediol Diglycidyl Ether | 20 parts by mass |
| 2-Ethylhexyl Glycidyl Ether | 10 parts by mass |
| CPI-100P | 2.25 parts by mass |

CPI-100P

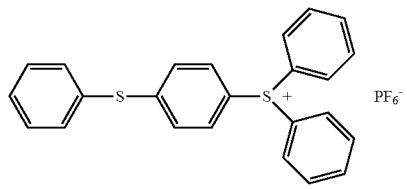

<Creation of Absorption Type Polarizing Film>

TECHNOLOGY SONG (50 μm-thick methacrylic resin, tan δ peak temperature: 128° C., manufactured by Sumika Acryl Co., Ltd.) was bonded as a resin substrate S1 to a surface of the light absorption anisotropic layer of the laminate 1B using the above UV agent. After that, only the cellulose acylate film 1 was peeled off to create an absorption type polarizing film in which the resin substrate, the adhesive layer, the light absorption anisotropic layer, and the alignment layer were disposed in this order. The thickness of the UV adhesive layer was 2 μm.

Comparative Example 11 and Example 91

As shown in Table 6, the second quarter wavelength plate and the reflective polarizer were removed from the optical system 2 of Comparative Example 2, and the produced cholesteric reflective polarizer 12 was disposed instead as a reflection circular polarizer so that the TAC film side was on the visible side.

Next, the light source was taken out of the image display device, and an A-light source (LW100V57W55/2P, manufactured by OHM ELECTRIC INC.) was disposed instead to produce an optical system 101 of Comparative Example 11. The A-light source is a light source whose emission spectrum (light source spectrum) does not have two or more maximal values in a visible light range.

In addition, the light source of the image display device was disposed after the LED light source used as a backlight used for a commercially available liquid crystal television (KDL46W900A, manufactured by Sony Group Corporation) and the backlight member were taken out, so that an optical system 102 of Example 91 was produced. The backlight unit of the commercially available liquid crystal television has a maximal value (peak top) at a wavelength of 450 nm, a wavelength of 530 nm, and a wavelength of 630 nm. In addition, in the backlight unit of the commercially available liquid crystal television, the peak of the maximal value at a wavelength of 450 nm, the peak of the maximal value at a wavelength of 530 nm, and the peak of the maximal value at a wavelength of 630 nm have a full width at half maximum of 60 nm or less.

Using AxoScan and a spectrophotometer (V-550, manufactured by JASCO Corporation) equipped with a large integrating sphere device (ILV-471, manufactured by JASCO Corporation), it was confirmed that the reflection wavelength range of the cholesteric reflective polarizer 12 (cholesteric liquid crystal layers 1, 2, and 3) was equal to or wider than a wavelength range of the full width at half maximum of a peak corresponding to the emitted light of the backlight unit and is equal to or narrower than a wavelength range at 5% of each maximal value.

TABLE 5

| | | First λ/4 Plate | | Second λ/4 Plate | | | | |
| --- | --- | --- | --- | --- | --- | --- | --- | --- |
| | | Kind | Incident Surface (surface facing image display device) | Kind | Incident Surface (surface facing image display device) | Reflective Polarizer Kind | Grade Ghost Visibility | Brightness of Main Image |
| Comparative Example 2 | Optical System 2 | laminate 102 | back side | laminate 102 | front side | linear reflective polarizer | D | D |
| Comparative Example 10 | Optical System 80 | laminate 102 | back side | absence | absence | cholesteric reflective polarizer 1 | D | D |
| Example 81 | Optical System 90 | laminate 102 | back side | absence | absence | cholesteric reflective polarizer 2 | C | C |
| Example 82 | Optical System 91 | laminate 102 | back side | absence | absence | cholesteric reflective polarizer 3 | B | B |
| Example 82 | Optical System 93 | laminate 102 | back side | absence | absence | cholesteric reflective polarizer 4 | A | A |
| Example 84 | Optical System 94 | laminate 102 | back side | absence | absence | cholesteric reflective polarizer 5 | B | B |
| Example 85 | Optical System 95 | laminate 102 | back side | absence | absence | cholesteric reflective polarizer 6 | A | A |
| Example 86 | Optical System 96 | laminate 102 | back side | absence | absence | cholesteric reflective polarizer 7 | A | B |
| Example 87 | Optical System 97 | laminate 102 | back side | absence | absence | cholesteric reflective polarizer 8 | AA | B |
| Example 88 | Optical System 98 | laminate 102 | back side | absence | absence | cholesteric reflective polarizer 9 | AA | A |
| Example 89 | Optical System 99 | laminate 102 | back side | absence | absence | cholesteric reflective polarizer 10 | AA | A |
| Example 90 | Optical System 100 | laminate 102 | back side | absence | absence | cholesteric reflective polarizer 11 | AA | A |
| Example 92 | Optical System 102 | laminate 102 | back side | absence | absence | cholesteric reflective polarizer 13 | A | A |
| Example 93 | Optical System 103 | laminate 102 | back side | absence | absence | cholesteric reflective polarizer 14 | A | A |
| Example 94 | Optical System 104 | laminate 102 | back side | absence | absence | cholesteric reflective polarizer 15 | AA | A |
| Example 95 | Optical System 105 | laminate 102 | back side | absence | absence | cholesteric reflective polarizer 16 | AA | A |
| Example 96 | Optical System 106 | laminate 102 | back side | absence | absence | cholesteric reflective polarizer 17 | AA | A |
| Example 97 | Optical System 107 | laminate 102 | back side | absence | absence | cholesteric reflective polarizer 18 | AA | A |
| Example 98 | Optical System 108 | laminate 102 | back side | absence | absence | cholesteric reflective polarizer 19 | AA | A |
| Example 99 | Optical System 109 | laminate 102 | back side | absence | absence | cholesteric reflective polarizer 19 | AA | A |
| Example 100 | Optical System 110 | laminate 102 | back side | absence | absence | cholesteric reflective polarizer 20 | AA | A |

TABLE 6

| | | First λ/4 Plate | | Second λ/4 Plate | | | | Evaluation | |
| --- | --- | --- | --- | --- | --- | --- | --- | --- | --- |
| | | Kind | Incident Surface (surface facing image display device) | Kind | Incident Surface (surface facing image display device) | Reflective Polarizer Kind | Light Source Kind | Ghost Visibility | Brightness of Main Image |
| Comparative Example 11 | Optical System 101 | laminate 102 | back side | absence | absence | cholesteric reflective polarizer 12 | A-light source (LW100V57W55/2P, manufactured by OHM ELECTRIC INC.) | D | D |
| Example 91 | Optical System 102 | laminate 102 | back side | absence | absence | cholesteric reflective polarizer 12 | backlight of commercially available TV (KDL46W900A, manufactured by Sony Group Corporation) | B | B |

<Evaluation of Brightness of Main Image of Head-Mounted Display>

The image display device was taken out of the produced optical system, and a light source for evaluation was disposed. As the light source for evaluation, three kinds of laser pointers (wavelength: 450 nm, 532 nm, 650 nm) were used. Light was allowed to enter the linear polarizer (1002) from the light source for evaluation, and the intensity of the emitted light of the optical system according to the embodiment of the present invention was measured by a power meter. Intensity ratios with respect to Comparative Example 2 at each of the three wavelengths were calculated, and an average value thereof was defined as an evaluation value.

A: The average value of the intensity ratio is 1.1 or greater.

B: The average value of the intensity ratio is 1.05 or greater.

C: The average value of the intensity ratio is greater than 1.0.

D: The average value of the intensity ratio is 1.0 or less.

<Evaluation of Ghost Image>

The head-mounted display was mounted, and an unnecessary ghost image (1102 in FIGS. 1A and 1B) generated other than a main image (1101 in FIGS. 1A and 1B) from the image display device was visually evaluated.

AA: No ghost image is visually recognized even in a case where the luminance of the image display device is increased.

A: The ghost image is not visually recognized, but is slightly visually recognized in a case where the luminance of the image display device is increased.

B: The ghost image is slightly visually recognized.

C: The ghost image is visually recognized.

D: The ghost image is clearly visually recognized, and the head-mounted display is not acceptable.

The results are shown in Tables 2, 5, and 6.

The optical system 2 of Comparative Example 2 has a configuration in which the same two films (laminate 102) each composed of a plurality of layers are used as a first quarter wavelength plate and a second quarter wavelength plate, respectively, and their virtual slow axes are shifted by 90° from each other. In this case, the retardance relationship of R1=−R2 was not satisfied at all of the points of three wavelengths, and as a result, it was not possible to achieve both the suppression of a ghost image and a high transmittance.

The optical system 3 of Example 1 has a configuration in which the laminate 103-1 and the laminate 103-2 are used as a first quarter wavelength plate and a second quarter wavelength plate, respectively, and thus the retardance relationship of R1=−R2 is satisfied. In this configuration, it was possible to confirm that both the suppression of a ghost image and a high transmittance can be achieved.

In addition, as shown in Example 81 (cholesteric reflective polarizer 2), Example 84 (cholesteric reflective polarizer 5), Example 83 (cholesteric reflective polarizer 4), and Example 89 (cholesteric reflective polarizer 10), it was possible to confirm that in a case where in addition to the cholesteric liquid crystal layer, a cholesteric reflective polarizer having a retardation layer was used as a reflective polarizer, both the ghost image visibility and the brightness of a main image were evaluated as good.

EXPLANATION OF REFERENCES

10A: wavelength plate
10B, 10C, 10D: lamination type wavelength plate
11, 12, 13, 14: optically anisotropic layer
1001: image display device
1002: linear polarizer
1003: first quarter wavelength plate
1004: half mirror
1005: second quarter wavelength plate
1006: reflective polarizer
1007: linear polarizer
1008: reflection circular polarizer
1009: third quarter wavelength plate
1101: main image
1102: ghost image

What is claimed is:

1. An optical system comprising:
an image display device that emits an image;
a linear polarizer through which light associated with the image passes;
a first quarter wavelength plate which receives the light from the linear polarizer;
a half mirror; and
a reflective polarizer; and
a second quarter wavelength plate provided between the reflective polarizer and the half mirror,
wherein retardance of the first quarter wavelength plate and retardance of the second quarter wavelength plate are equal to each other, and
wherein the first quarter wavelength plate and the second quarter wavelength plate are lamination type wavelength plates composed of the same optically anisotropic layers, the optically anisotropic layers are laminated to be disposed in a mirror symmetric way with the half mirror as a center, and the same optically anisotropic layers are disposed so that optic axes thereof are orthogonal to each other.

2. The optical system according to claim 1,
wherein each of the first quarter wavelength plate and the second quarter wavelength plate is a lamination type wavelength plate consisting of a plurality of optically anisotropic layers.

3. The optical system according to claim 1,
wherein at least one of the first quarter wavelength plate or the second quarter wavelength plate is a lamination type wavelength plate consisting of three or more optically anisotropic layers, and satisfies a relationship of Re (450)≤Re (550)≤Re (650) where Re (450) is an in-plane retardation value measured at a wavelength of 450 nm, Re (550) is an in-plane retardation value measured at a wavelength of 550 nm, and Re (650) is an in-plane retardation value measured at a wavelength of 650 nm.

4. The optical system according to claim 1,
wherein at least one of the first quarter wavelength plate or the second quarter wavelength plate includes a layer having a twisted structure of a liquid crystal compound having a spiral axis in a thickness direction.

5. An optical system comprising:
an image display device that emits an image;
a linear polarizer through which light associated with the image passes;
a first quarter wavelength plate which receives the light from the linear polarizer;

a half mirror; and a reflective polarizer which selectively reflects circularly polarized light, wherein the reflective polarizer has one or more cholesteric liquid crystal layers, and at least one of the cholesteric liquid crystal layers has a pitch gradient structure in which a spiral pitch changes in a film thickness direction, wherein the reflective polarizer has at least one rod-like cholesteric liquid crystal layer consisting of a rod-like liquid crystal compound and at least one disk-like cholesteric liquid crystal layer in which a disk-like liquid crystal compound having a polymerizable group is vertically aligned, and wherein total Rth (550) of the disk-like cholesteric liquid crystal layers satisfies the following expression, $|Rth(550)| \geq 200$ nm here, Rth (550) represents a retardation in a thickness direction of the disk-like cholesteric liquid crystal layer.

6. The optical system according to claim 5, wherein a difference between a maximum value and a minimum value of a transmittance of the reflective polarizer in a visible light region is 3% or less.

7. The optical system according to claim 5, further comprising:

one or more retardation layers obtained by fixing vertical alignment of a liquid crystal compound having a polymerizable group.

8. The optical system according to claim 5, wherein the rod-like cholesteric liquid crystal layer and the disk-like cholesteric liquid crystal layer are adjacent to each other.

9. The optical system according to claim 5, wherein the reflective polarizer is processed into a curved surface shape.

10. The optical system according to claim 5, wherein the reflective polarizer has a liquid crystal polymer obtained by polymerizing a liquid crystal composition containing a liquid crystal compound having one polymerizable group.

* * * * *